(12) United States Patent
Haimoff

(10) Patent No.: US 9,820,574 B2
(45) Date of Patent: Nov. 21, 2017

(54) ARTIFICIAL PANEL, A METHOD FOR MANUFACTURING SAME AND FURNITURE ARTICLES THEREFROM

(75) Inventor: Efraim Haimoff, Mevasereth Zion (IL)

(73) Assignee: KETER PLASTIC LTD., Herzelyia (IL)

( * ) Notice: Subject to any disclaimer, the term of this patent is extended or adjusted under 35 U.S.C. 154(b) by 223 days.

(21) Appl. No.: 12/937,621

(22) PCT Filed: Apr. 5, 2009

(86) PCT No.: PCT/IL2009/000369
§ 371 (c)(1),
(2), (4) Date: Dec. 30, 2010

(87) PCT Pub. No.: WO2009/144703
PCT Pub. Date: Dec. 3, 2009

(65) Prior Publication Data
US 2011/0129623 A1    Jun. 2, 2011

Related U.S. Application Data

(60) Provisional application No. 61/071,122, filed on Apr. 14, 2008.

(51) Int. Cl.
*A47B 96/20*     (2006.01)
*B29C 45/00*     (2006.01)
(Continued)

(52) U.S. Cl.
CPC .............. *A47B 96/20* (2013.01); *A47C 5/12* (2013.01); *B29C 33/42* (2013.01); *B29C 45/26* (2013.01); *B29C 45/37* (2013.01); *B29C 45/40* (2013.01); *B44C 5/0453* (2013.01); *B44F 9/00* (2013.01); *A47B 2096/208* (2013.01);
(Continued)

(58) Field of Classification Search
None
See application file for complete search history.

(56) References Cited

U.S. PATENT DOCUMENTS 1,541,000 A * 6/1925 Riley ............... D03D 41/002
139/28
1,775,485 A * 9/1930 Carpinella ............ B27J 1/02
139/420 R
(Continued)

FOREIGN PATENT DOCUMENTS

AT    198914 B * 8/1958 ............... A47C 5/02
CN    2337051 Y    9/1999
(Continued)

OTHER PUBLICATIONS

Machine Translation of EP 181958 A1, May 1986.*
(Continued)

*Primary Examiner* — Jeff Vonch
(74) *Attorney, Agent, or Firm* — Dorsey & Whitney LLP

(57) ABSTRACT

A molded panel resembling a natural wickerwork panel, a furniture article comprising such a panel and a method for its manufacture, the panel comprising a plurality of warp strands and a plurality of weft strands interlacing the warp strands, such that at locations where warp and weft strands intersect they form together an integrated, solid molded material location.

19 Claims, 46 Drawing Sheets

(51) Int. Cl.
  *B44C 5/00* (2006.01)
  *B44C 5/04* (2006.01)
  *B44F 9/00* (2006.01)
  *B29C 45/26* (2006.01)
  *B29C 45/37* (2006.01)
  *B29C 45/40* (2006.01)
  *A47C 5/12* (2006.01)
  *B29C 33/42* (2006.01)
  *B29C 45/72* (2006.01)
  *B29L 31/44* (2006.01)
  *B29L 7/00* (2006.01)

(52) U.S. Cl.
  CPC ......... *B29C 45/00* (2013.01); *B29L 2007/002* (2013.01); *B29L 2031/44* (2013.01); *B29L 2031/443* (2013.01); *Y10S 297/02* (2013.01); *Y10T 428/24083* (2015.01); *Y10T 428/24174* (2015.01); *Y10T 428/24273* (2015.01); *Y10T 428/24298* (2015.01); *Y10T 428/24744* (2015.01); *Y10T 428/24785* (2015.01)

(56) References Cited

U.S. PATENT DOCUMENTS

| | | | | |
|---|---|---|---|---|
| 2,276,608 A * | 3/1942 | Bugge | B29C 43/18 | 139/420 R |
| 2,925,650 A * | 2/1960 | Pall | B21F 27/18 | 210/510.1 |
| 3,059,668 A | 10/1962 | Greenspan | | |
| 3,062,244 A * | 11/1962 | Ho Fong | A47C 5/02 | 139/424 |
| 3,419,456 A * | 12/1968 | Tenney | B29C 33/00 | 156/242 |
| 3,475,530 A * | 10/1969 | Cooper | B29C 45/1615 | 264/246 |
| 3,722,955 A * | 3/1973 | Trotman | A47C 21/046 | 297/452.45 |
| 4,231,834 A * | 11/1980 | Trejo Gonzalez | A47C 5/00 | 156/244.13 |
| 4,731,281 A * | 3/1988 | Fleischer | B01D 39/083 | 139/383 A |
| 5,549,958 A | 8/1996 | Royaerts | | |
| 5,845,970 A * | 12/1998 | Schwartz | A47C 5/02 | 297/451.9 |
| 5,985,188 A | 11/1999 | Jennings et al. | | |
| 6,379,603 B1 * | 4/2002 | White | B29C 45/2701 | 264/328.12 |
| 6,470,643 B1 * | 10/2002 | Cantley | E04C 2/427 | 52/311.1 |
| 7,175,235 B2 * | 2/2007 | Schwartz | A47C 5/02 | 297/452.56 |
| D597,332 S * | 8/2009 | Carmon | D6/369 | |
| D618,928 S * | 7/2010 | Carmon | D6/369 | |
| 8,070,903 B1 * | 12/2011 | Meschter | B29C 43/22 | 156/242 |
| 2004/0031534 A1 * | 2/2004 | Schwartz | A47C 5/02 | 139/169 |
| 2009/0044879 A1 * | 2/2009 | Tseng | B27J 1/02 | 144/333 |
| 2009/0286081 A1 * | 11/2009 | Ji | D02G 3/44 | 428/375 |
| 2011/0005642 A1 * | 1/2011 | Merezhkin | B27D 1/08 | 144/350 |

FOREIGN PATENT DOCUMENTS

| | | | | |
|---|---|---|---|---|
| CN | 2566701 Y * | 8/2003 | ........ | B29L 2031/443 |
| DE | 1954764 A1 | 5/1970 | | |
| DE | 19502620 A1 * | 8/1996 | ........ | A47C 1/14 |
| DE | 202006003252 U1 * | 9/2006 | ........ | D03D 1/00 |
| EM | 701461-0009 | 2/2007 | | |
| EM | 000701461-009 A1 | 2/2007 | | |
| EM | 000701461-010 | 2/2007 | | |
| EM | 701461-0010 | 2/2007 | | |
| EP | 0 181 958 A1 | 5/1986 | | |
| EP | 181958 A1 * | 5/1986 | ........ | B23H 9/00 |
| EP | 517614 A1 * | 12/1992 | ........ | A47C 7/16 |
| EP | 0 796 577 A1 | 9/1997 | | |
| EP | 796577 A1 | 9/1997 | | |
| FR | 557625 A * | 8/1923 | ........ | A47C 7/16 |
| FR | 1102567 A * | 10/1955 | ........ | B27J 1/00 |
| FR | 2530985 A1 | 2/1984 | | |
| GB | 652 249 A | 4/1951 | | |
| GB | 2257352 A | 1/1993 | | |
| JP | 6-238768 A | 8/1994 | | |
| WO | 02067727 A1 | 9/2002 | | |

OTHER PUBLICATIONS

Machine Translation of DE 19502620 A1, Aug. 1996.*
Machine Translation of CN 2337051 Y, Sep. 1999.*
Machine Translation of CN 2566701 Y, Aug. 2003.*
English Translation of CN 2337051 Y, Sep. 1999.*
Machine Translation of FR 2530985 A1, Feb. 1984.*
Machine Translation of DE 202006003252 U1, Oct. 2006.*
Statutory Declaration with attached picture of chair, 3 pages (1998).
International Search Report, PCT/IL2009/000369, dated Oct. 28, 2009.
Tokujin Yoshioka: "AMI AMI chair" Milan Design Week 2008 Preview, [Online] Apr. 10, 2008 (Apr. 10, 2008), XP002542166 Retrieved from the Internet: URL:http://www.dezain.net/en/thread/12198/.
Tokujin Yoshioka: "AMI AMI chair" Kartell Technical Sheet, [Online] Apr. 16, 2008 (Apr. 16, 2008), XP002542167, Retrieved from the Internet: URL:http://www.kartell.it/>.
Enclosure A Invoice n. F /197 dated on Sep. 9, 2004 issued by Arplast S.n.c. to Mafiplast S.r.L. and related to black, red and white chair seats shown in photograph attached to said invoice.
Enclosure B Front page And pages 4 and 6 of IPAE-PROGARDEN catalogue dated 2007.
Enclosure C Invoice n.1728i dated on Dec. 4, 2007 issued by IPAEPROGARDEN S.p. A. to Plasticos Santi S.L. related to chairs named CAPRI shown on catalogue of enclosure B.
Enclosure D Invoice n. 2032 dated on May 16, 2007 issued by IPAEPROGARDEN S.p. A. to Castorama Savignano related to chairs named CAPRI shown on catalogue of enclosure B.
Enclosure E Front page And page 3 of IPAE-PROGARDEN catalogue dated 1997.
Enclosure F Invoice n. 2980 dated on Jul. 24, 2007 issued by IPAEGARDEN S.p.A. To Ilsa International S.r.L. related to chairs named CAMELIA.
Enclosure G Front page and page 10 of IPAE-PROGARDEN catalogue dated 2004.
Enclosure H Photographs showing a section detail of the chair seats of Enclosure A.
Enclosure I Photographs showing a section detail of the chairs named CAPRI.
Enclosure L Photographs showing a section detail of the chairs named CAMELIA.
Office Action from European Application No. 09754322, dated Oct. 20, 2010.
Excerpt from a catalogue of the PROGARDEN Group from 1997.
Excerpt from a catalogue of the PROGARDEN Group from 2004.
Images of the chair and a portion of the back-rest of the chair model "Camelia" (1997).
Excerpts from the garden furniture catalogue of the Italian company GrandSoleil from the year 1987.
Detailed representation of the wickerwork panel of the chair shown in the excerpts from the garden furniture catalogue of the Italian company GrandSoleil from the year 1987.
Excerpt of the web site of the Italian company GrandSoleil (2012).
Catalogue "Giardino Camping Casa" dated 1987, of the company GrandSoleil, front page and pp. 40 through 41.
Photograph showing a close-up view of the chairs advertised in NPL.

(56) References Cited

OTHER PUBLICATIONS

IPAE-GARDEN catalogue dated 1997, front page and p. 3.
IPAE-PROGARDEN catalogue dated 2007, front page and pp. 4 and 6.
Office action issued by the European Patent Office dated Aug. 29, 2012 in reference to the opposed corresponding EP application No. 09754322.7-2307 (patent No. EP2205418).
Excerpt taken from the website of Italian company GrandSoleil.
Three photographs of the chair "CAPRI".
Invoice n. 1728i dated Apr. 12, 2007 issued by IPAE-PROGARDEN S.p.A. to Plasticos Santi S.L. related to chairs named CAPRI.
Invoice n. 2960 dated Jul. 24, 2007 issued by IPAE-PROGARDEN S.p.A. to Ilsa International S.r.L. related to chairs named Camelia.
Three photographs of the chair "CAMELIA".
Notice of Opposition filed in corresponding patent No. EP2205418 dated Feb. 24, 2015.

\* cited by examiner

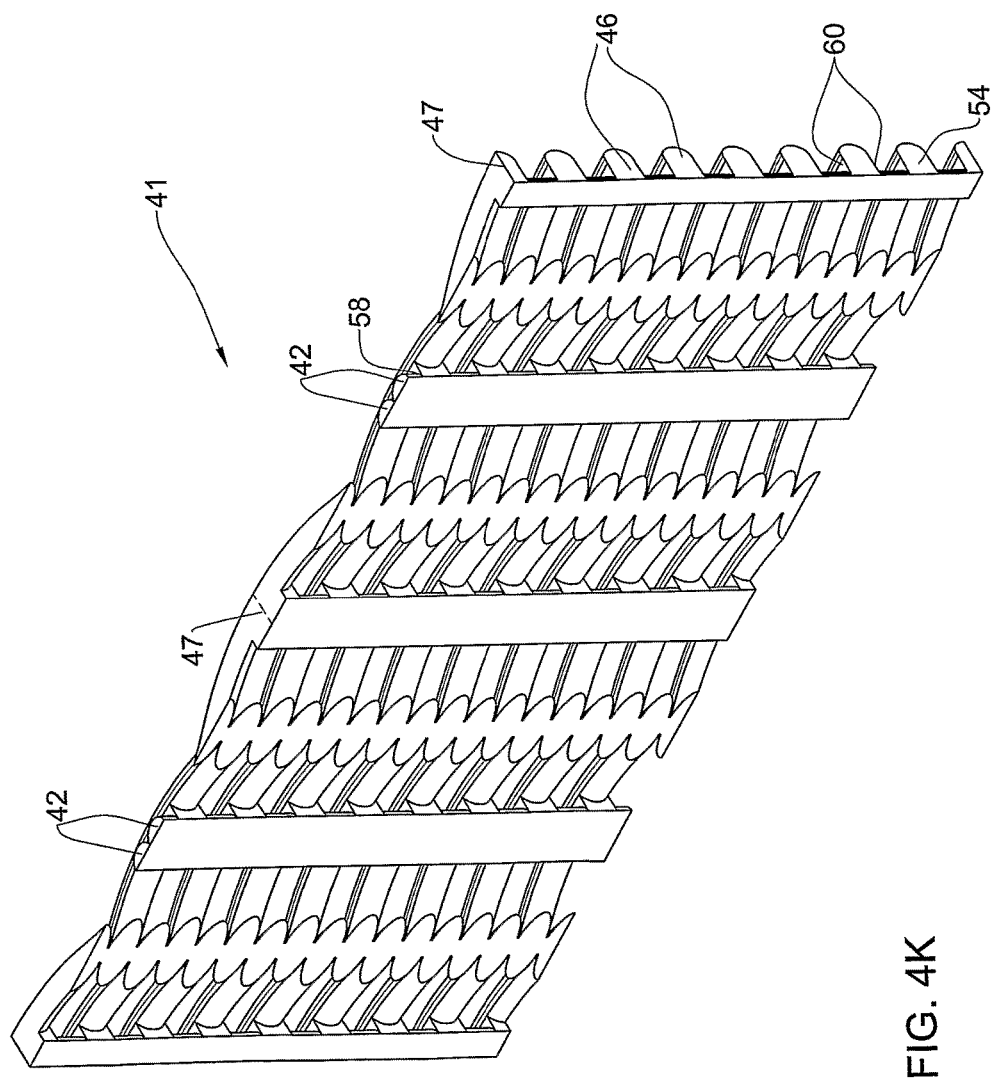

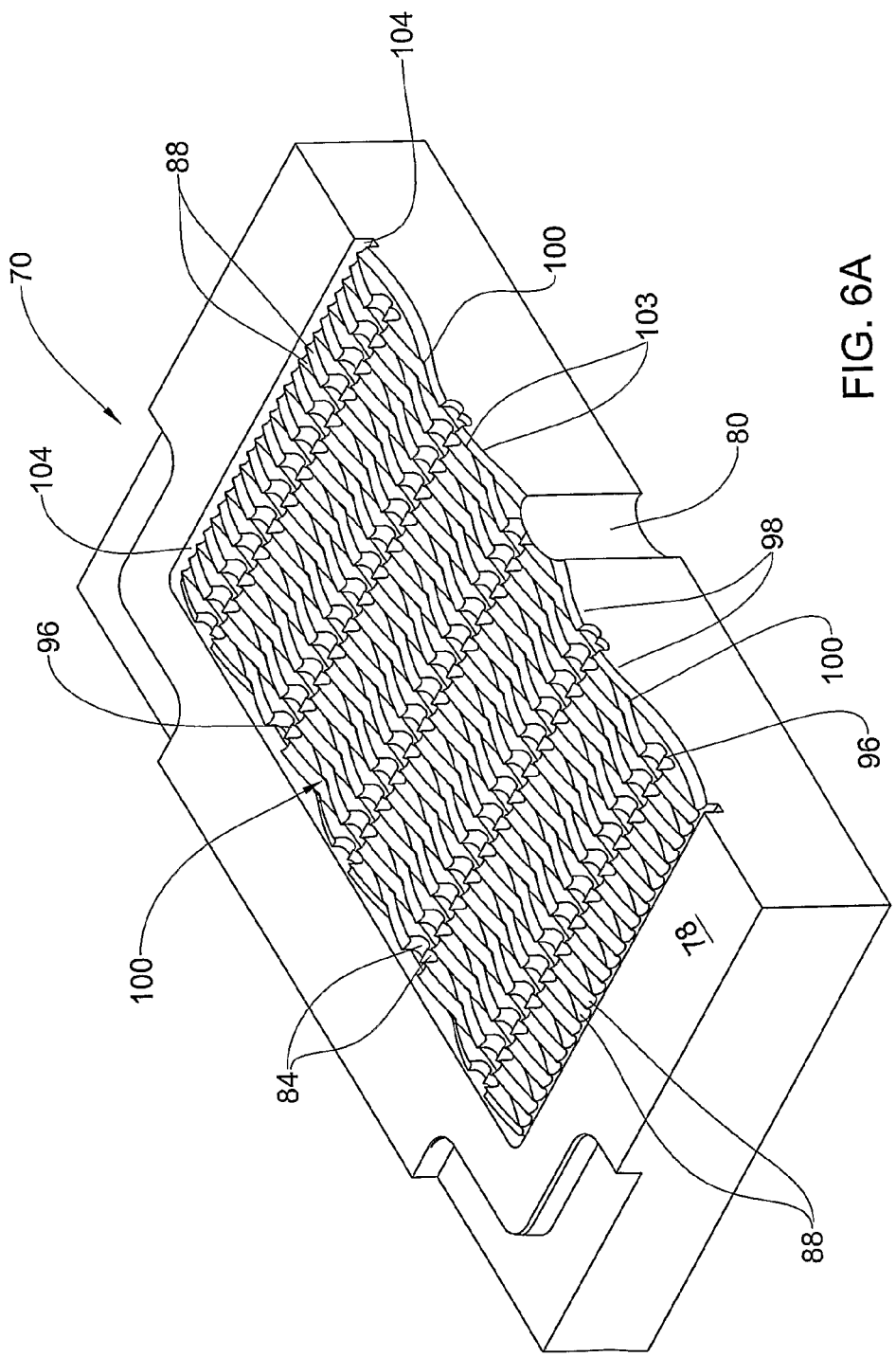

ARTIFICIAL PANEL, A METHOD FOR MANUFACTURING SAME AND FURNITURE ARTICLES THEREFROM

CROSS-REFERENCE TO RELATED APPLICATIONS

This application is a national phase entry under 35 U.S.C. §371 of International Application No. PCT/IL2009/000369, filed Apr. 5, 2009, published in English, which claims the benefit of the filing date of U.S. Provisional Patent Application No. 61/071,122, filed on Apr. 14, 2008, the disclosures of which are incorporated herein by reference.

FIELD OF THE INVENTION

This invention relates to an artificial panel mimicking a panel made of a natural material, e.g. a rattan-like panel, a willow-like panel, etc. The invention is further concerned with a method for manufacturing such panels and furniture articles therefrom.

BACKGROUND OF THE INVENTION AND PRIOR ART

Hereinafter in the specification and claims the terms 'weaving' or 'wickerwork' are used to define any form of interlacing (in and out weaving) of any type of wicker—natural or artificial.

The term 'wicker' is used to denote any sort of fiber useful in wickerwork, e.g., rattan, willow, reed, bamboo, or any real or artificial osier, etc.

Wickerwork/weaving is often associated with the process of interlacing, at right angles, two or more series of flexible materials, of which the longitudinal are called warp and the transverse weft, (warp is the set of lengthwise tensioned yarns/strands through which the weft is undulatingly woven). However, right angles are not mandatory.

The use of wicker strips/yarns/strands in the manufacture of furniture and other domestic articles is ever-growing. However, household objects made of natural wicker are not suitable for outdoor usage because the wicker strips are of poor resistance and will easily and rapidly damage after exposure to water and dampness and will get rotten or moldy, whereas exposure to heat will cause the wicker to easily break.

Thus, it is common practice to apply protective coating to the natural wicker, e.g., lacquers, different oils, etc. Even more so, wickerwork articles intended to bear loads, such as furniture, require a rigid frame and reinforcement, since these natural materials are not sufficiently strong to bear fairly great weight.

Yet another problem regarding natural wicker is concerned with the labor required for its processing and the time required for wickerwork. However, as natural-style furniture becomes increasingly popular in the west, the natural material is scarce since it grows only in Eastern countries. This results in increase of price of the natural wicker strip and wickerwork, owing to source shortage.

In order to avoid using natural wicker, it has become common in recent years to use artificial wicker in the form of rattan/willow—like material typically made of extruded plastic material. The artificial material is of increased durability and substantially cheaper than the natural material, once extruded in slender form, is used for wickerwork instead of the natural material.

Several patents refer to manufacture and forming of artificial wicker, resembling in its appearance that of the natural wicker.

For example, U.S. Pat. No. 3,059,668 is concerned with a machine for the production of crates or baskets made from two sets of strips of wood which the sets are pliated or interwoven so as to result in a basket.

U.S. Pat. No. 4,231,834 relates to the production of tubular articles, made from synthetic thermoplastic materials, which resemble wood, rattan, bamboo, cane, reed, wicker, reed, rush, and similar natural materials, and also to the production of furniture, structures, and every kind of ornament in general employing thermoplastic materials which replace the natural materials mentioned above, coloring and veining such thermoplastic materials, and also joining and securing by means of ties made from rigid, semi-rigid or plastified polyvinyl the natural and artificial materials above mentioned, for the purpose of assembling furniture and structures in general.

U.S. Pat. No. 5,549,958 is concerned with a composite material for the manufacture of seats, seat backs and like objects receives a decorative fabric on one side, the other side cooperating with the frame or stuffing of the seat. The composite material is woven and includes a metal armature with warp threads and weft wires. The weft wires are steel rods bent to a shape having regular undulations and disposed so that the undulations are parallel and coplanar. The warp threads are interwoven with the rods, at least part of the armature being embedded in an elastomer.

WO 02067727 discloses a cane-plaiting panel, especially for seats, chairs and armchairs, and to a corresponding role of cane-plaited material. The cane-plaited panel, especially designed for the base of seats, chairs or armchairs is of a type which includes filiform strips, made of cane or peeled ratan reeds for example, which are interlaced according to a pattern of chains and wefts, in addition to strips which are disposed in a diagonal position in relation to the chains and wefts. The invention is characterized in that it contains fine, highly resistant filiform elements which are interlaced with said strips in a chain, weft and diagonal form.

SUMMARY OF THE INVENTION

It is an object of the present invention to provide a panel manufactured in an injection molding process, which panel resembles a natural wickerwork panel. It is another object of the invention to provide a method for molding of panels which panels resemble a natural wickerwork panel. Yet another aspect of the present invention is concerned with the manufacture of furniture items comprising at least a panel portion, which panel portion resemble a natural wickerwork panel. The invention is further concerned with a mold used in the process of molding a panel resembling a natural wickerwork panel.

A panel of the present invention may have two similar faces, namely where both faces thereof mimic a natural wickerwork surface ('rattan-like surface'), or the two faces each mimicking a different pattern of natural wickerwork surface, or where one face thereof mimics a pattern of natural wickerwork surface and an other face thereof is a flat face (typically where it is a non-visualized surface; or as a watertight panel).

As tight as may be a natural wickerwork panel, typically it has fine gaps between at least several neighboring warp and weft wicker. Thus, a panel according to the present invention is formed with such gaps too, thus giving rise to 'see-through' gaps.

Furthermore, a natural or artificial wickerwork panel must be supported/anchored/wrapped/tensioned about an anchoring structure, e.g., a metal or wood construction frame. However, according to the present invention, the panel is a stand-alone type, i.e., free of any anchoring structure or members and wherein a frame may be integrally molded with the panel as an ornamental element or as a reinforcing element. Accordingly, the panel may have any desired pattern and borders and may be molded in different three-dimensional shapes and patterns as complete furniture articles or as parts thereof.

Furthermore, detaching/tearing or loosening of one or more of wicker strands will not result in further unraveling of the artificial panel. This arrangement results in that forces over wicker-like strands are substantially homogenously distributed and not only along the strands as in the case of woven material.

According to the present invention, where warp and weft wicker intersect they form together a solid molded material location (i.e., with no space therebetween and thus being un-detachable from one another at that location), and however a longitudinal continuous, longitudinal and straight gap extends parallel to the warps, at both sides thereof, between undulating weft wicker (to the extent that a fine rod or ribbon may be introduced therethrough). The nature of the panel according to the present invention is such that at said solid molded material locations the thickness of material may be equal, less or more than the accumulating thickness of a weft strand and a warp strand together.

As mentioned above, the undulating weft strands of a panel according to the present invention are integrally molded at intersections with the warp strands, however a pair of alternatingly undulating weft strands tangentially intersect with one another at an intersection point extending along a line parallel to the warp strands, wherein at said intersection point said pair of alternatingly undulating weft strands is either moldingly articulated to one another or detached from one another.

A panel according to the present invention mimics a natural wickerwork panel as far as size of the wicker strands, color and texture thereof (e.g., fine texture, gloss, imperfections, etc.).

In a panel according to the present invention wherein both faces thereof mimic a natural wickerwork surface, the wicker-like strands are moldingly formed by complementary shapes of the molds, e.g., to form round or flat cross-sectioned strands.

A mold for manufacturing a panel or a furniture article fitted with a panel according to the present invention typically comprises a stationary mold member and a displaceable mold member, each formed with an appropriate array of grooves which complement each other and form together channels, allowing molted polymer material to flow into the warp and weft like channels to give rise to a desired wicker strand shape, and with blade-like elements projecting from each mold so as to create fine gaps between at least several neighboring warp and weft wicker strands, such that a panel according to the present invention is formed with 'see-through' gaps.

A mold according to the present invention comprises two or more complementary mold elements, i.e., associated with a front face of the panel and with a rear face thereof), said molds being securable to one another at fixed positions, with at least one molten material in-flow port, and wherein each complementary mold is formed with grooves corresponding with warp and weft strands of the panel, said grooves complementing each other and are formed with blade-like elements such that at an assembled position of the mold they substantially engage with blade-like elements of an opposite mold, thereby giving rise to substantially closed channels for molding the warp and weft strands. Where desired, the complementary molds are formed with spacer segments between neighboring weft grooves, thus giving rise to flow of molten material in-between adjoining strands, resulting in contact points therebetween which rigidify the panel.

According to the present invention, the panel may be designed at unlimited shapes and patterns and having different properties. Examples of such modifications are:
un-even number of warp and weft strands;
altering number of warp strands and weft strands on the same panel;
altering distance between warp strands and weft strands;
altering thickness of warp strands and weft strands;
change of texture imparted to warp strands and weft strands along the panel;
the molded panel may be rigid or pliable;
the molded panel may assume any desired shape and geometry, e.g., substantially flat, or as a complex shape, either as a final product or as a component of a product.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 4A to 4K are incremental sections taken along the rattan-like panel of FIG. 3, wherein:

FIG. 4A is a portion of the rattan panel sectioned along line A-A in FIG. 3;

FIG. 4B is a portion of the rattan panel sectioned along line B-B in FIG. 3;

FIG. 4C is a portion of the rattan panel sectioned along line C-C in FIG. 3;

FIG. 4D is a portion of the rattan panel sectioned along line D-D in FIG. 3;

FIG. 4E is a portion of the rattan panel sectioned along line E-E in FIG. 3;

FIG. 4F is a portion of the rattan panel sectioned along line F-F in FIG. 3;

FIG. 4G is a portion of the rattan panel sectioned along line G-G in FIG. 3;

FIG. 4H is a portion of the rattan panel sectioned along line H-H in FIG. 3;

FIG. 4I is a portion of the rattan panel sectioned along line I-I in FIG. 3;

FIG. 4J is a portion of the rattan panel sectioned along line J-J in FIG. 3; and FIG. 4K is a portion of the rattan panel sectioned along line K-K in FIG. 3;

FIGS. 6A to 6H are sectioned views taken along increments in FIG. 5, wherein:

FIG. 6A is an isometric view of a section taken along line A-A in FIG. 5A;

FIG. 6B is an isometric view of a section taken along line B-B in FIG. 5;

FIG. 6C is an isometric view of a section taken along line B-B in FIG. 5A;

FIG. 6D is an isometric view of a section taken along line C-C in FIG. 5A;

FIG. 6E is an isometric view of a section taken along line D-D in FIG. 5A;

FIG. 6F is an isometric view of a section taken along line E-E in FIG. 5A;

FIG. 6G is an isometric view of a section taken along line F-F in FIG. 5A; and

FIG. 6H is an isometric view of a section taken along line G-G in FIG. 5A;

FIGS. 7A to 7H illustrate incremental views of an assembled pair of molds suited for molding a rattan-like panel of the type illustrated in FIG. 3, each figure showing an isometric block segment, a planar view in direction of arrow Z of the block segment showing a line of section, a planar section view along said line of section and an enlargement of the sectioned portion, wherein:

FIGS. 7A to 7C are incremental progressive sections along a warp side of the assembled mold; and FIGS. 7D to 7H are incremental progressive sections along a weft side of the assembled mold;

FIGS. 9A to 9G are incremental sections taken along the rattan-like panel of FIG. 8, wherein:

FIG. 9A illustrates a portion of the panel seen in FIG. 8, sectioned along line A-A;

FIG. 9B illustrates a portion of the panel seen in FIG. 8, sectioned along line B-B;

FIG. 9C illustrates a portion of the panel seen in FIG. 8, sectioned along line C-C;

FIG. 9D illustrates a portion of the panel seen in FIG. 8, sectioned along line D-D;

FIG. 9E illustrates a portion of the panel seen in FIG. 8, sectioned along line E-E;

FIG. 9F illustrates a portion of the panel seen in FIG. 8, sectioned along line F-F; and FIG. 9G illustrates a portion of the panel seen in FIG. 8, sectioned along line G-G;

FIGS. 11A to 11I are incremental sections taken along the mold section1 of FIG. 10D, wherein:

FIG. 11A is a section taken along line A-A' in FIG. 10D;
FIG. 11B is a section taken along line B-B in FIG. 10D;
FIG. 11C is a section taken along line C-C in FIG. 10D;
FIG. 11D is a section taken along line D-D in FIG. 10D;
FIG. 11E is a section taken along line E-E in FIG. 10D;
FIG. 11F is a section taken along line F-F in FIG. 10D;
FIG. 11G is a section taken along line G-G in FIG. 10D;
FIG. 11H is a section taken along line H-H in FIG. 10D; and FIG. 11I is a section taken along line I-I in FIG. 10D;

DETAILED DESCRIPTION OF SPECIFIC EMBODIMENTS

Figure 1A:
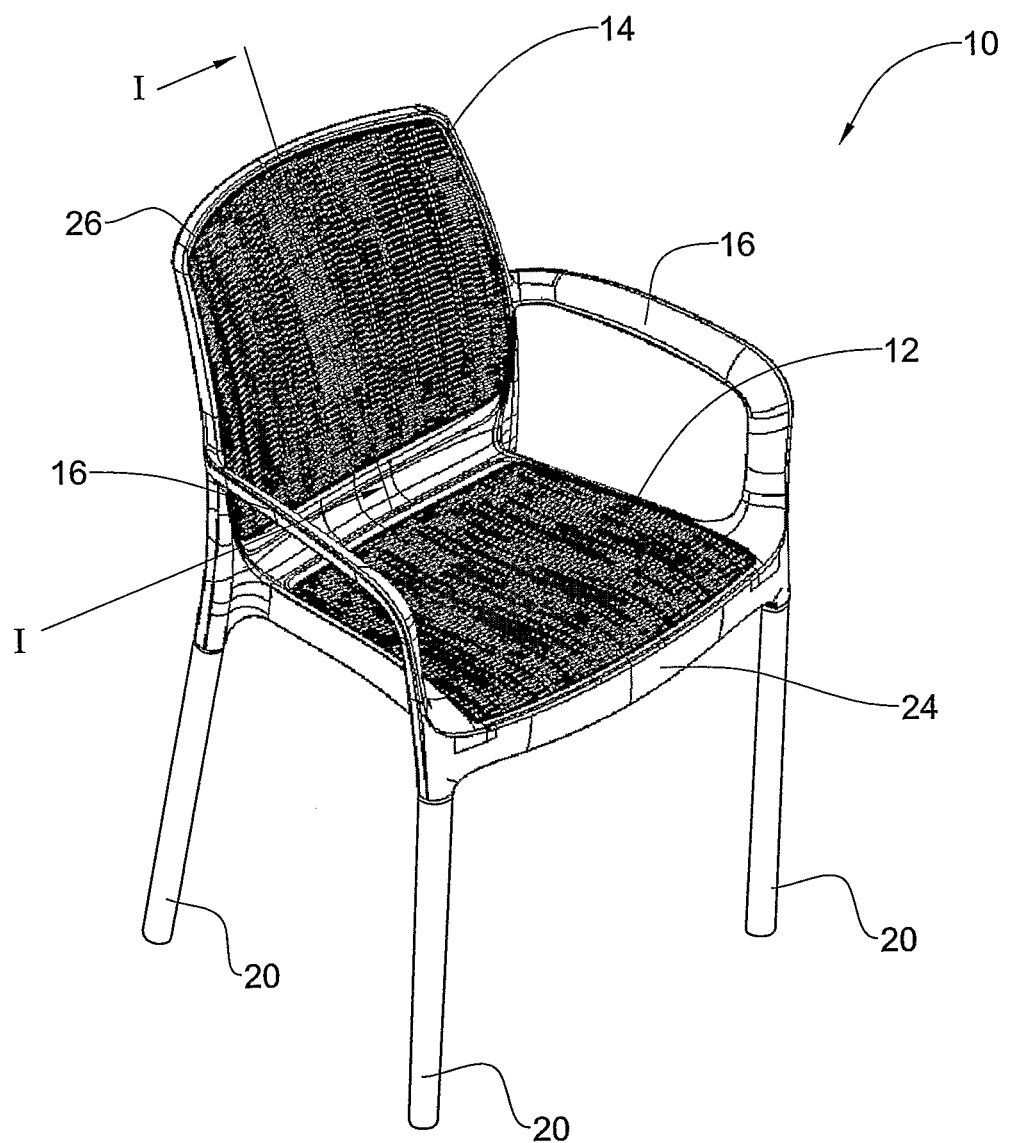
FIG. 1A is an isometric view of a chair molded in accordance with an embodiment of the present invention wherein the seat portion and back portion are rattan-like panels.
Figure 1B:
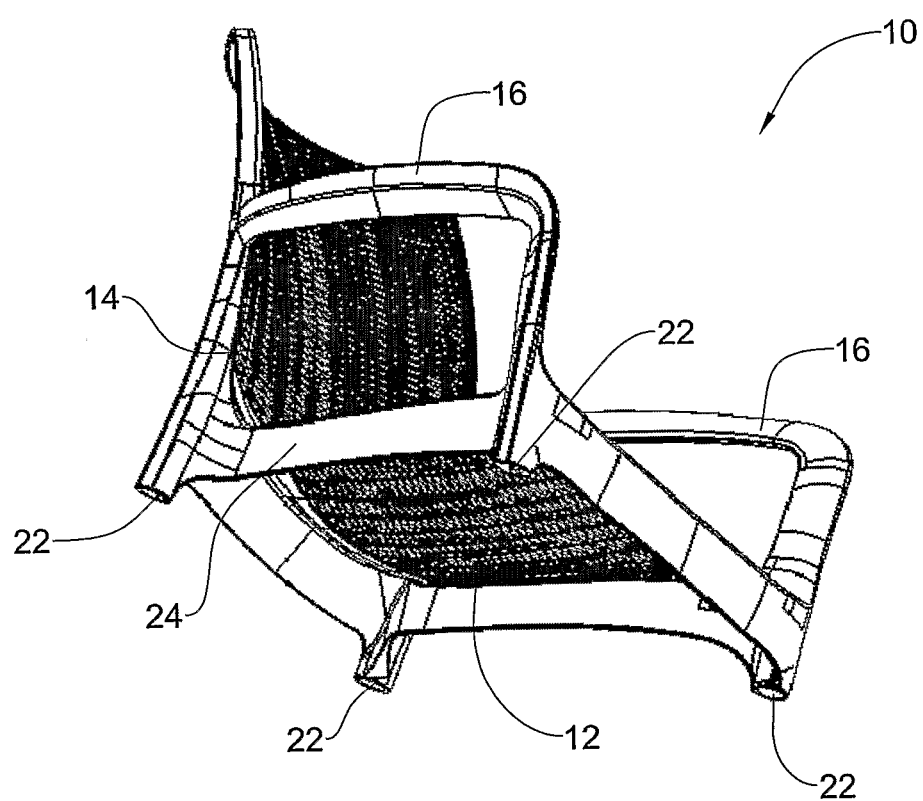
FIG. 1B is a bottom isometric view of the chair of FIG. 1, prior to assembling its legs.
Figure 1C:
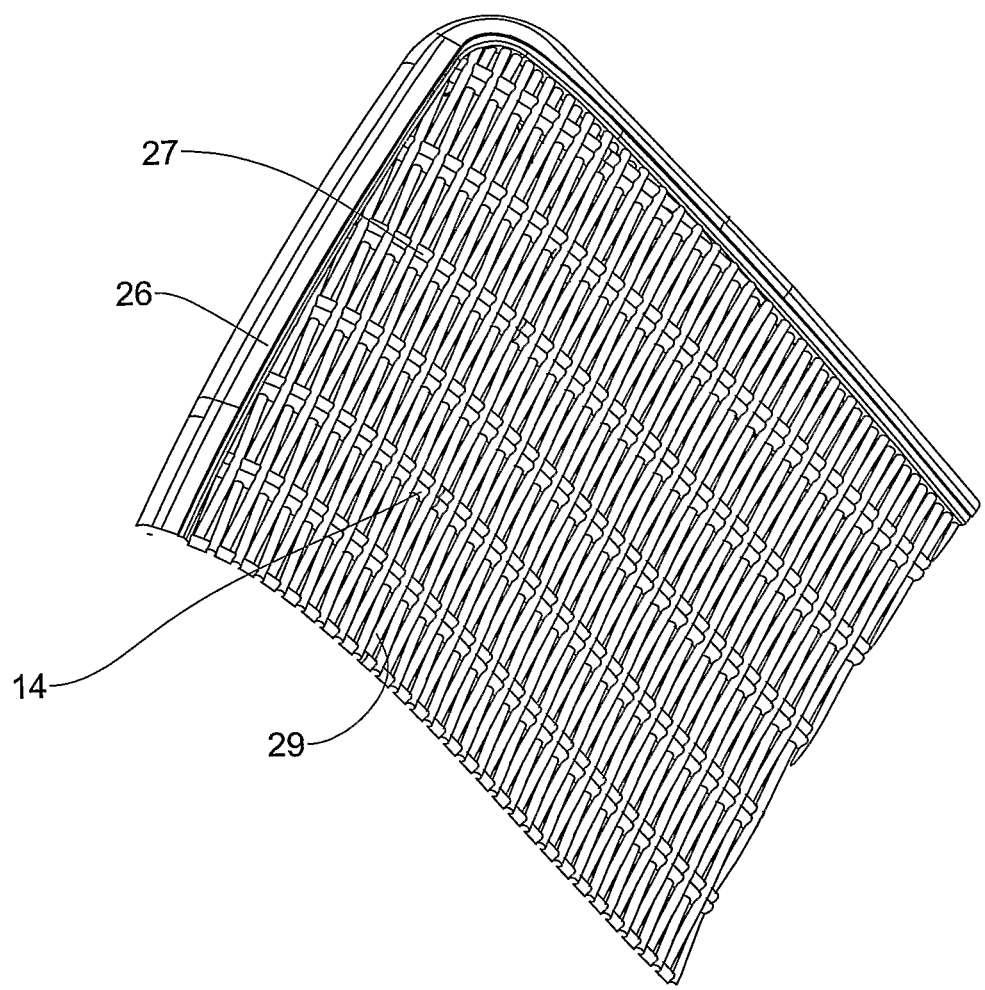
FIG. 1C is an enlarged section through line I-I, only the back rest, of the chair of FIG. 1A.

Attention is first directed to FIGS. 1A to 1C of the drawings illustrating a chair in accordance with an embodiment of the present invention generally designated 10. The chair is composed of a uniform (i.e., solid, integral part) seat portion 12 and back-rest portion 14, with a pair of side arms 16, and their four attachable legs 20 which are attachable into coupling sockets 22 (see FIG. 1B) e.g., in a press fit, snap fit, screw coupling, etc.

The integral chair portion comprises a seat portion frame 24 and a back rest frame 26 manufactured as a solid molded article and wherein the seat portion 12 and the back rest portion 14 are rattan-like panels integrally molded with their respective frame portions 24 and 26.

The example illustrated in FIGS. 1A and 1B illustrates a chair wherein all its components apart from legs 20 are molded in a single mold and at one step, wherein the rattan-like panels 12 and 14 mimic an interlaced/woven panel, as if it were a wickerwork interlacing a flexible material. However, as apparent from FIG. 1C and as will become apparent hereinafter, the rattan-like panels 12 and 14 are in fact single mold panels appearing as a wickerwork, though being molded such that at the interlacing points, i.e., points intersecting between the warp and weft wicker-like material, they are in fact integrated and solidified, though imparting an eye pleasing effect clearly mimicking that of a natural wickerwork with through-going passages (gaps) between the warp and weft wickers.

Figure 2A:
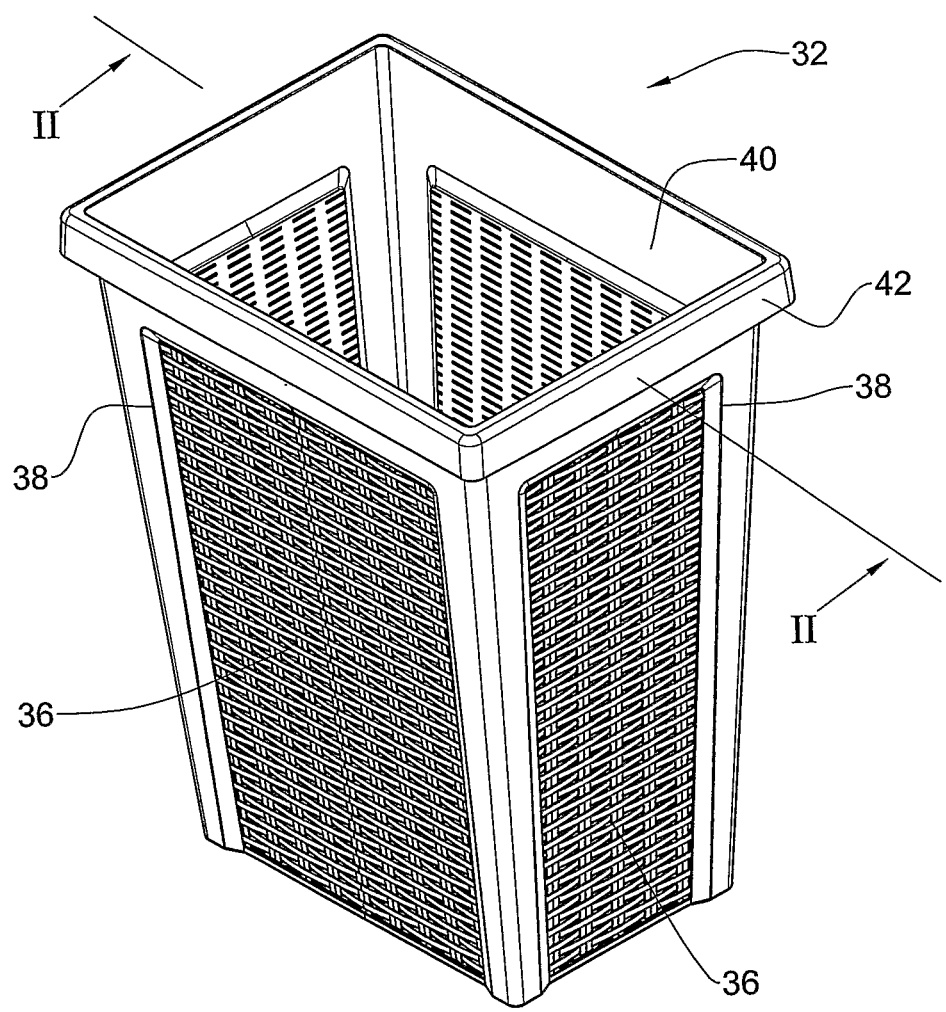
FIG. 2A is an isometric view of a laundry basket manufactured in accordance with the present invention, formed with rattan-like side panels.
Figure 2C:
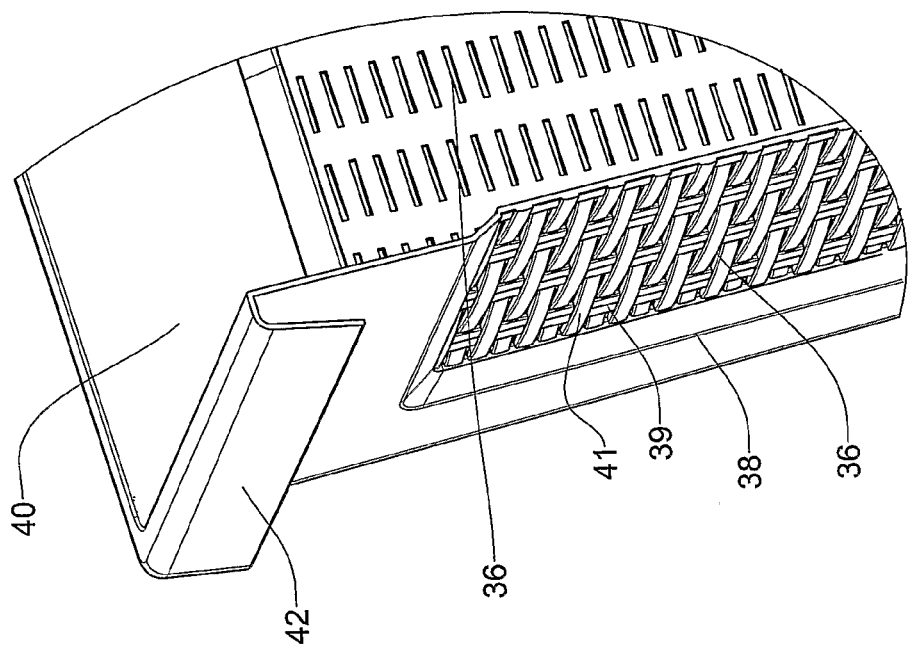
FIG. 2C is an enlargement of the portion marked III in FIG. 2B.
Figure 2B:
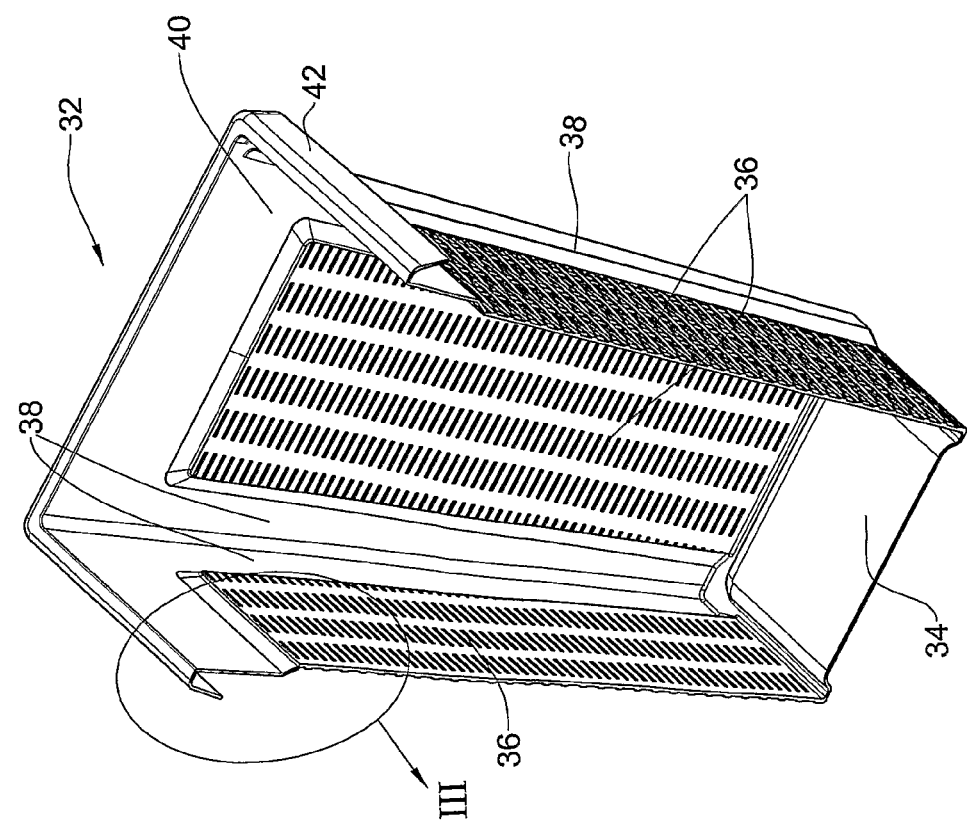
FIG. 2B is a longitudinal section of the laundry basket along line II-II in FIG. 2A.

Yet another example is illustrated in FIGS. 2A to 2C illustrating a laundry bin generally designated 32 in the form of a four-sided polygonal basket integrally molded as a unitary item. The basket comprises a base 34 (FIG. 2B), four side walls 36 upwardly extending from the base 34, slightly outwardly slanting wherein each side wall is bounded with a frame portion 38 and a top frame portion 40 with an external downwardly facing rim 42.

As noticed in the figures, the side walls 36 are in the form of rattan-like panels mimicking an interlacing wickerwork of flat rattan (willow-like) though in fact, as already explained in connection with the example of FIGS. 1A and 1B, the rattan-like panels are a unitary molded item manufactured in a single molding process, as will become apparent hereinafter.

In the embodiments of FIGS. 1 and 2 the chair 10 and the laundry bin 32 are illustrated as unitary, solid articles wherein the rattan-like panels are integrated with their respective frames. However, it is appreciated that in accordance with modifications thereof, the articles may be manufactured as frames with appropriate apertures formed within the frames for receiving the attachable rattan-like panels. Such attachment may be fixedly attaching e.g., ultrasonic welding, adhering etc., or detachably attaching by various snap arrangements, as known in the art.

Furthermore, as can clearly be seen in FIG. 1C the warp and weft mimicking wicker in FIG. 1C (27 and 29 respectively) are of substantially circular cross-section whereas in FIG. 2C the warp and weft are of flattened cross-section though having at least a rounded face, i.e., mimicking willow-like wicker. It is thus appreciated that any sort of wicker-like pattern may be used and even more so the texture and color of the mimicking wicker is in fact unlimited and may vary between natural color and texture to any other entity colors and texture. Still, it is to be appreciated that the panels with which the present invention is concerned are by no means restricted to straight warp and weft mimic work but rather any form of interlacing of wicker mimicking wickerwork, i.e., the molding may be at any desired angle and not restricted to transversing at right angles.

Figure 3:
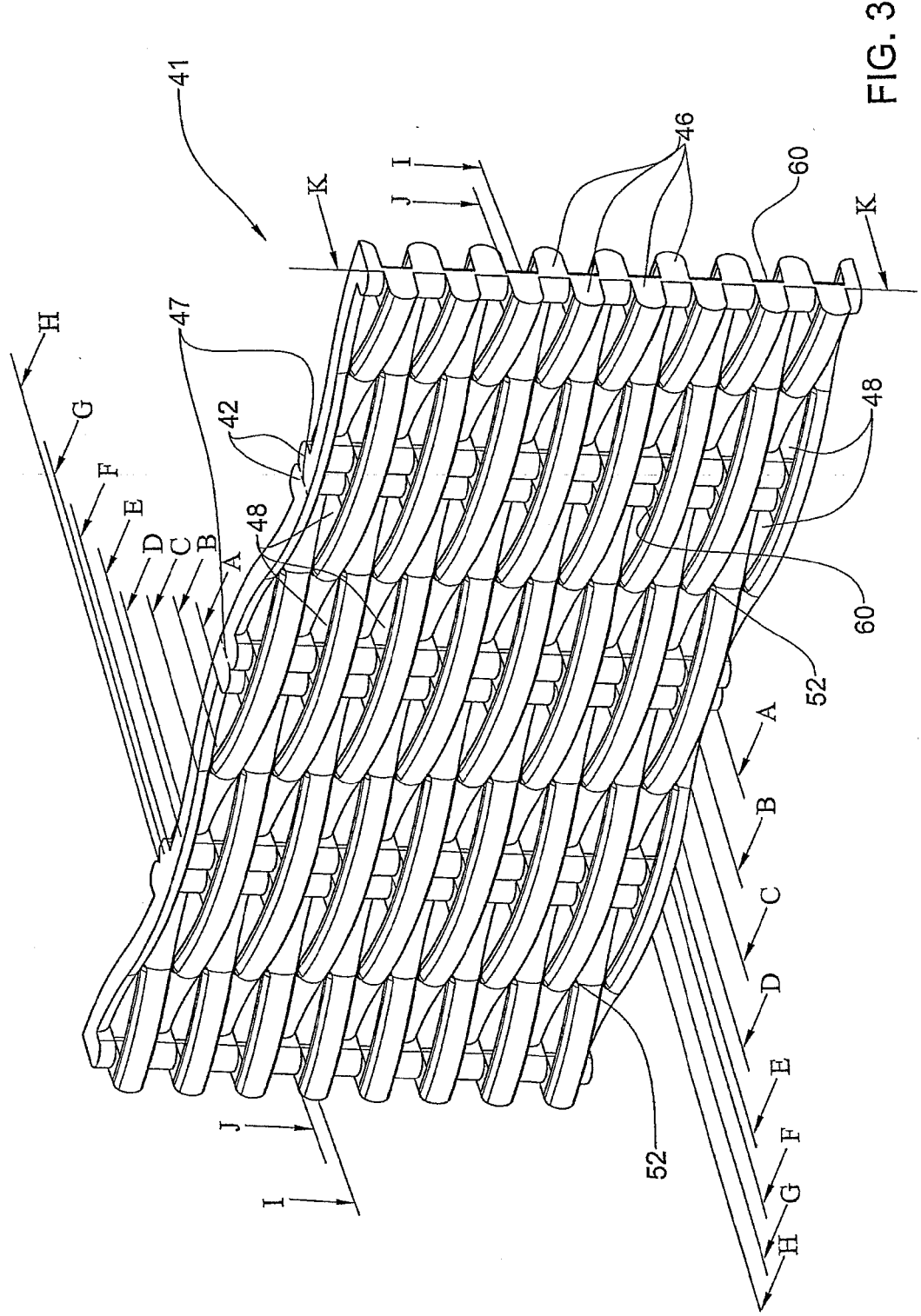
FIG. 3 is a perspective view of a portion of a rattan-like panel in accordance with an embodiment of the present invention.
Figure 4A:
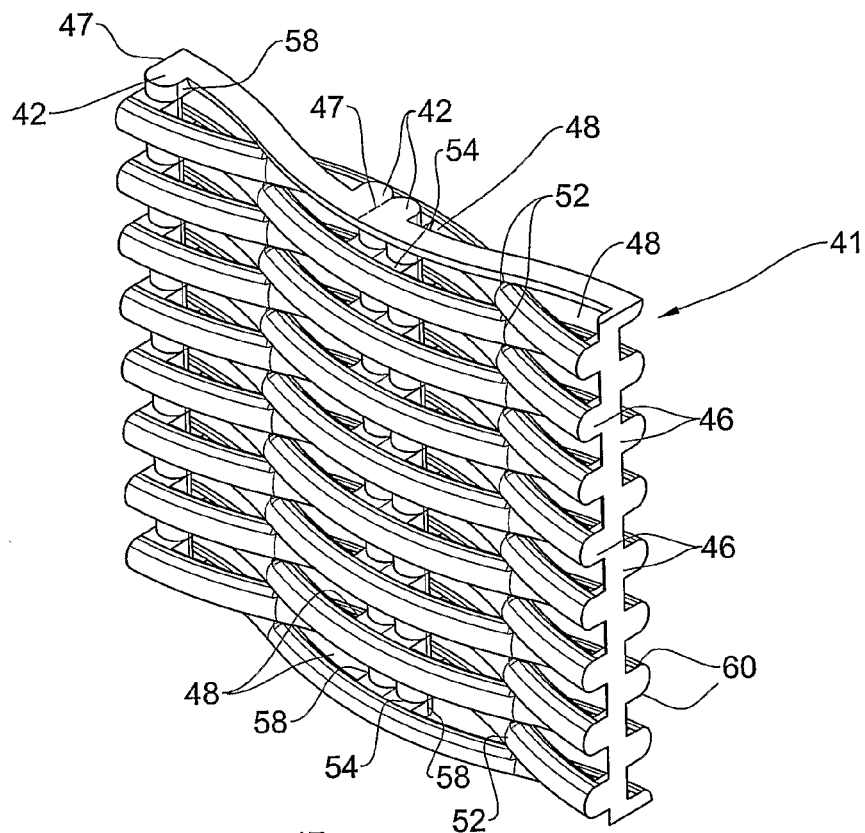
Figure 4B:
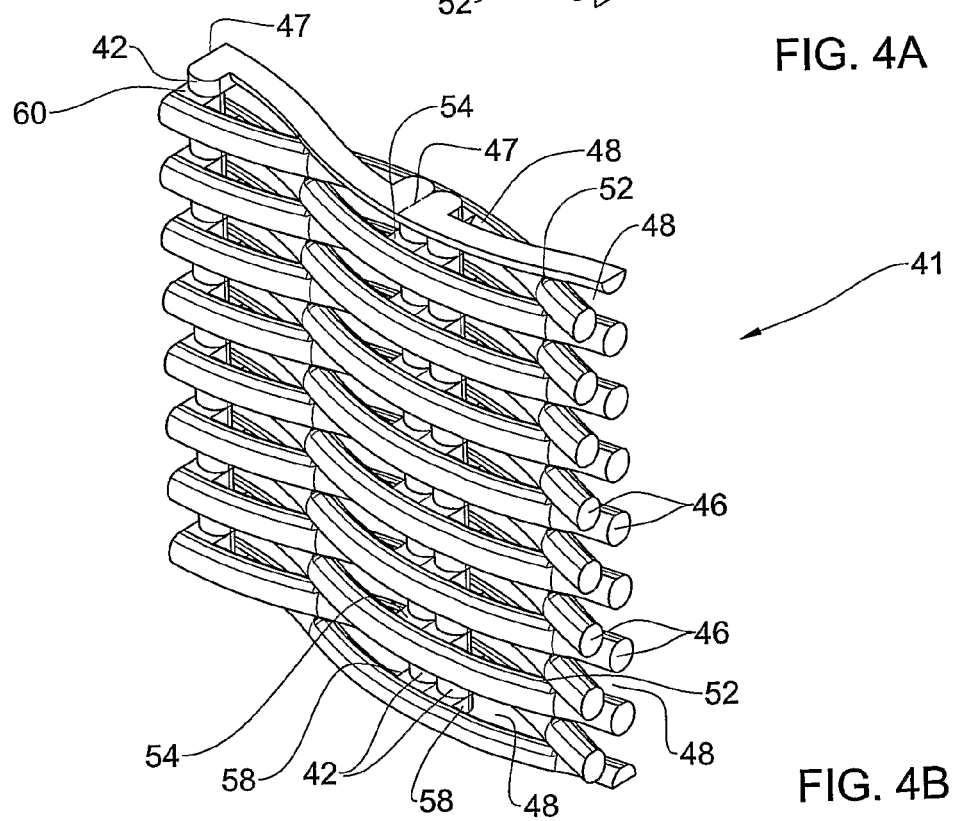
Figure 4C:
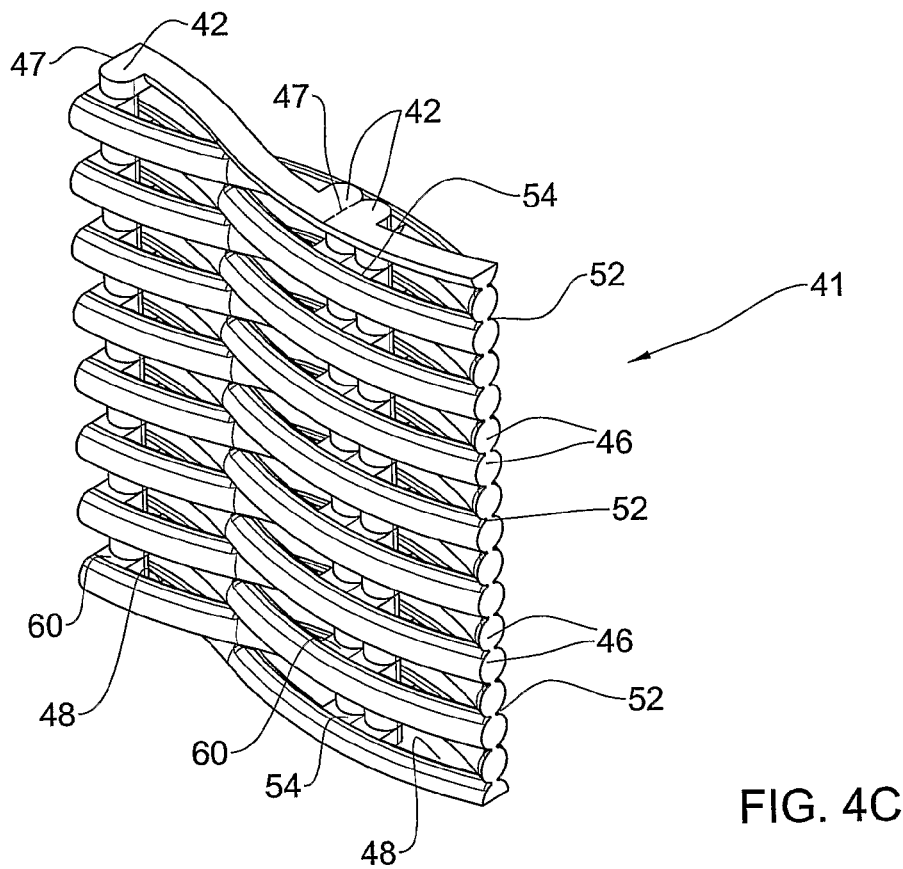
Figure 4D:
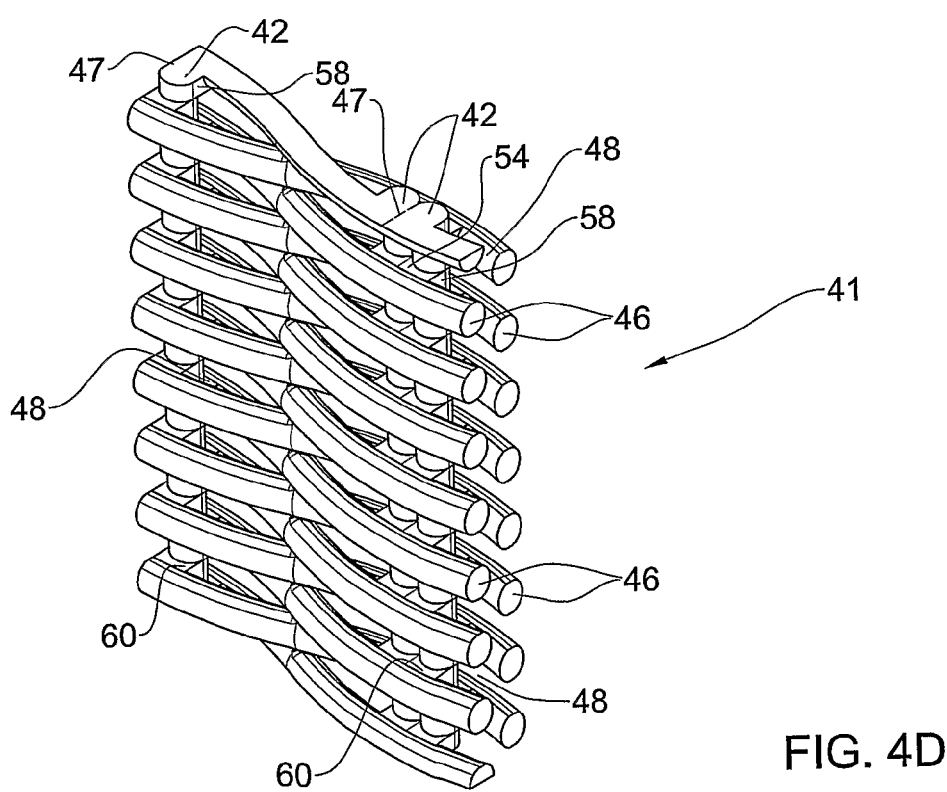
Figure 4E:
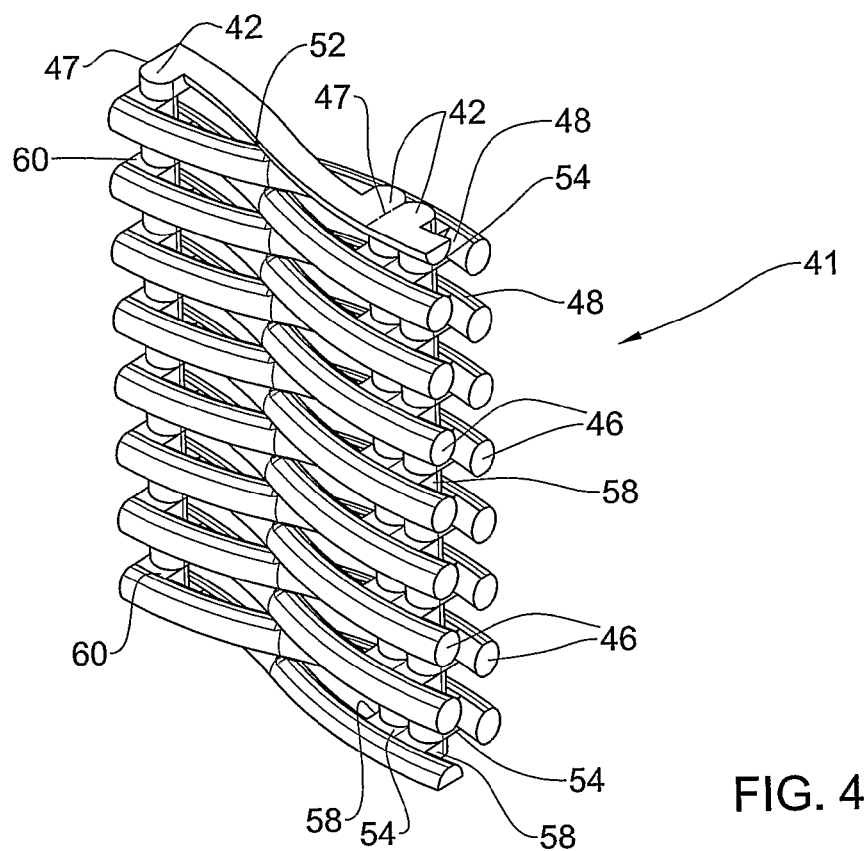
Figure 4F:
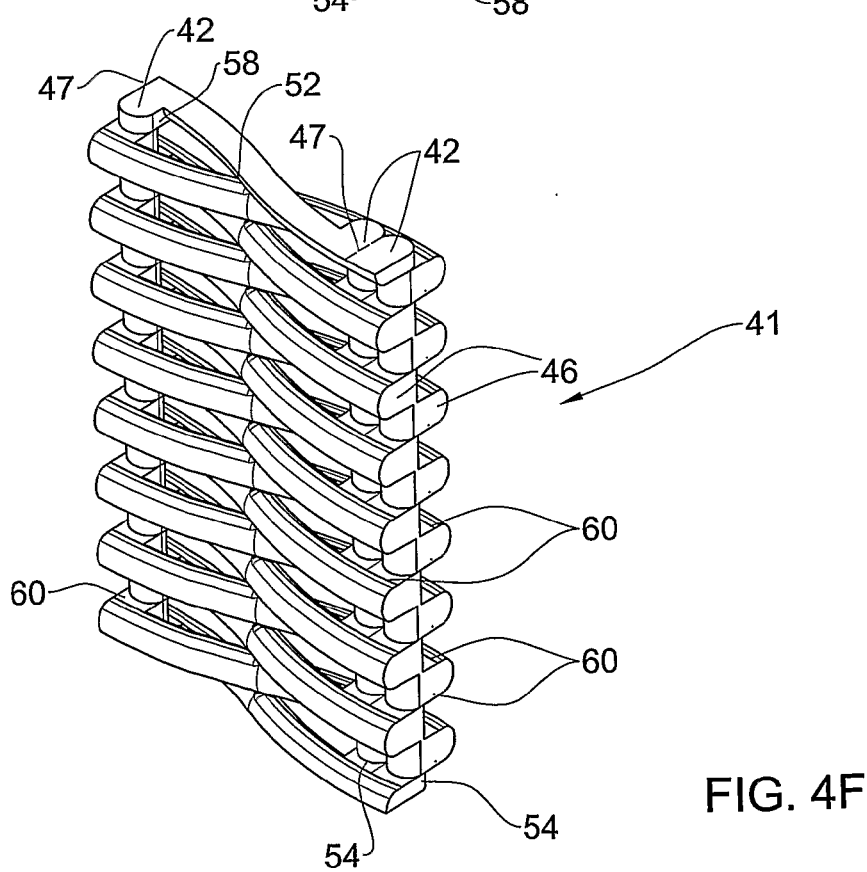
Figure 4G:
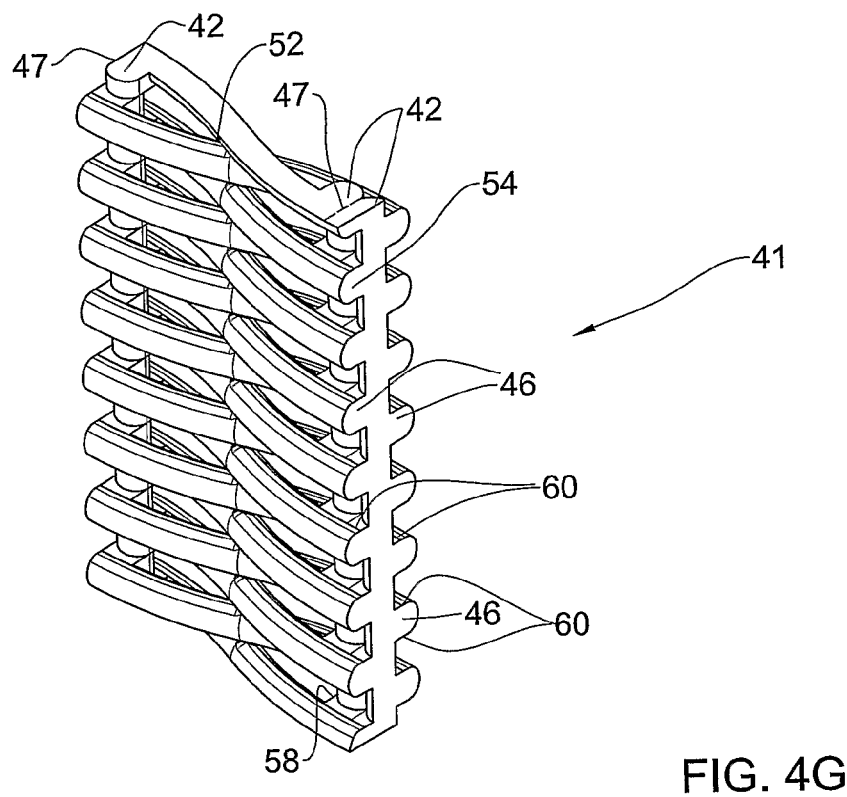
Figure 4H:
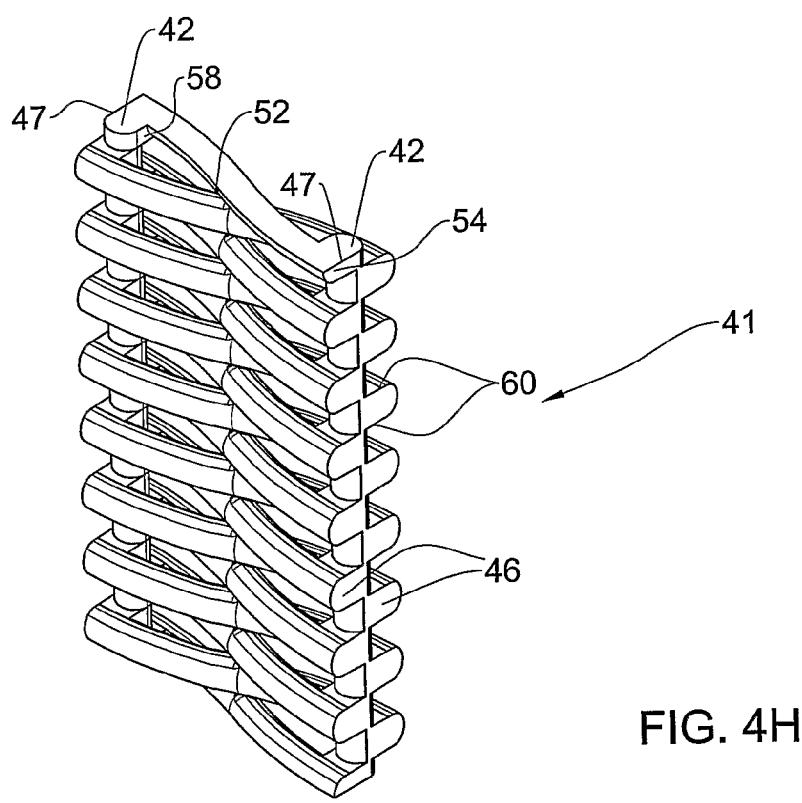
Figure 4I:
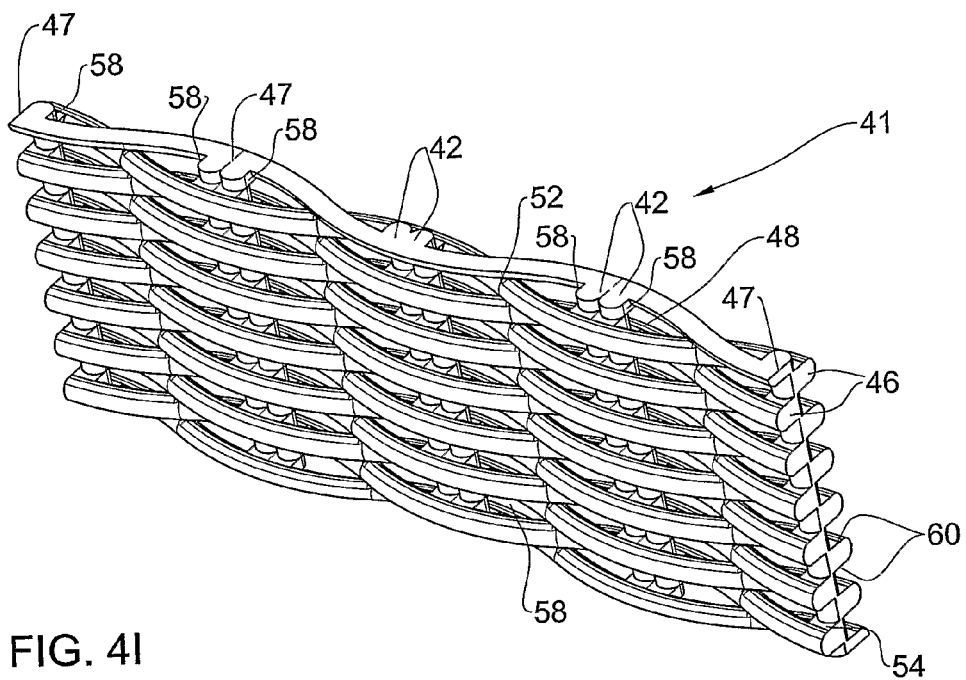
Figure 4J:
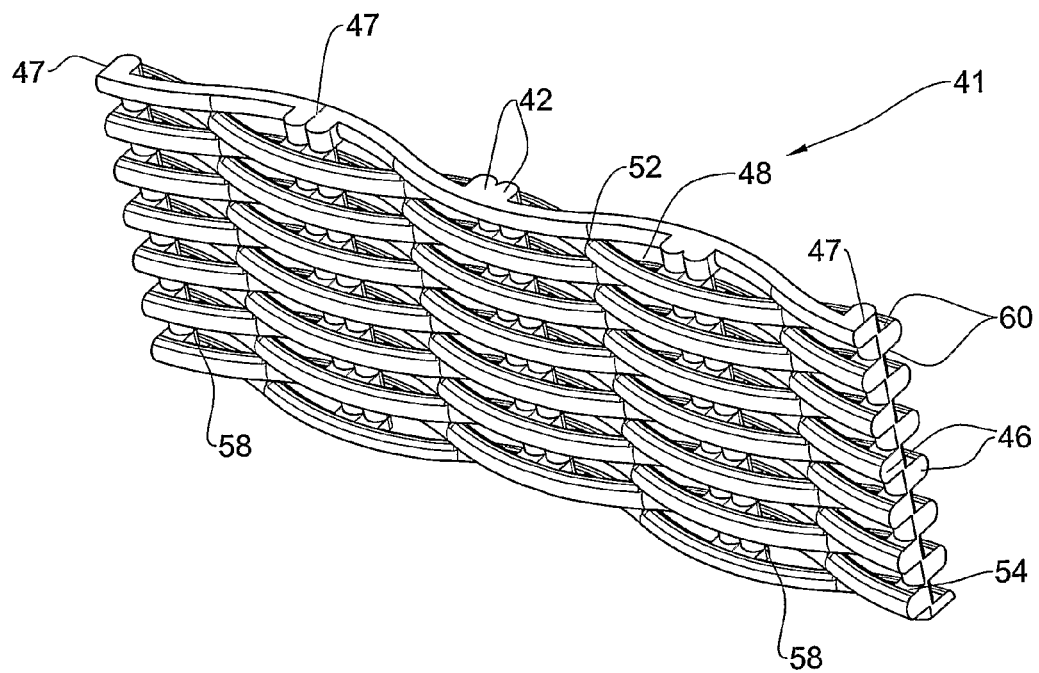

Further attention is now directed to FIGS. 3 and 4A to 4K. FIG. 3 is an isometric view of a portion of a rattan-like panel in accordance with an example of the present invention e.g., the rattan-like panels 12 and 14 illustrated in FIGS. 1A-1C.

The panel portion illustrated in FIG. 3 and generally designated 41 is illustrated at an enlarged scale to facilitate visualizing the fine structure of the molded panel. It is clearly appreciated and noticeable from the drawings that the panel is composed of integrally molded warp mimicking wickers designated throughout the drawings 42 and weft mimicking wickers designated throughout the drawings 46. In the particular example of FIGS. 3 and 4 both the warp wicker and the weft wicker are of essentially circular cross-sections, this however may vary at designer's choice.

It is further noticed, and also as discussed hereinabove, that gaps 48 extend between the wicker strands just like in natural wickerwork panels, whereby light can pass and air can flow. The gaps 48 form a continuous path extends between the undulating weft strands 46, parallel to the warp strands 42, such that said gaps are broader adjacent the warp strands 42 and narrow towards intersecting of neighboring weft strands 46.

Further noticed through FIGS. 4A to 4K, the warp wicker strands 42 are in the form of substantially straight elongate parallel strands arranged in adjoining pairs which are in fact integral with one another along an imaginary line 47. However, rather than the paired warp strands, there may be single warp strands, or any other desired number. The weft wicker strands 46 are single strands undulating over and under the two warp strands 42, wherein neighboring weft strands 46 interlace the warp strands 42 at opposite sides thereof such that the weft strands 46 have an undulating, wave-like pattern and wherein each two neighboring weft strands 46 appear to be loose along their length, however apart from a point of intersection 52 of two neighboring weft strands 46 (best seen in FIG. 4C) and at portion 54, where the weft strands 46 extend integrally over the warp strands 42 (best seen in FIGS. 4E to 4K). This arrangement imparts to the panel 41 an appearance of natural wickerwork with improved mechanical properties and making it possible to be manufactured in a single mold process.

Upon careful inspection of the drawings, in particular FIGS. 4A to 4K it is noticeable that the warp strands 42 and the weft strands 46 do not have "undercuts" i.e., the side wall portions 58 of the warp strands 42 are substantially straight and likewise the sidewalls 60 of the weft strands 46 are straight whereby portions of the molding mold can easily be retracted, as will be explained hereinafter with reference to FIGS. 5 to 7.

It is noticeable from FIGS. 3 and 4 that each undulating weft strand 46 is integrally molded at its intersecting locations with warp strands 42.

Figure 5A:
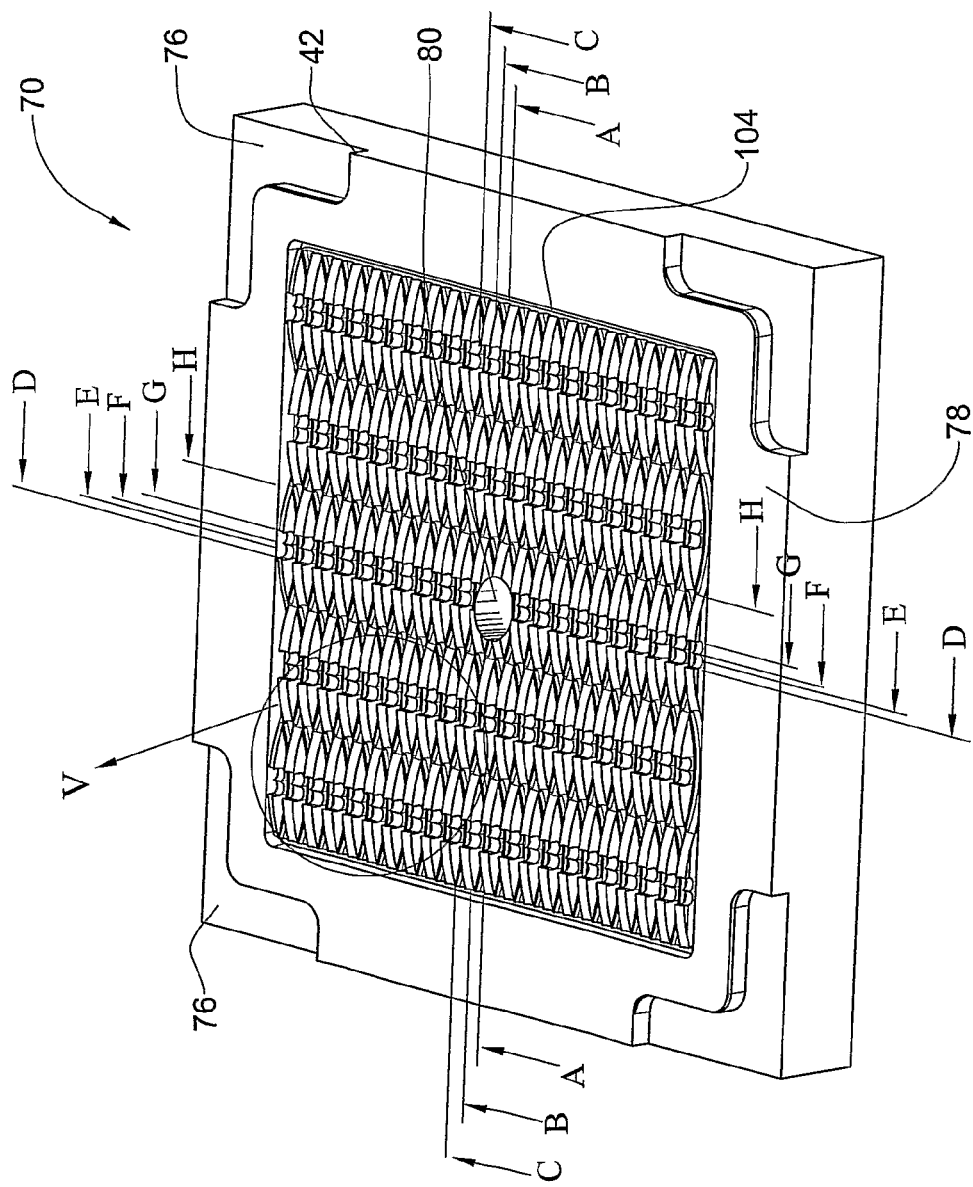
FIG. 5A is an isometric view of a bottom mold member suitable for molding a rattan panel in accordance with the embodiment of FIG. 3, the second mold member being substantially a mirror image thereof.
Figure 5B:
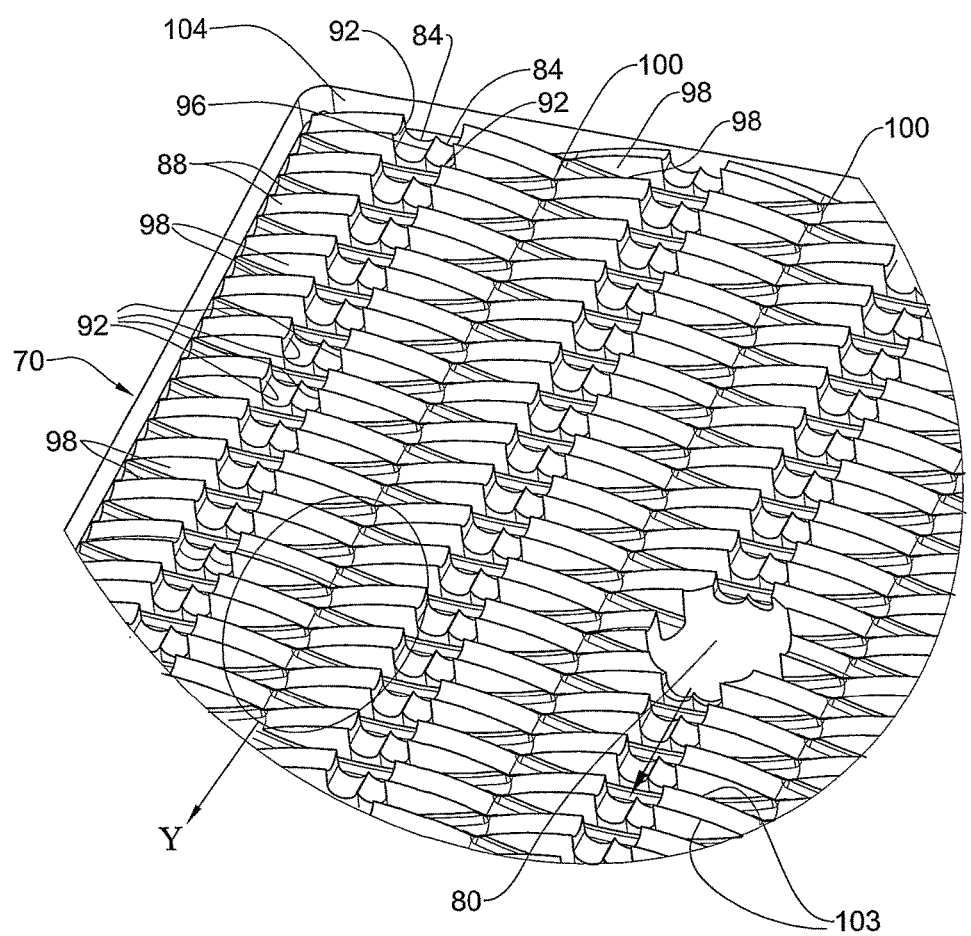
FIG. 5B is an enlargement of the portion marked V in FIG. 5A.

Further attention is now directed to FIGS. 5 to 7 directed to a mold suitable for molding a rattan-like panel of the type disclosed in connection with the previous figures. FIG. 5A is a perspective view of a first mold member designated 70, a second mold member (not shown) being substantially a mirror image thereof, there being provided suitable means for tight adjoining of the two mold members (first and second mold members) to one another and true position therebetween in the form of L-like projections 76 suited for tight nesting within corresponding receptacles formed in the first mold member (not shown). The arrangement is such that upon assembling the two mold components, the surfaces 78 are flush with one another thereby the molten material cannot escape from the mold. Furthermore, the first mold member 70 is formed with an inlet port 80 for ingress of molten material. In the particular example the inlet 80 is centrally positioned within the mold member 70. However, in accordance with different embodiments the inlet port may be otherwise positioned or, several such inlet ports may be provided to provide for uniform and homogenous flow of the molten material into the voids between the first and second mold members, e.g., first and second mold members of which one or both are movable.

The mold member 70 is formed with a plurality of grooves which together with the second mold member (not shown) form the shape of the rattan-like panel to be molded, as discussed in connection with FIGS. 3 and 4. Thus, the mold member 70 is formed with a plurality of trough-like warp grooves designated 84 and a plurality of weft trough-like grooves 88. It is noticed that the warp-grooves 84 are formed with substantially straight and upright projecting sidewalls 92 (these will result in the substantially straight walls 58 of the rattan-like panel discussed hereinabove) with a fine ridge 96 extending between the two adjoining grooves 84 which ridge will give rise to the illusion of two separate warp strands 42 of the rattan-like panel molded there out.

Following the weft grooves 88, one can notice their undulating pattern as well as their concavity. Furthermore, it is clearly appreciated that each weft groove extends between a pair of substantially vertical sidewalls 98, these being associated with the easy extraction of the mold members.

The height of the vertical wall portions 92 (best seen in FIGS. 5B and 5C) defines in fact the distance between the weft strands and the warp strands, as apparent in FIG. 3, namely the distance corresponding with the segment designated 60 in FIG. 3.

As can further be seen in the drawings a peripheral channel designated 104 is provided resulting in a frame-like member in the resultant molded product.

In addition, a flow path 100 (best seen in FIGS. 5B and 5C) extends parallel to the warp grooves 84 whereby molten material can flow into the areas of engagement of the adjoining weft strands 46, namely intersections 52 (see FIGS. 4A-4K). It is noted that the grooves 88 are delimited between blade-like edges 103 which together with the corresponding mating blade-like edges of the second mold (FIG. 7) constitute channels through which material flows to eventually form the weft strands.

Figure 5C:
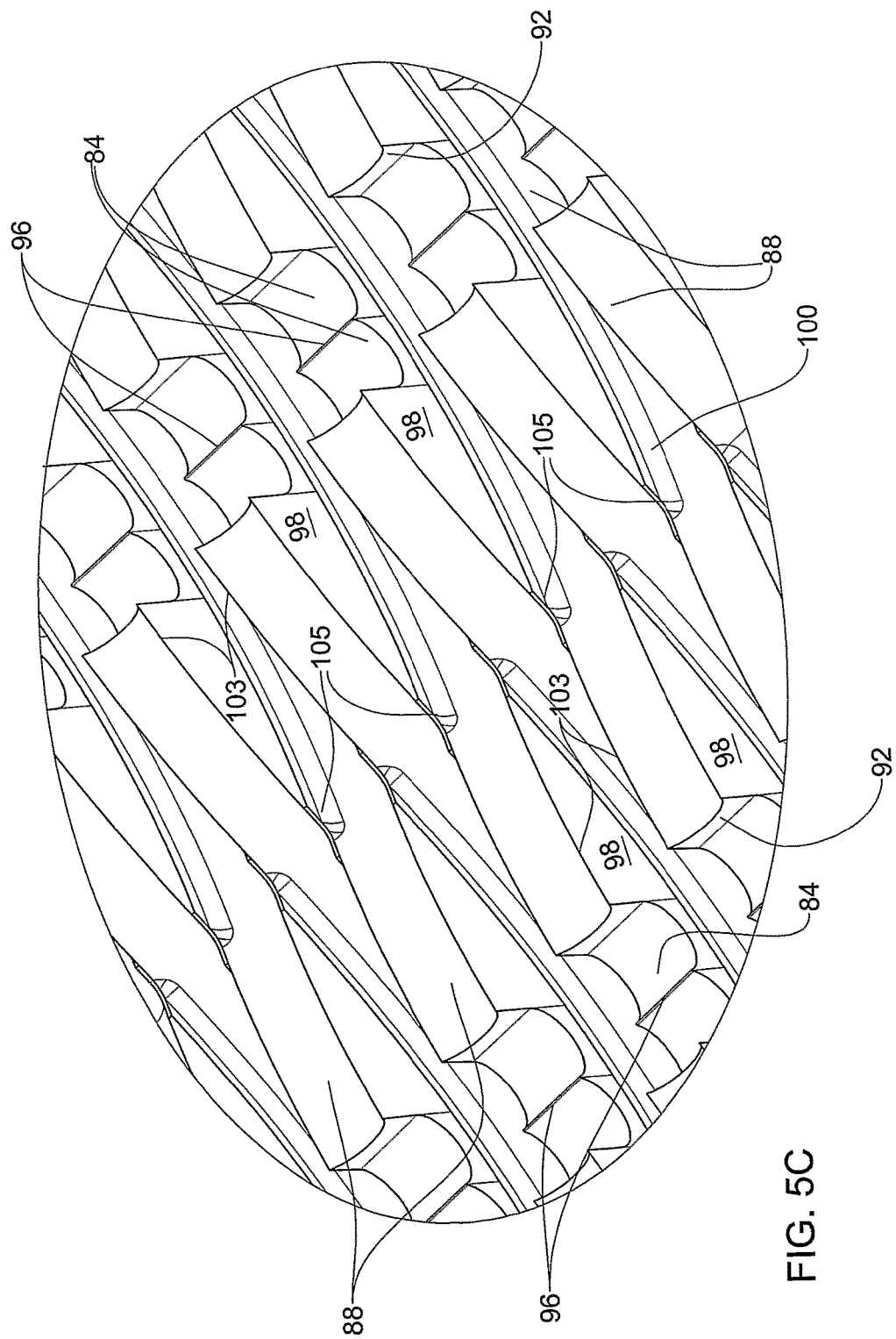
FIG. 5C is an enlargement of the portion marked Y in FIG. 5B.
Figure 6B:
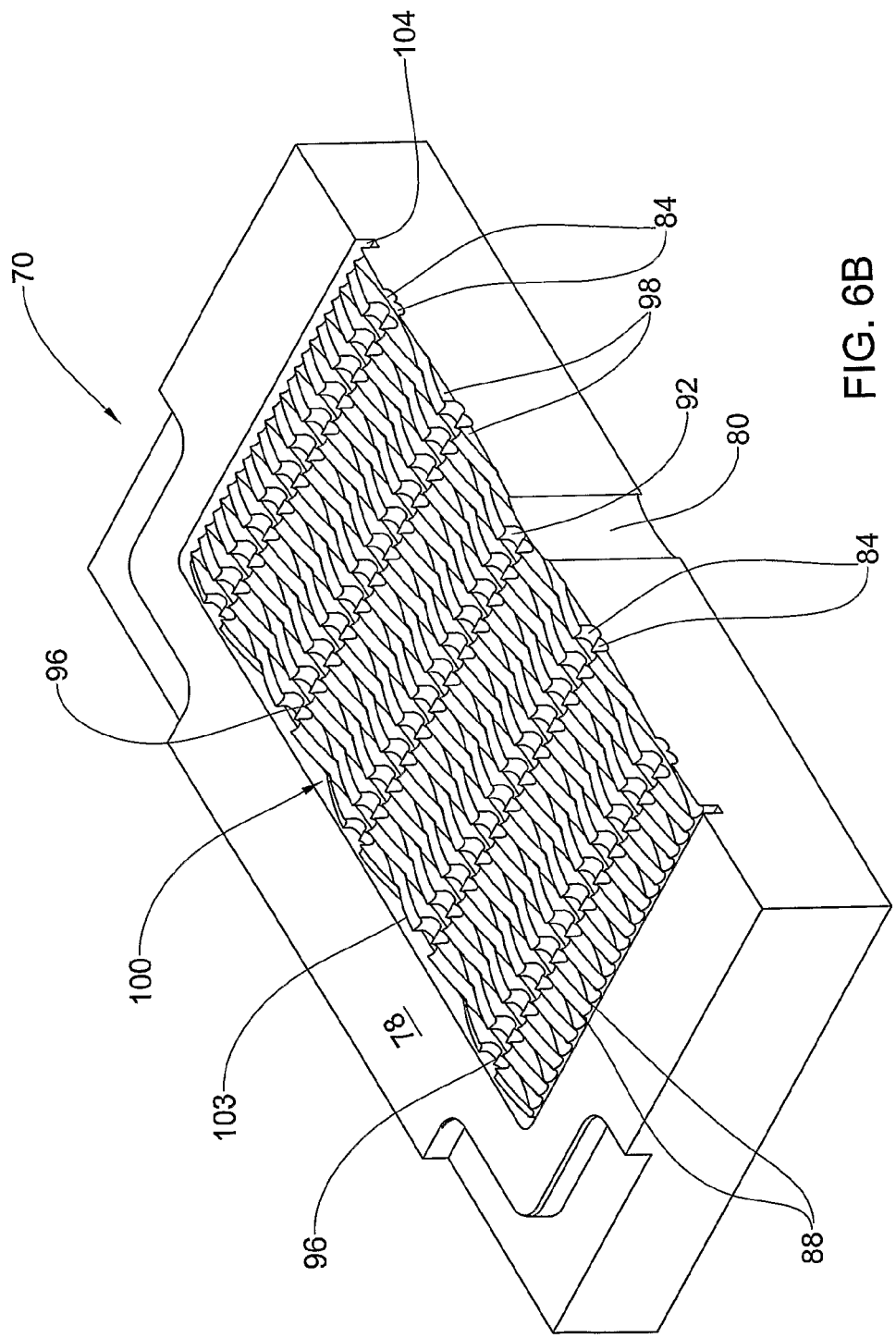
Figure 6C:
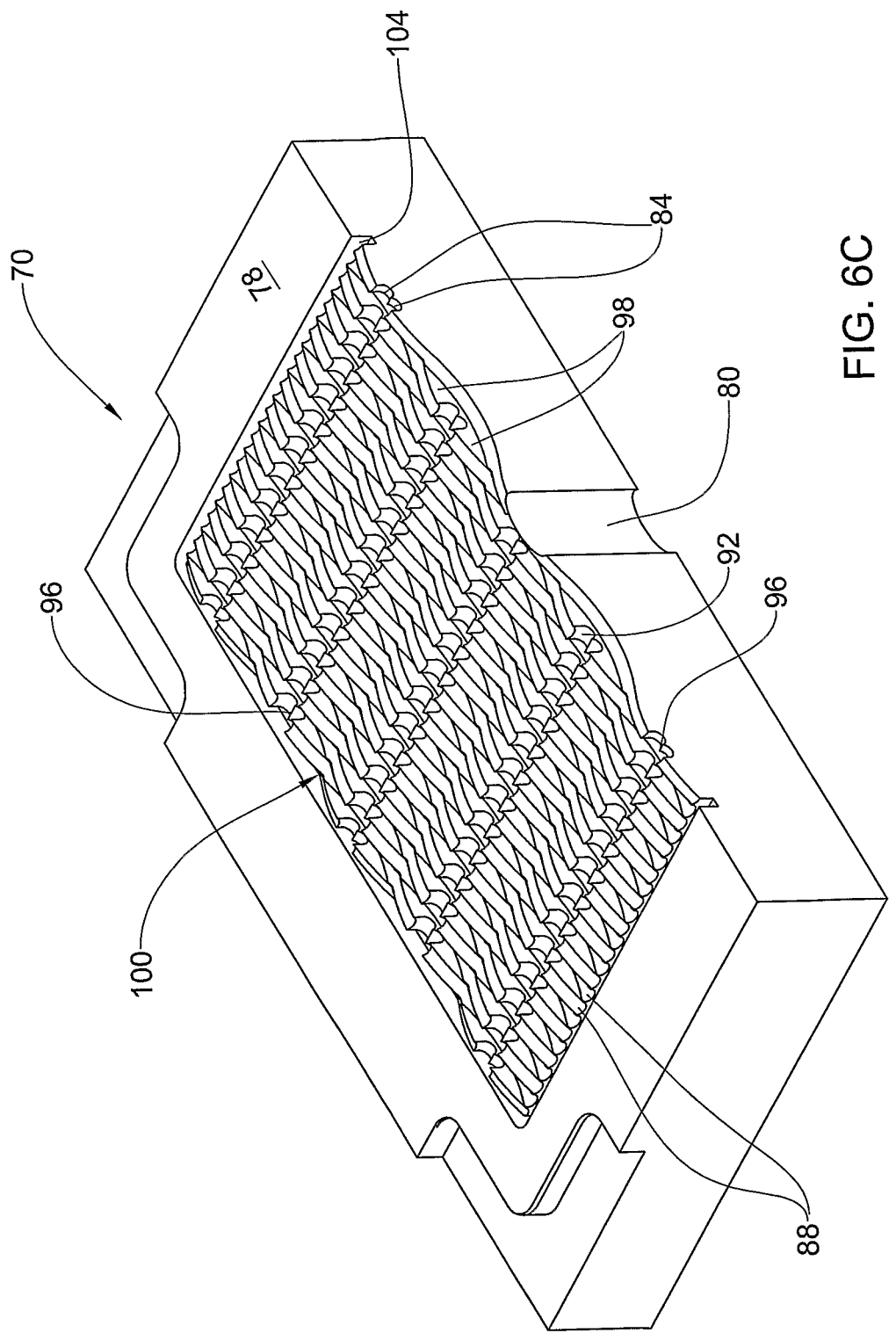
Figure 6D:
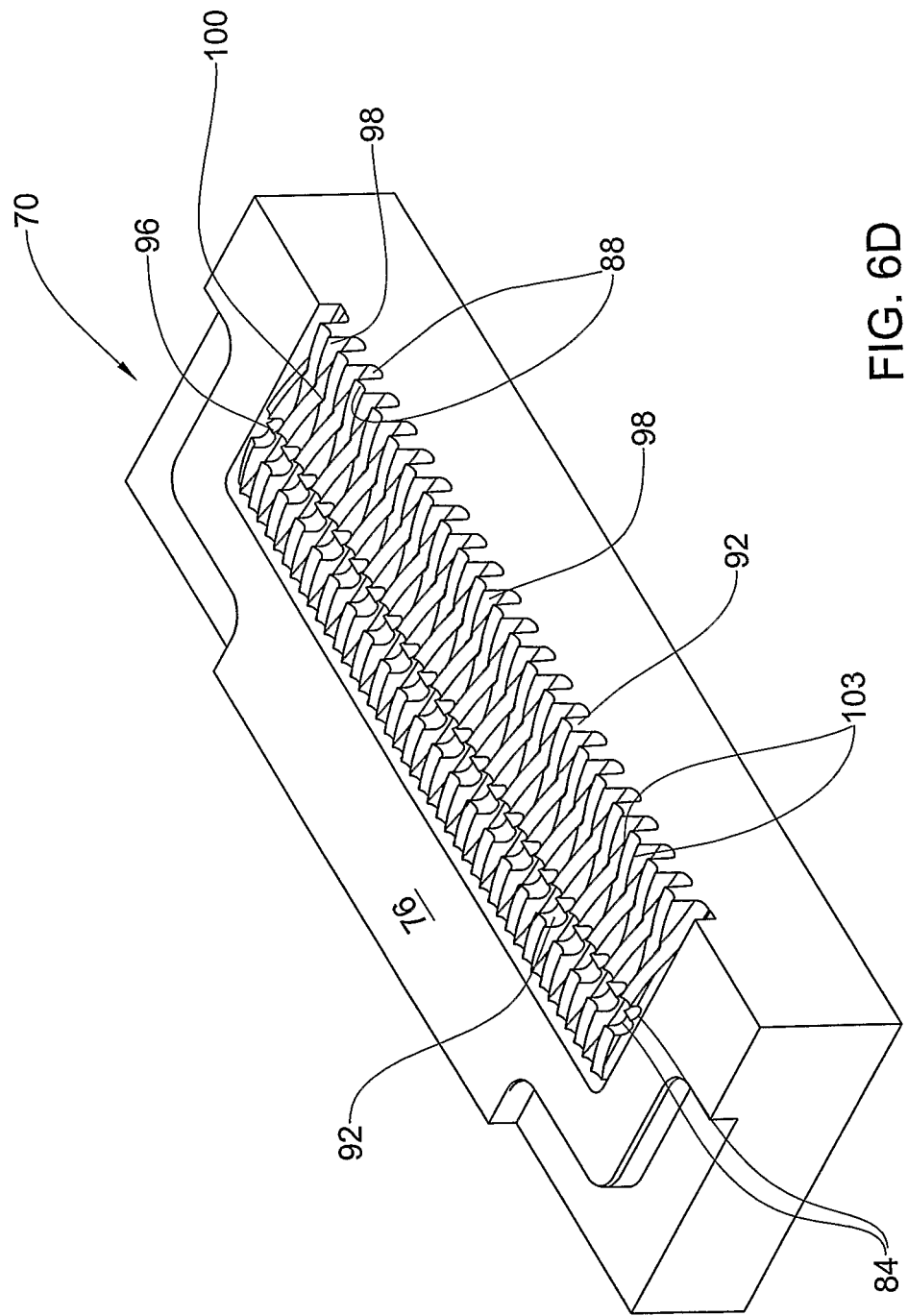
Figure 6E:
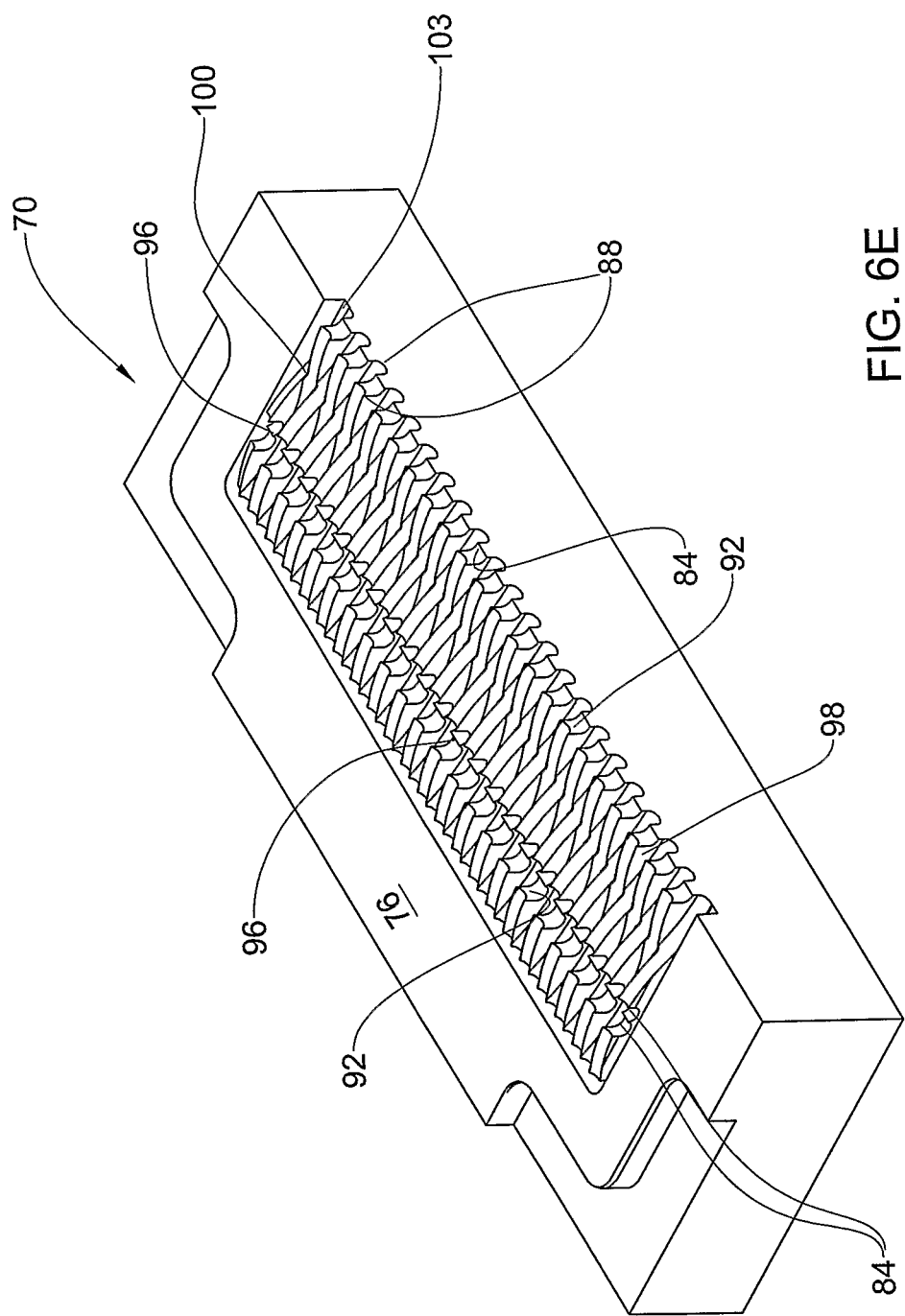
Figure 6F:
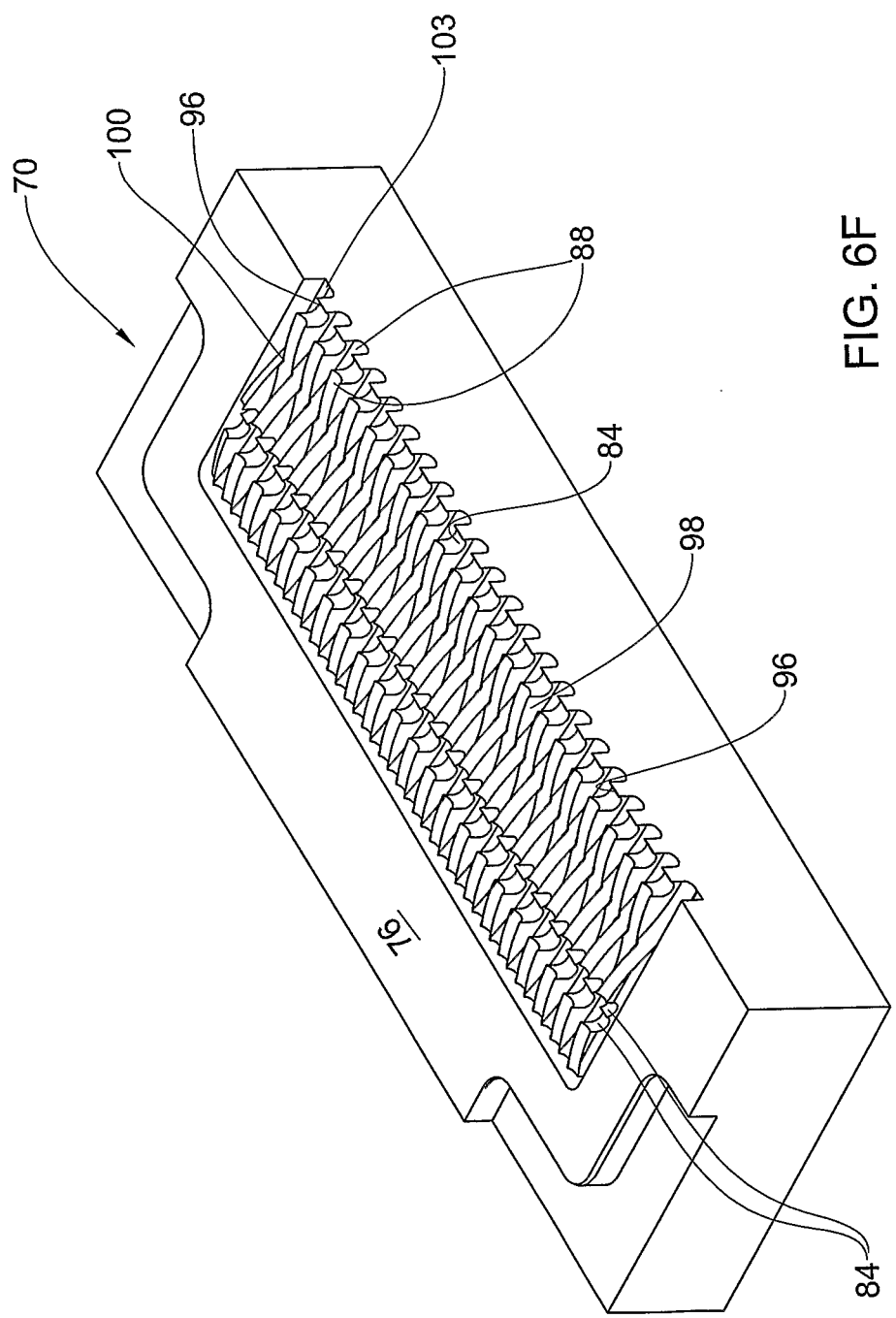
Figure 6G:
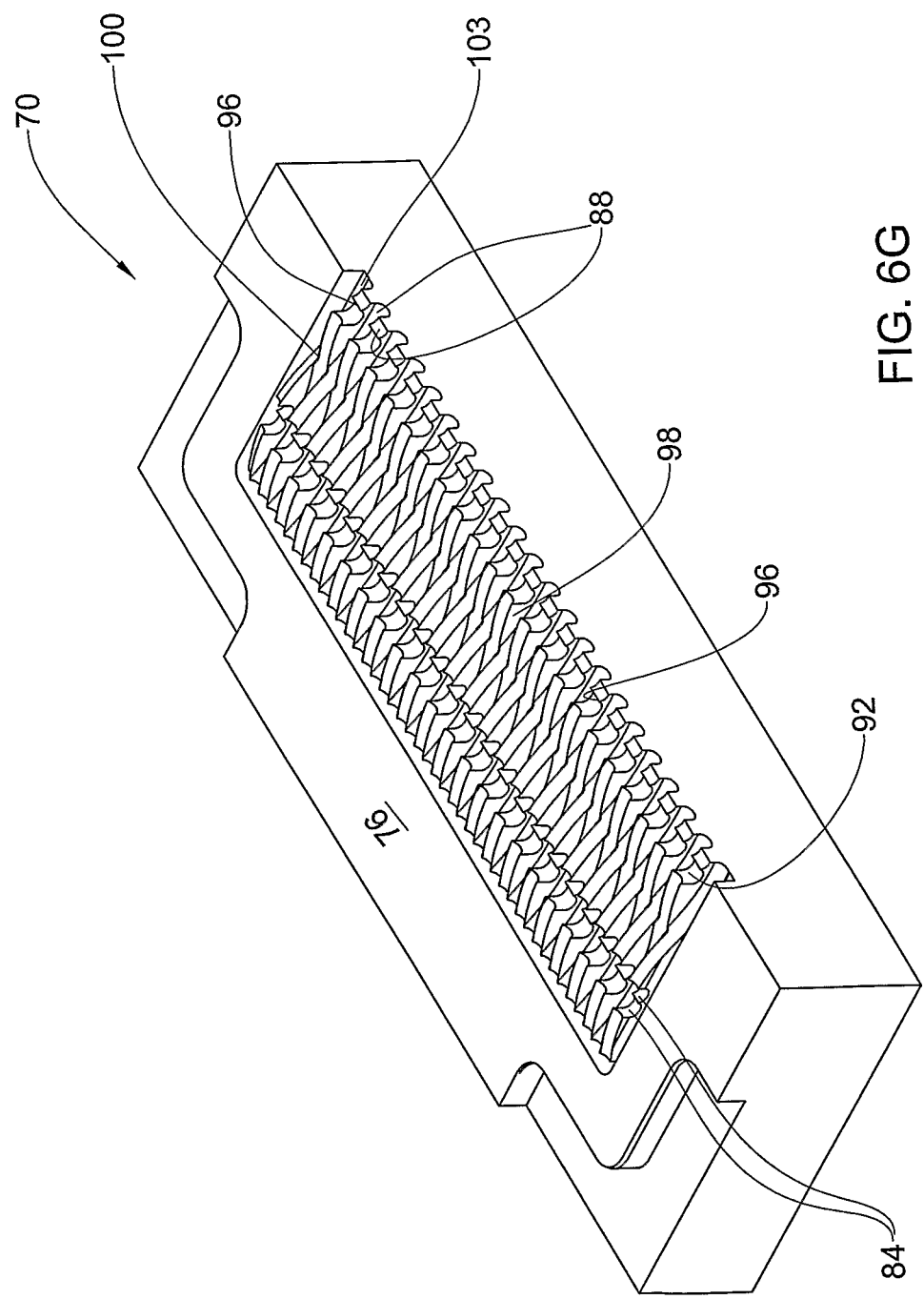
Figure 6H:
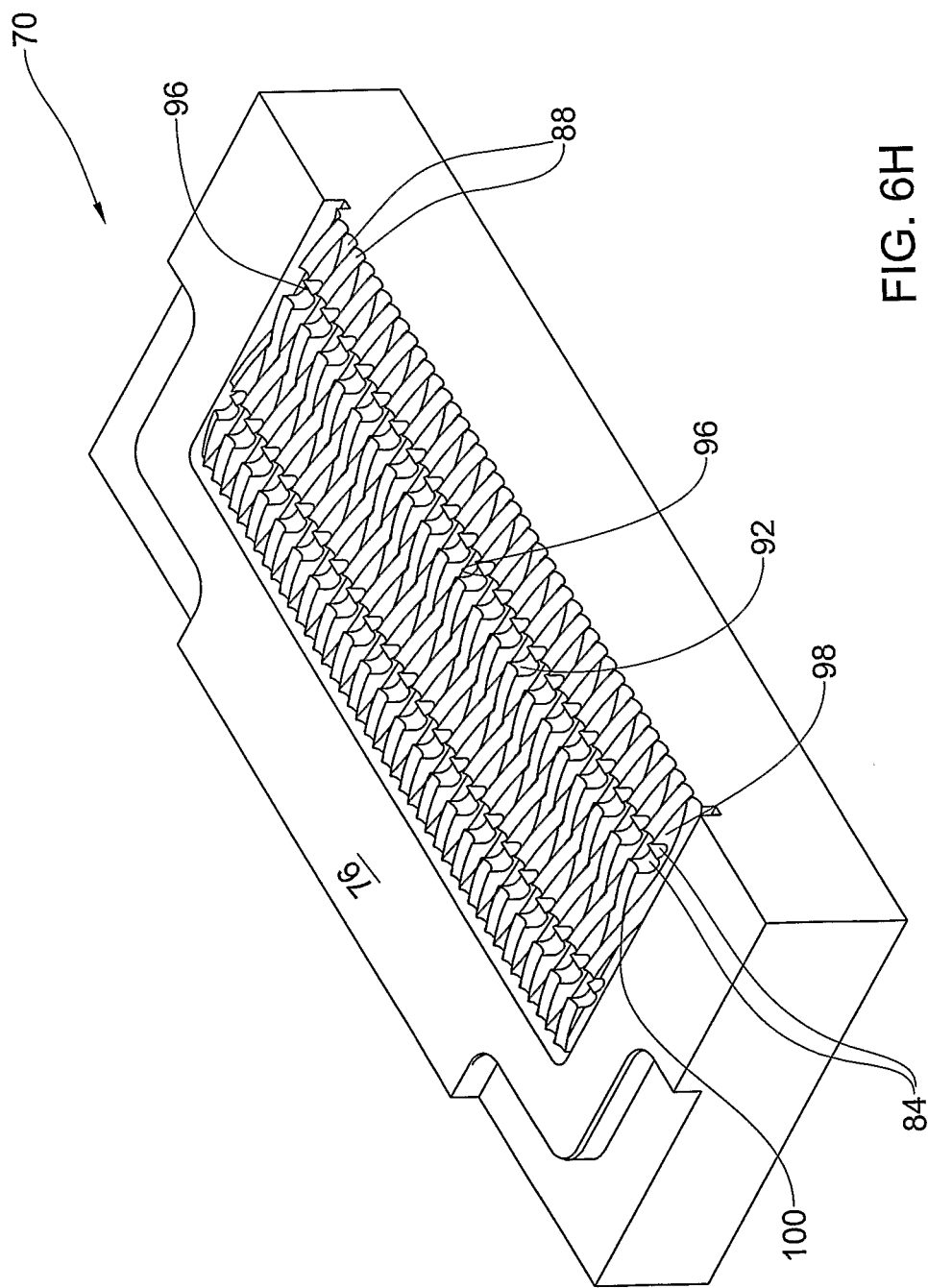

Further noted in FIG. 5C, at the intersecting location 100 of two neighboring undulating weft grooves 88 there is a thickened wall segment 105, resulting in molding an engagement segment between two neighboring strands at a rattan-like panel molded accordingly. Thus, in a mold devoid of said thickened wall segments 105 the weft strands appear to be loose from one another at the intersecting location of two neighboring undulating weft grooves.

The above features are noticed also in FIGS. 7A to 7H, each showing incremental views of a mold system generally designated 73 comprising an assembled pair of molds (second mold 70 and corresponding second mold 71), each mold substantially similar to the mold 70 disclosed in connection with the previous drawings and suited for molding a rattan-like panel of the type illustrated in FIG. 3.

Figure 7A:
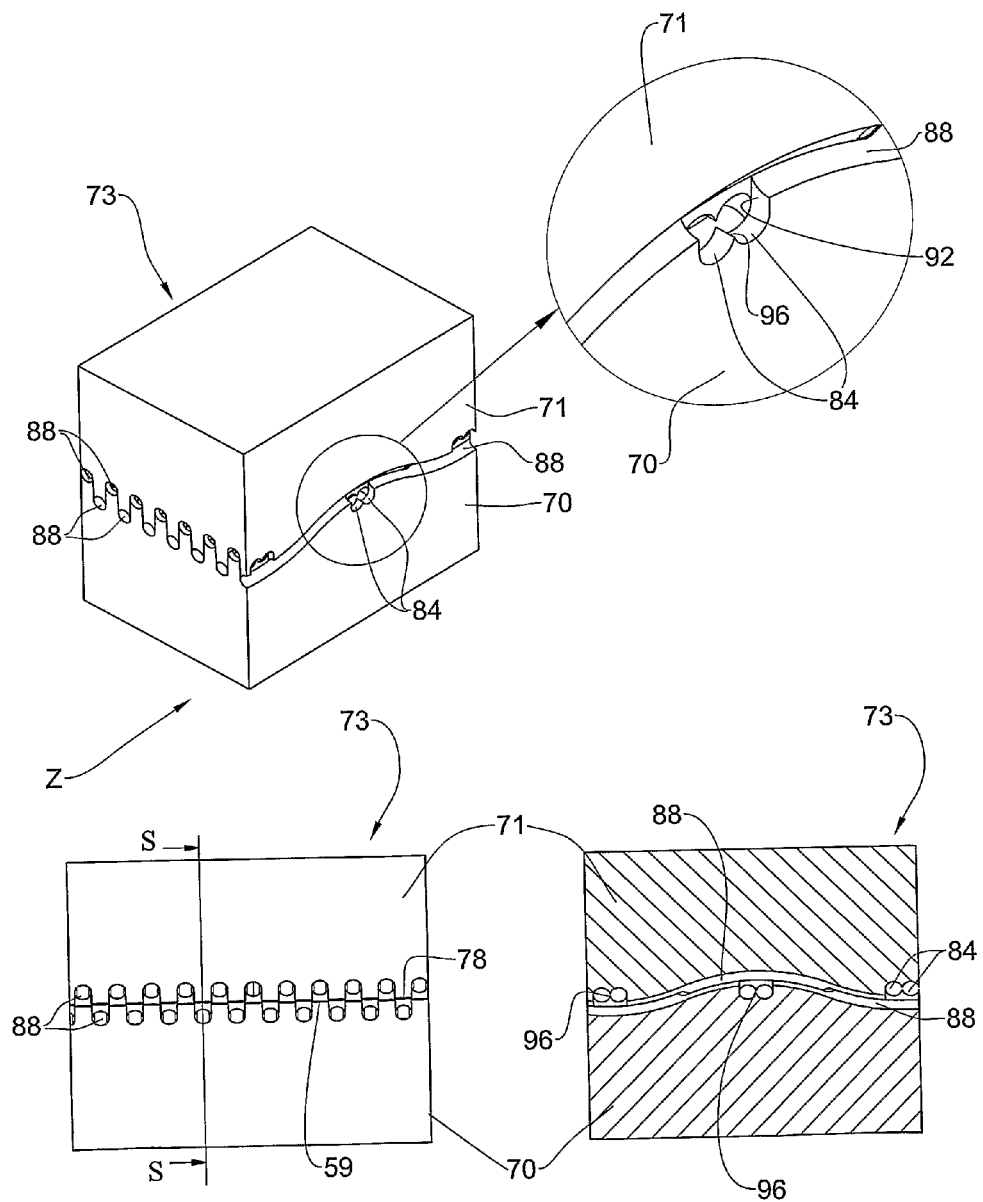
Figure 7B:
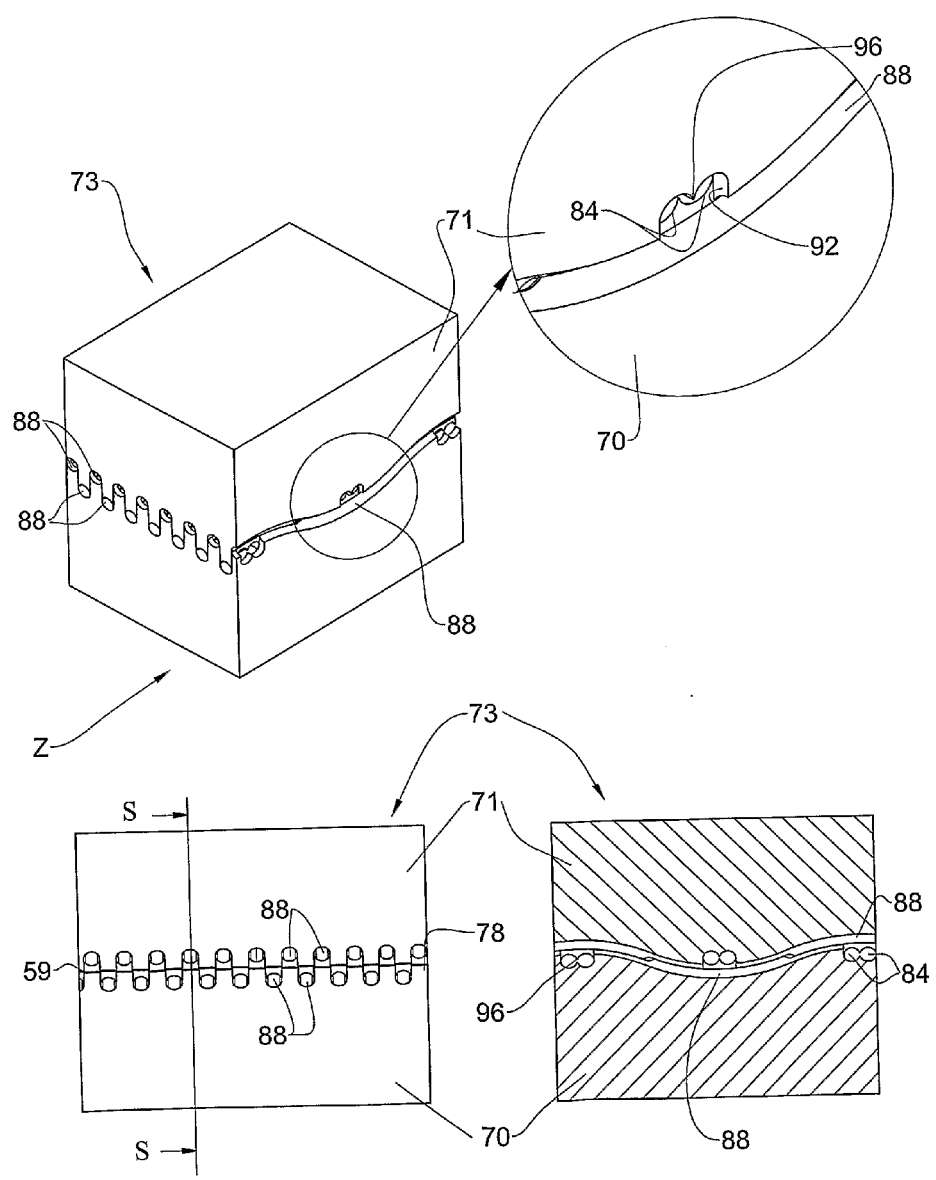
Figure 7C:
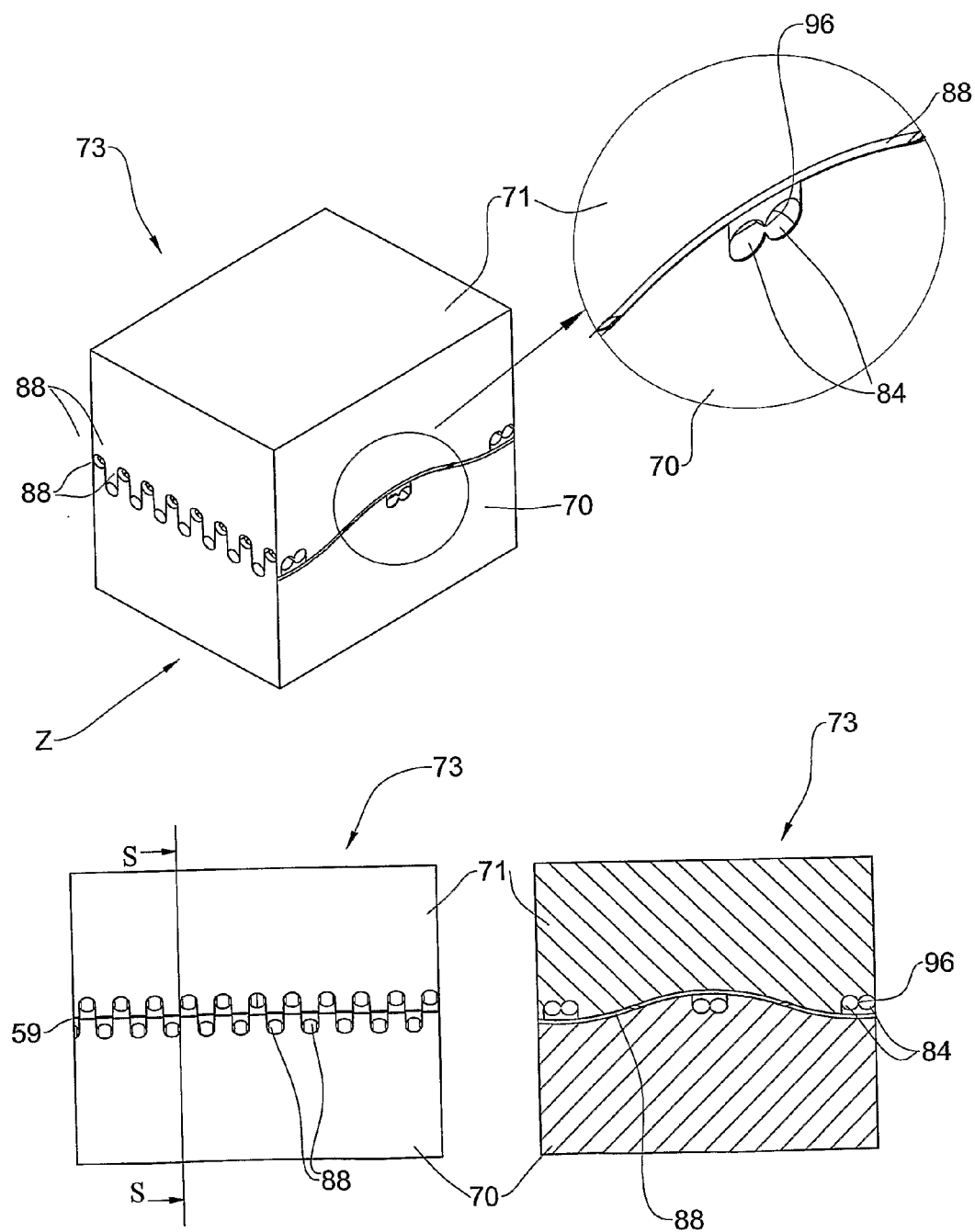
Figure 7D:
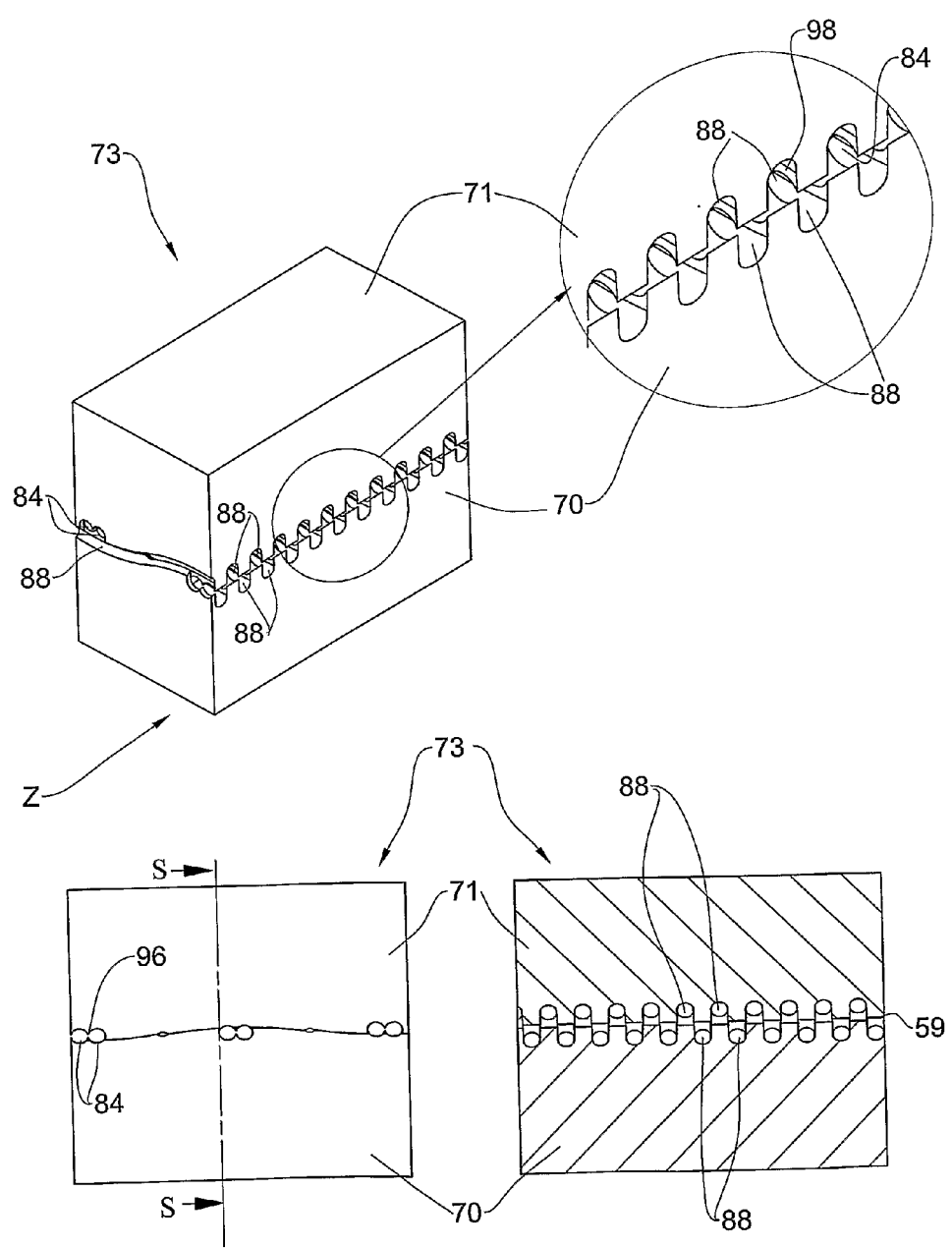
Figure 7E:
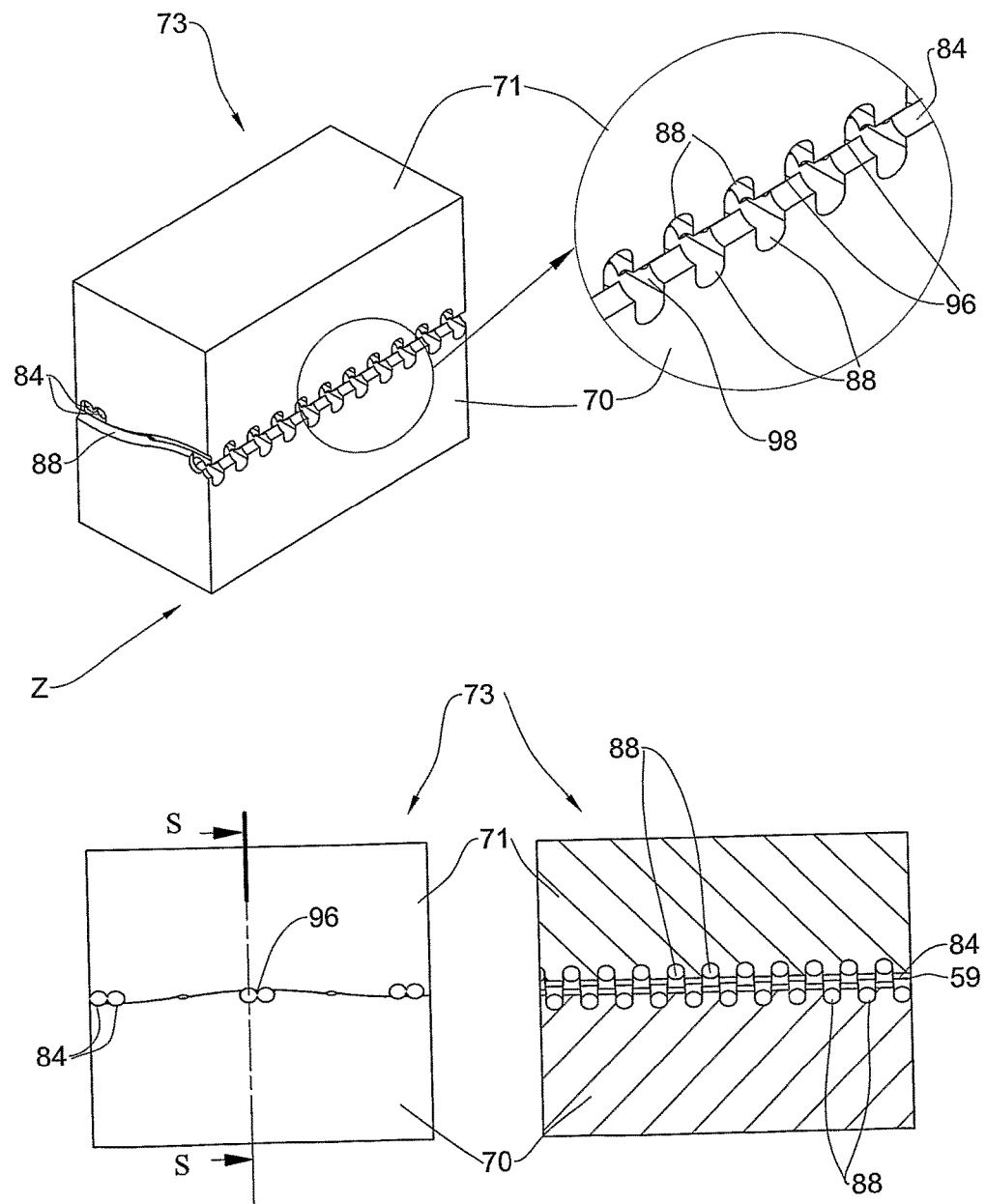
Figure 7F:
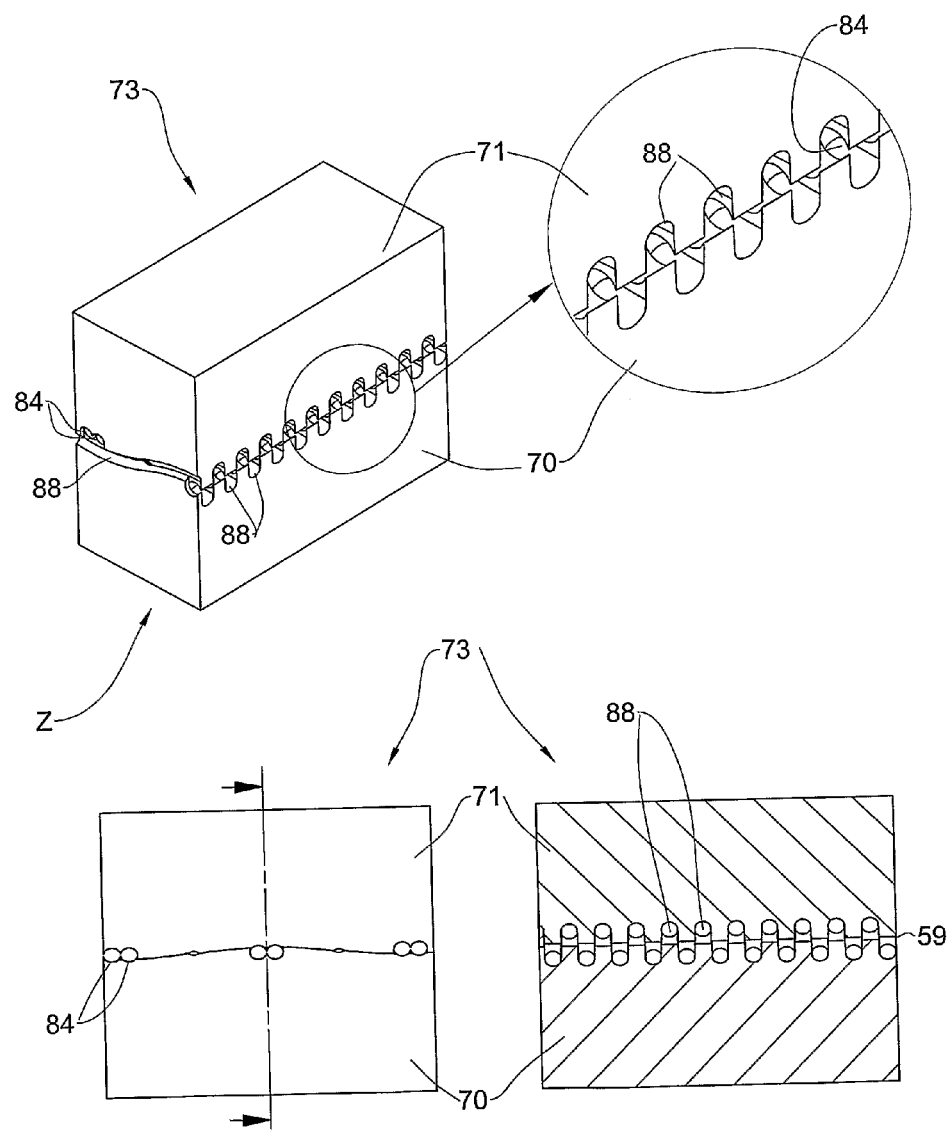
Figure 7G:
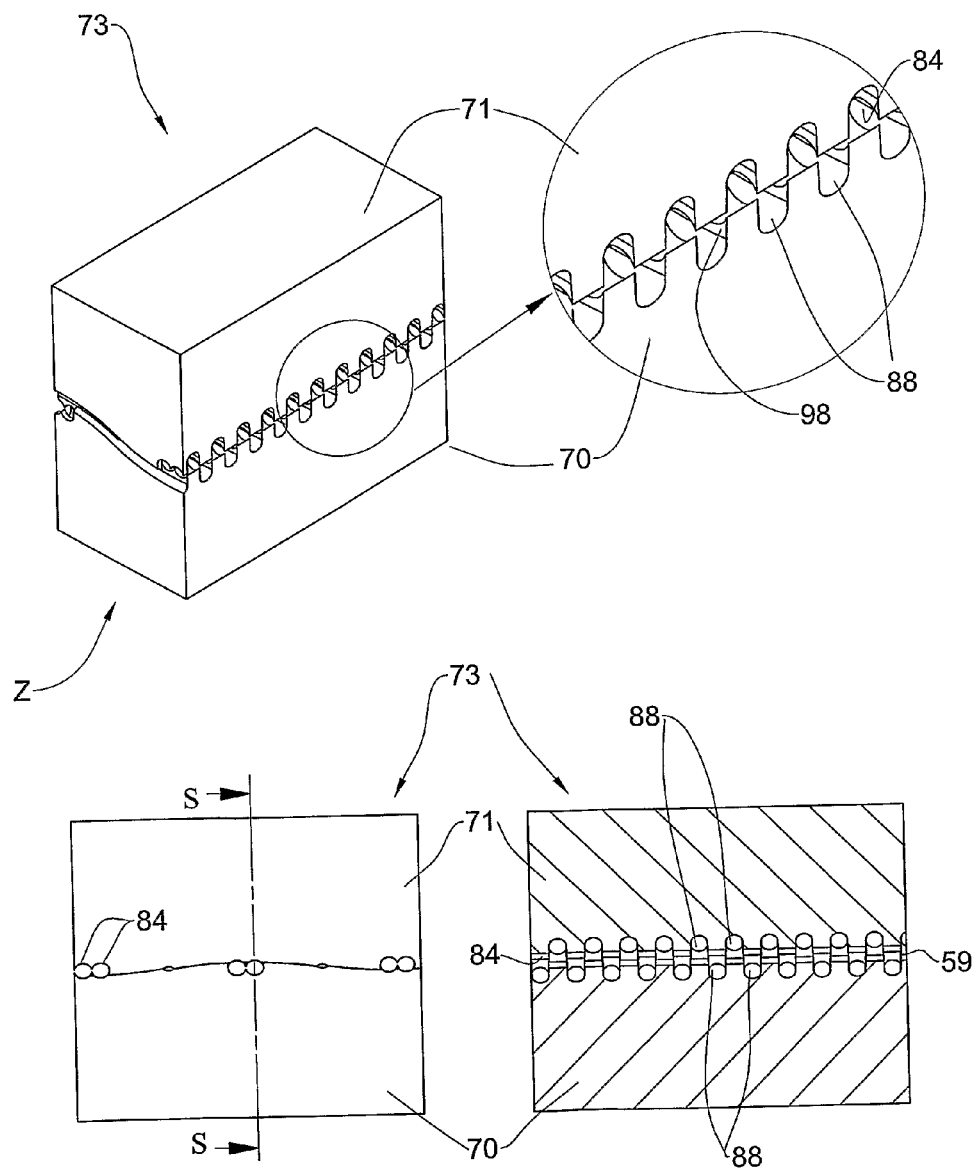
Figure 7H:
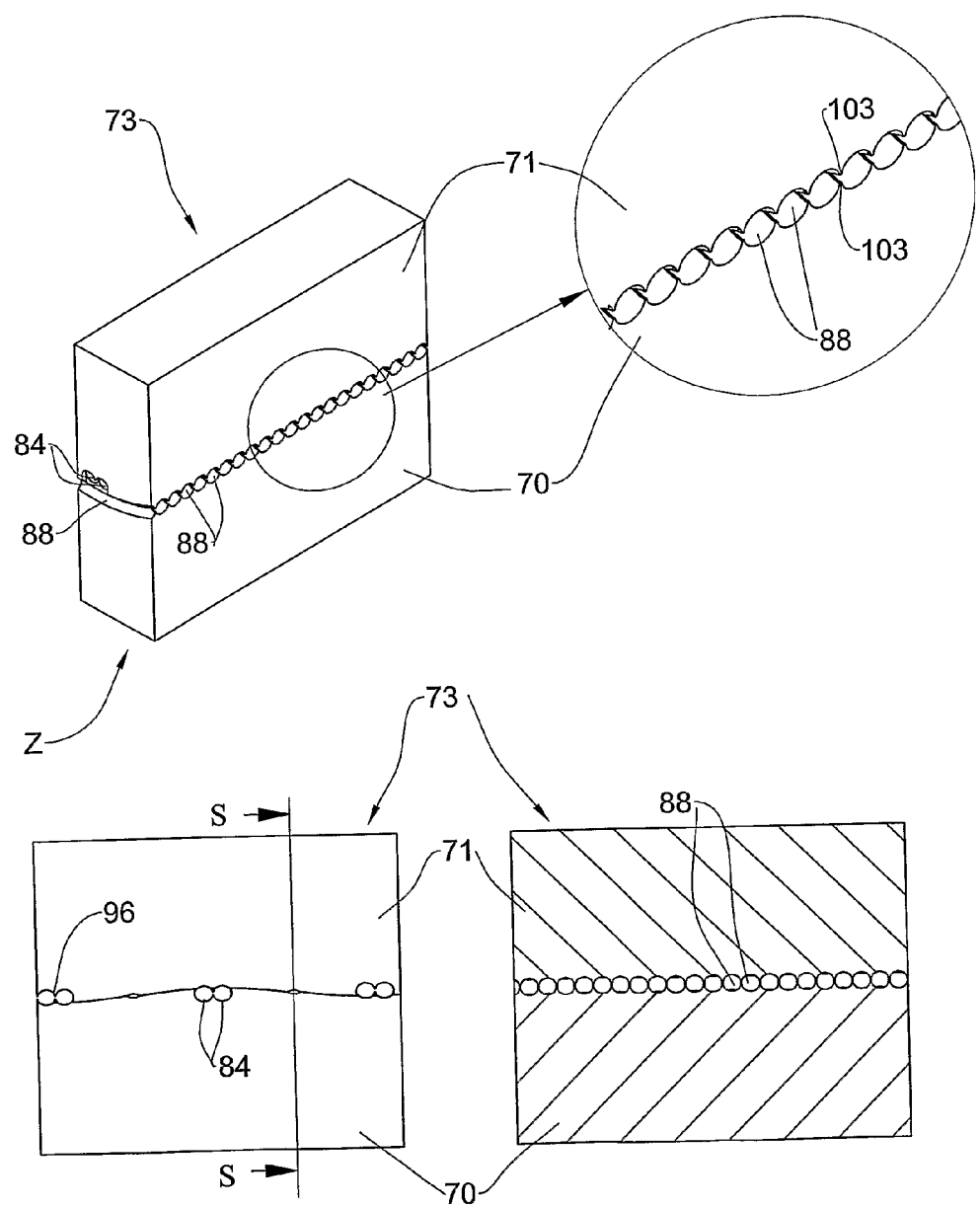

Each of the FIGS. 7A to 7H illustrates a planar view taken in direction of arrow Z indicating thereon a line of section S-S with a planar view of the surface sectioned along said line and an enlarged portion thereof. FIGS. 7A to 7C are incremental progressive sections a surface parallel to weft grooves 88 of the assembled mold 73 and FIGS. 7D to 7H are incremental progressive sections a surface parallel to waft grooves 84 of the assembled mold 73. A partition line 59 extends between the bottom mold 70 and corresponding second mold 71. As previously mentioned hereinabove, a mold as disclosed hereinbefore may be used for molding a rattan-like panel which may be used for various stand-alone articles or it may be used as embedding within different article elements e.g., furniture articles and the like, as will be exemplified with reference to FIG. 12. Embedding of a rattan-like panel may be by fixedly attaching of the panel within a suitable opening e.g., by adhering, ultrasonic welding, etc., or by providing the panel or respectively, the receiving frame, with suitable attaching means in the former case, the mold thus be provided with suitable fasteners for securing the rattan-like panel to the respective opening.

Where the article molded is a finalized article, e.g., chair as in FIGS. 1A-1C or a laundry basket as in FIGS. 2A-2C, design should take into consideration various molding aspects and in particular flow of the molten material and the extraction of the mold parts from one another namely prevent design which comprises undercut and allow for appropriate extraction of the mold components respectively.

Further attention is now directed to FIGS. 8 and 9A to 9G directed to a rattan-like panel in accordance with a different design of the present invention generally designated 120. In fact, the panel 120 mimics a willow-like panel since the wicker strands are flattened as compared with those of the embodiment of FIGS. 3 and 4 and conform with those used in connection with the laundry bin illustrated in FIGS. 2A to 2C. Apart for the difference between the cross-section of the wicker, there are no substantial differences between the panel 120 and the panel 41 of the previous embodiment.

As can be seen in the drawings, the panel 120 is molded so as to mimic a willow-like panel composed of adjoining warp strands 124 interlacing with undulating weft strands 126 substantially in the same manner as disclosed in connection with the embodiment disclosed in FIGS. 3 and 4. As noticed in the drawings, the warp wicker strands 124 are substantially straight, elongate strands arranged in adjoining pairs which in fact are integral with one another with an imaginary partition line designated 128, in the form of a valley. The weft wicker strands 126 and single strands undulating over and below the pairs of warp strands 124, such that neighboring weft strands 126 interlace the warp strands 124 at opposite sides thereof, and whereby the weft strands 126 have an undulating, wave-like pattern. The arrangement is such that each two neighboring weft strands 126 appear to be loose along their length (i.e., at their respective longitudinal edges). It is however apparent that at a portion 132 where the weft strands 126 extend over the warp strands 124 there is a thickened weld composed of the thickness of both the weft and warp strands. Furthermore, according to the present example there exists an imaginary line 130 at the point of intersection of two neighboring weft strands 126, where at said location the neighboring weft strands have a common contact point. This contact point may avoided, depending on the depth of the cutting edges formed in the mold, as already explained in connection with the previous example, or it may be wider by the provision of a thickened wall segment (similar to wall segment 105 in FIG. 5C).

It is further noted in FIGS. 9A to 9G that gaps 135 extend between the wicker strands just like in natural wickerwork panels, whereby light can pass and air can flow. The gaps 135 form a continuous path extends between the undulating weft strands 126, parallel to the warp strands 124 such that said gaps are broader adjacent the warp strands 124 and narrow towards intersecting of neighboring weft strands 126.

Figure 8:
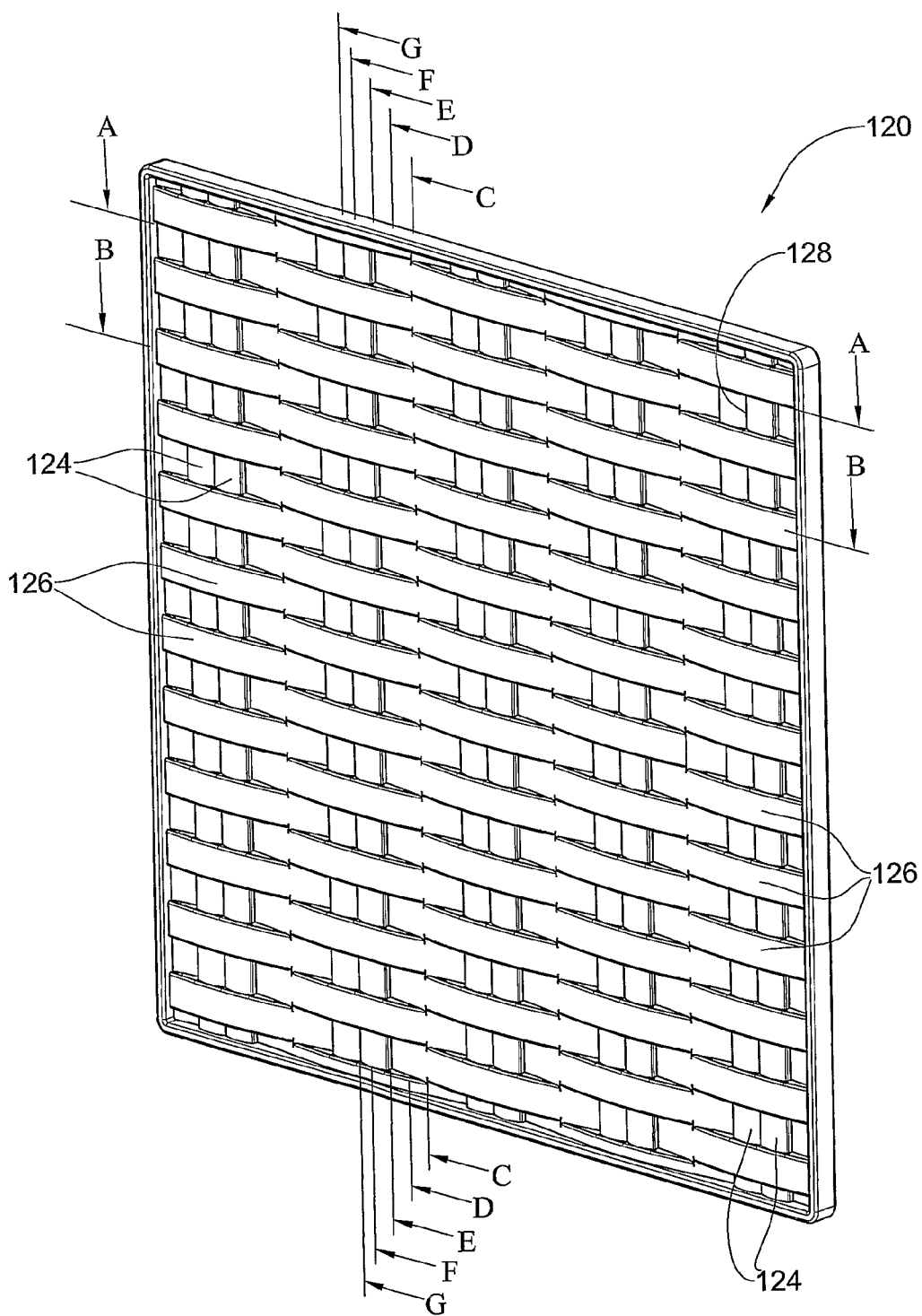
FIG. 8 is an isometric view of a different embodiment of a rattan-like panel manufactured in accordance with the present invention.
Figure 9A:
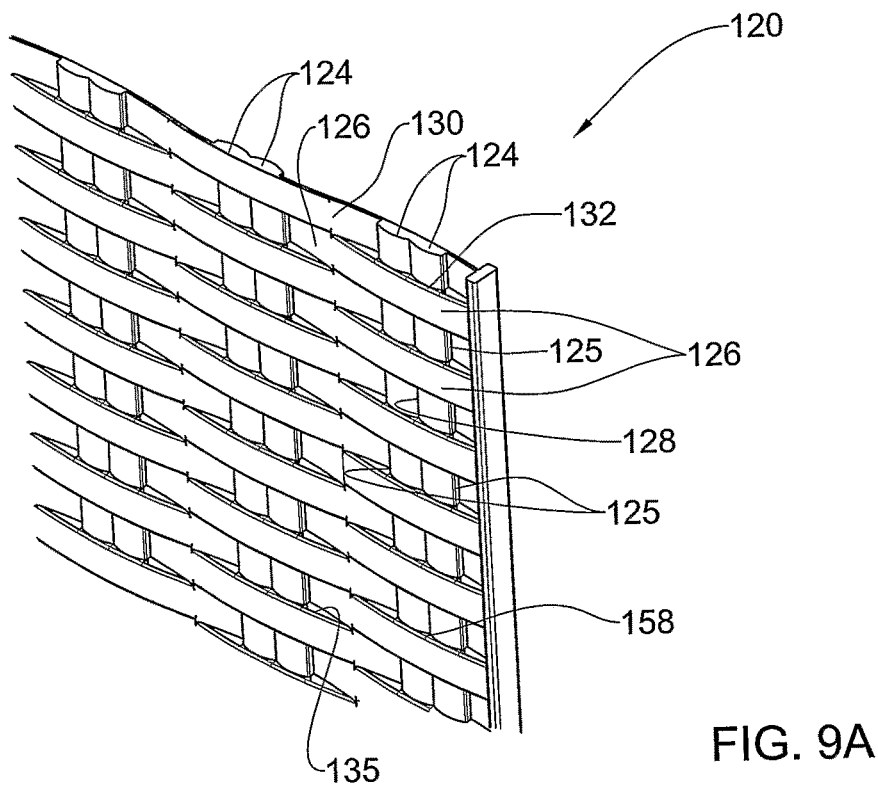
Figure 9B:
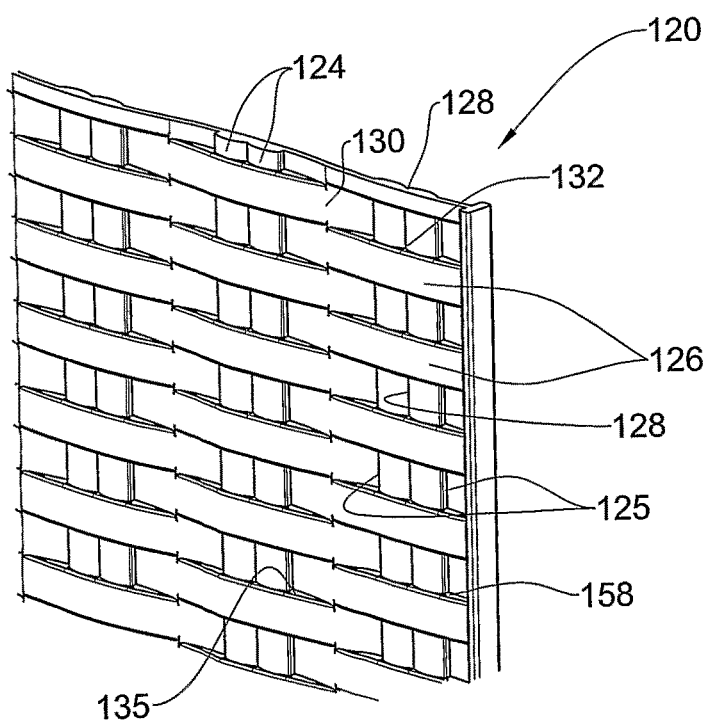
Figure 9C:
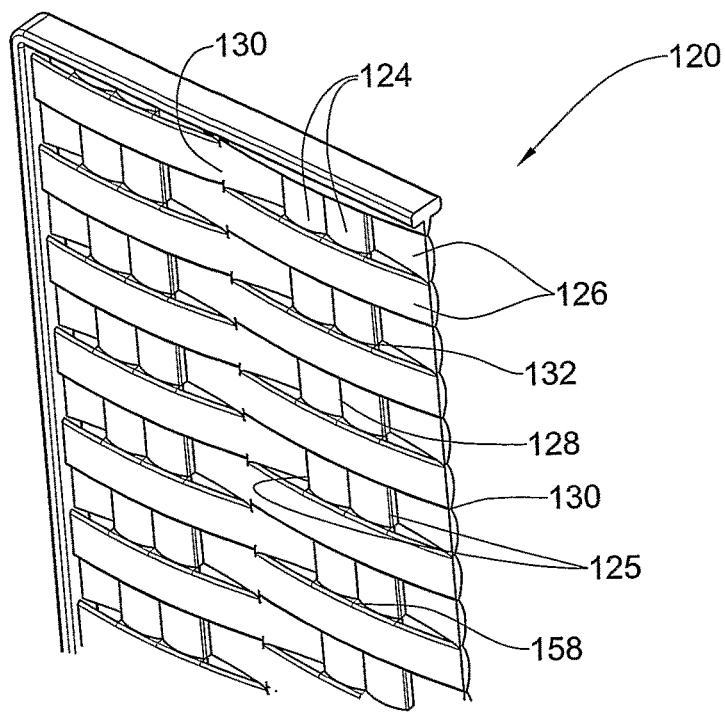
Figure 9D:
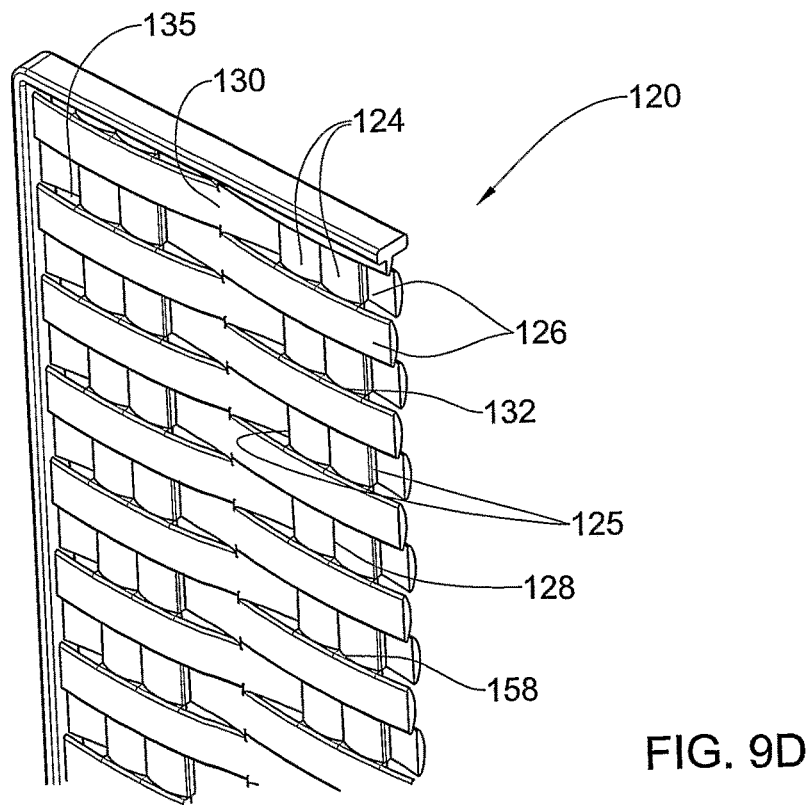
Figure 9E:
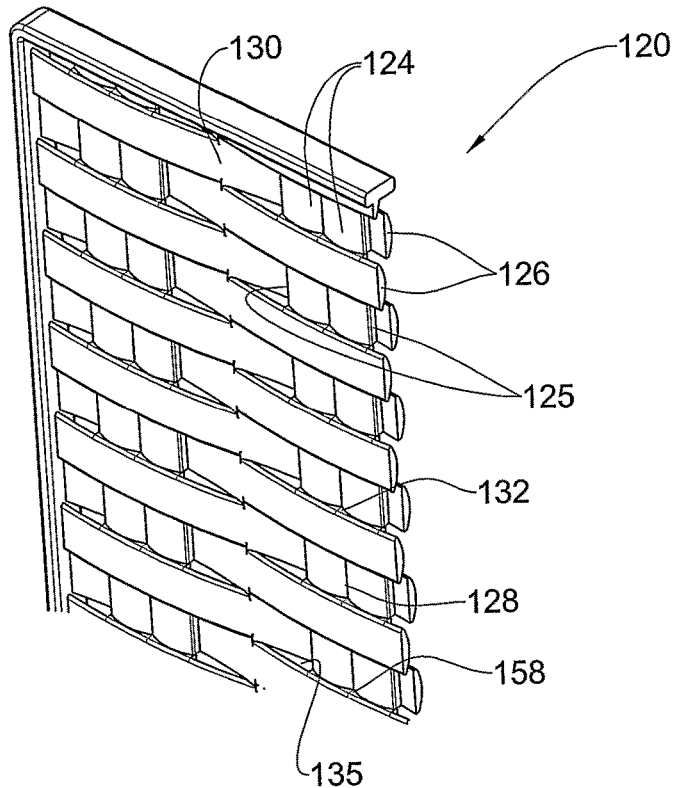
Figure 9F:
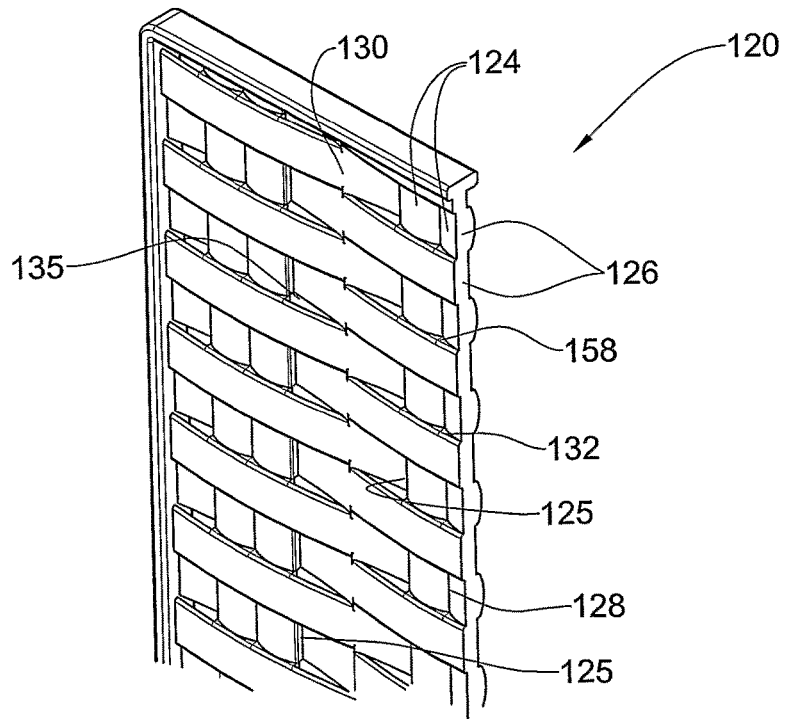
Figure 9G:
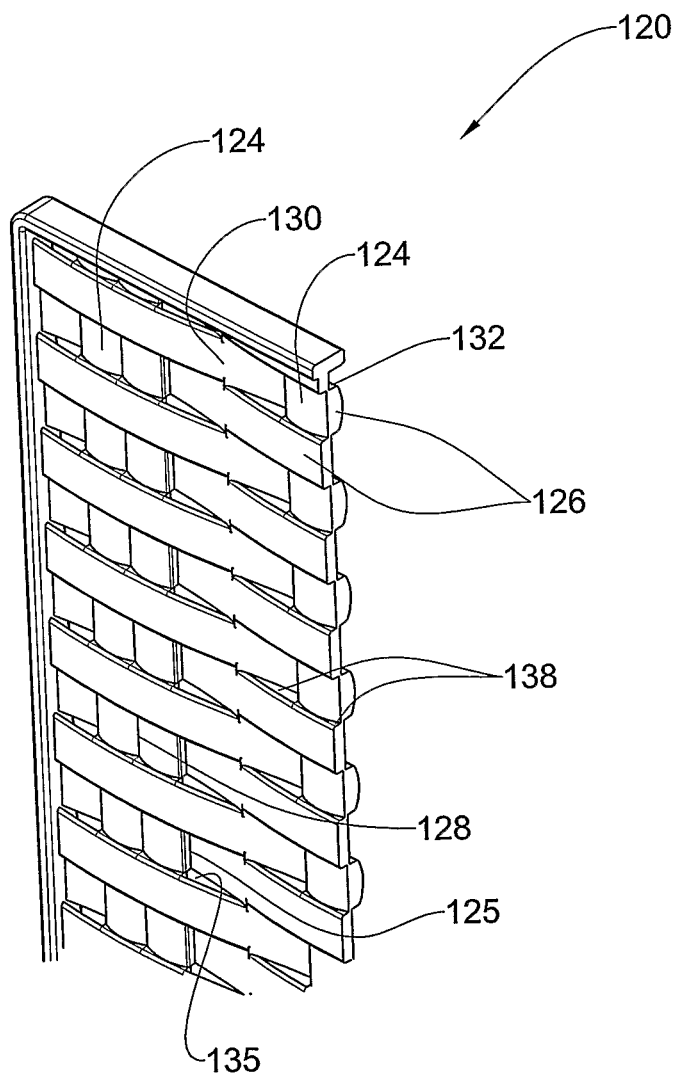
Figure 10A:
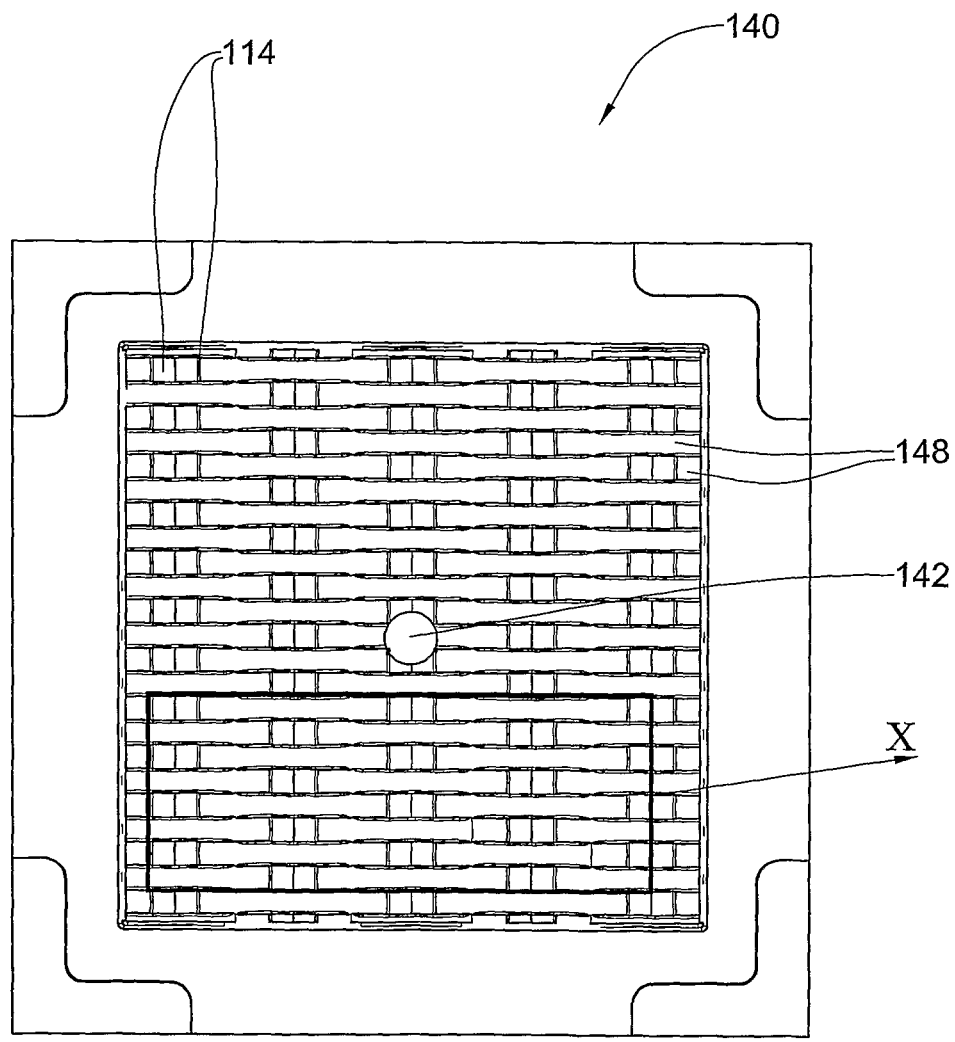
FIG. 10A is a top planar view of a first mold member used for molding a panel in accordance with the embodiment of FIG. 8, the second mold being substantially a mirror image thereof.
Figure 10B:
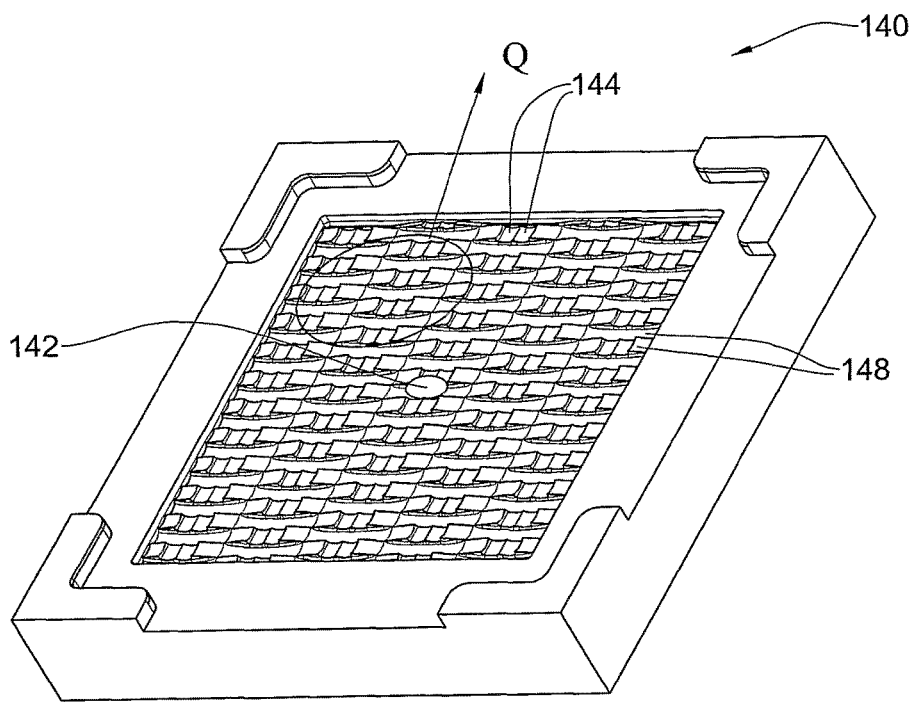
FIG. 10B is an isometric view of the mold seen in FIG. 10A.
Figure 10C:
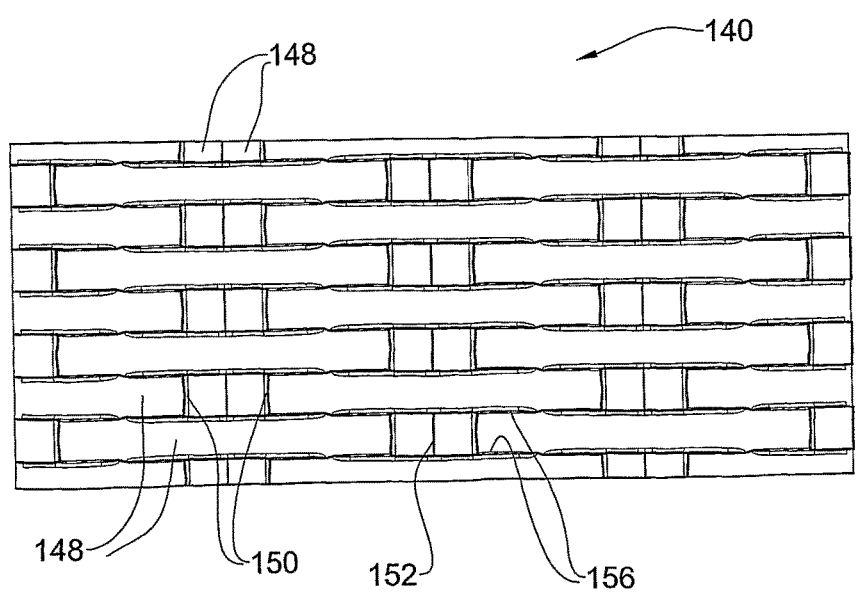
FIG. 10C is an enlargement of the portion marked X in FIG. 10A.
Figure 10D:
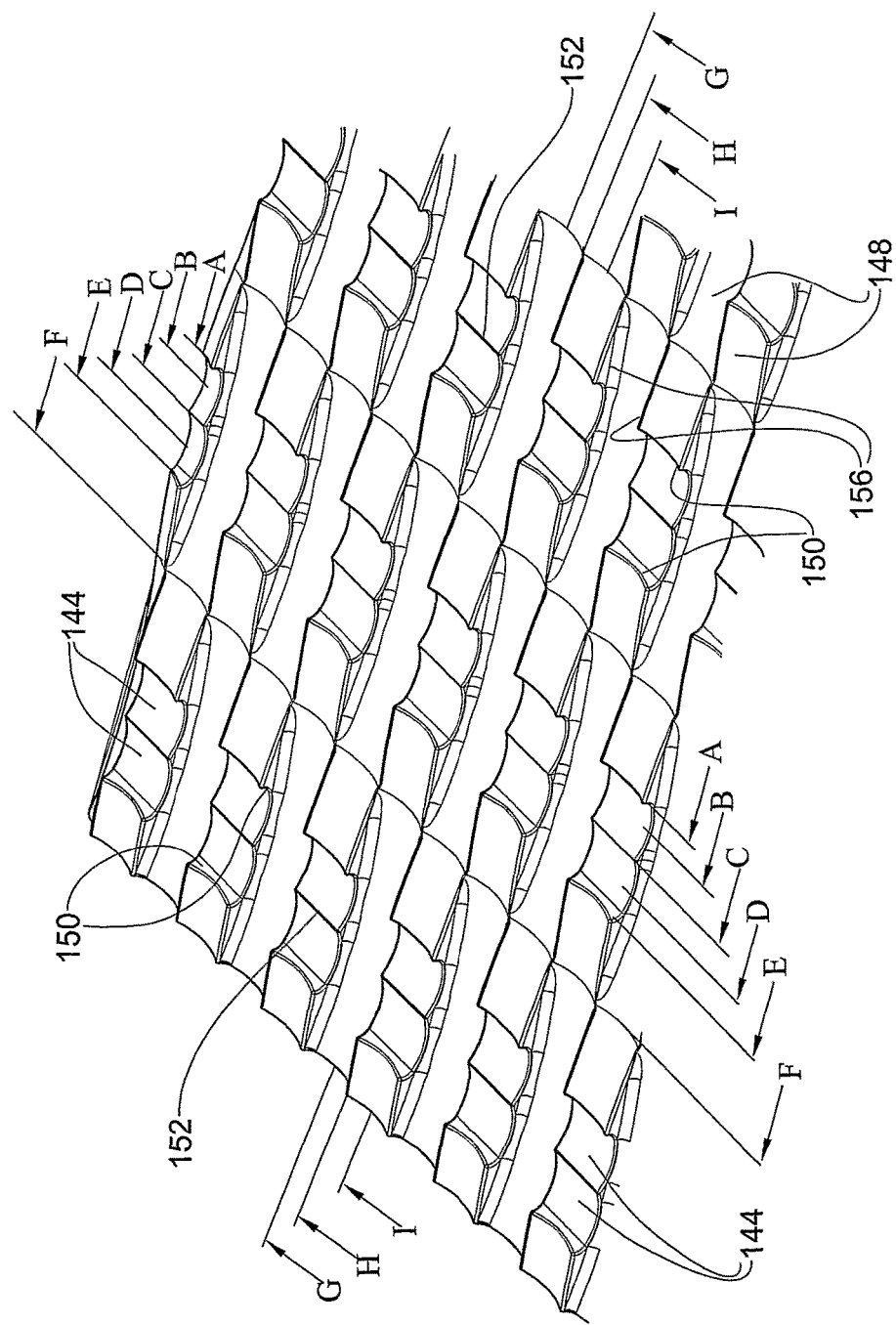
FIG. 10D is an enlargement of the portion marked Q in FIG. 10B.
Figure 11A:
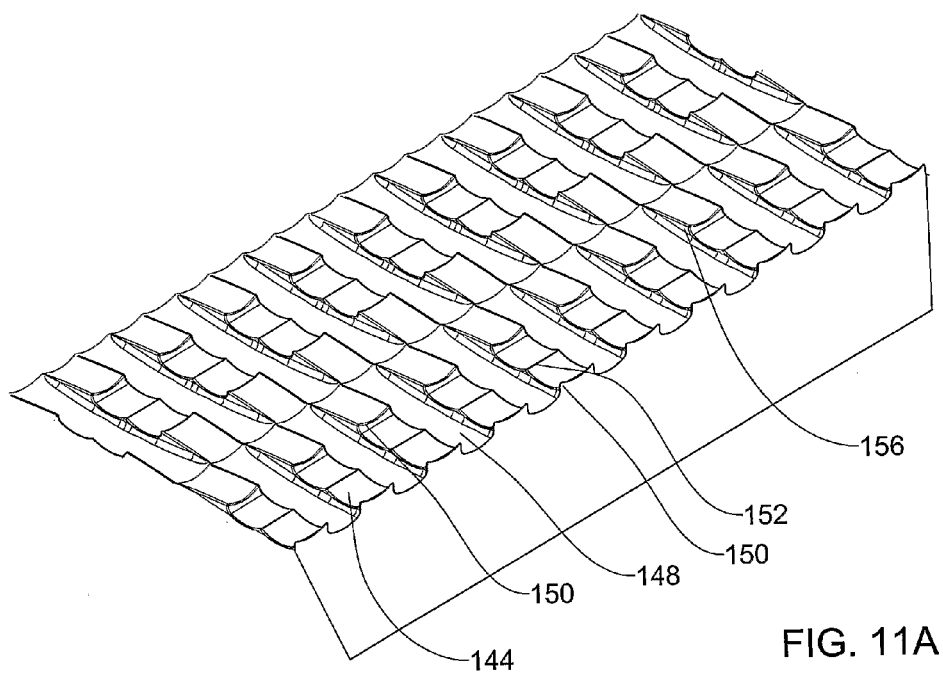
Figure 11B:
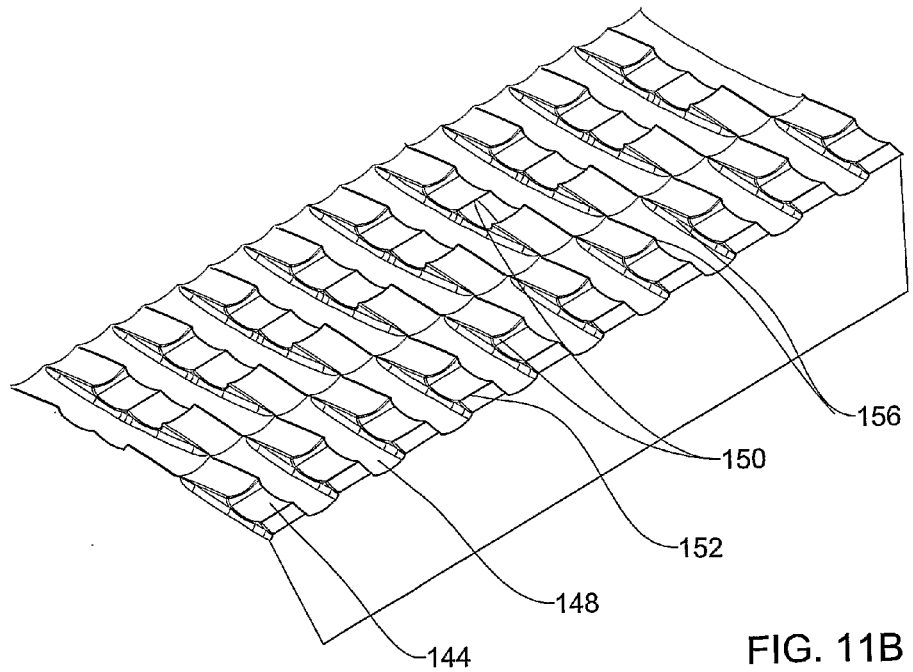
Figure 11C:
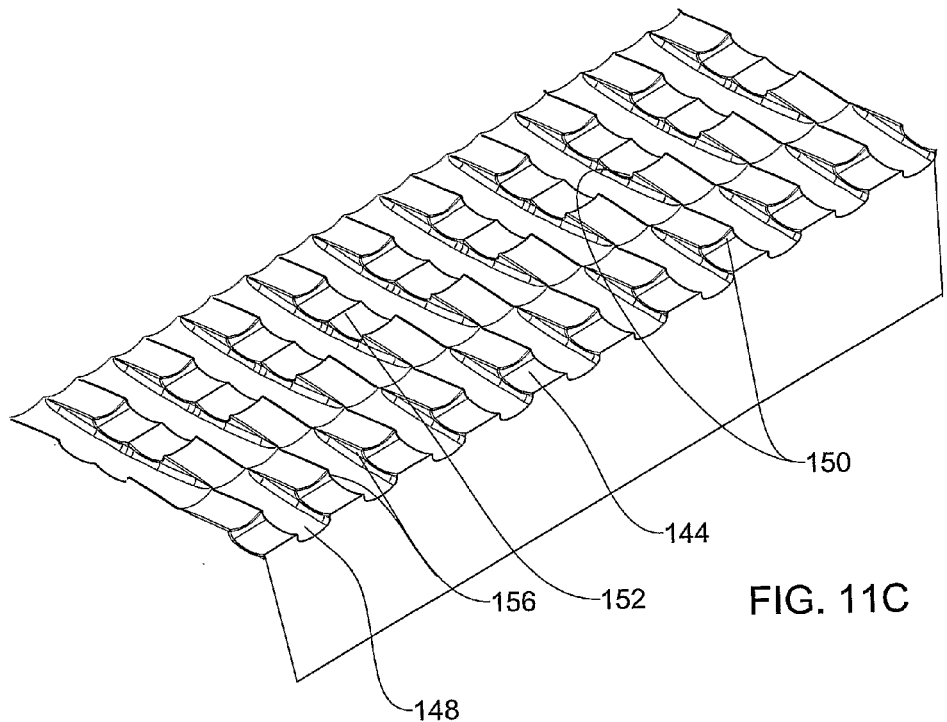
Figure 11D:
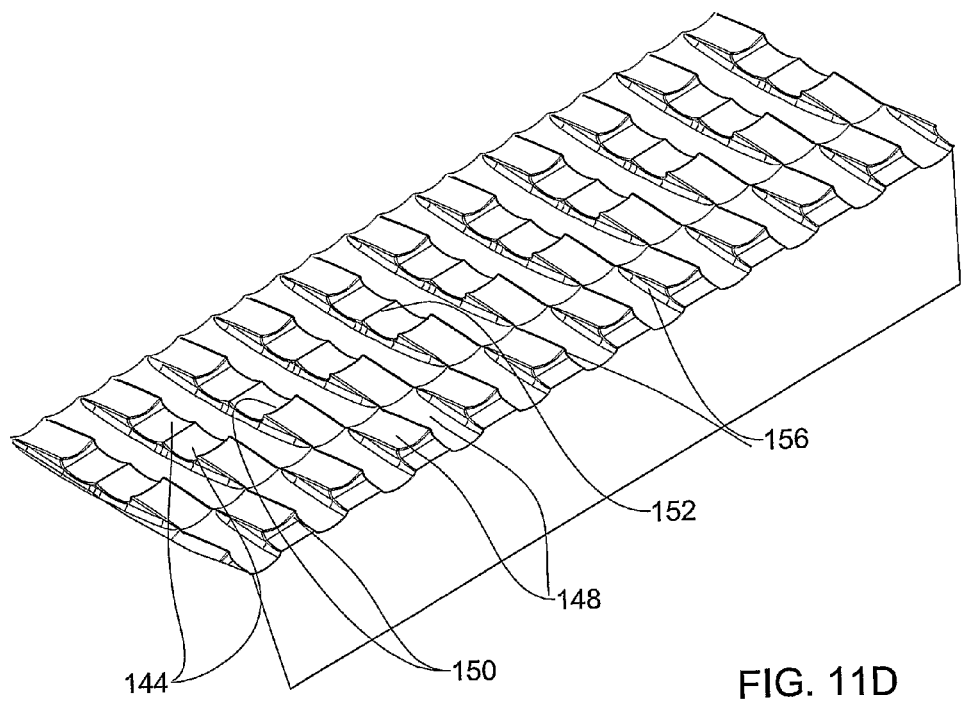
Figure 10E:
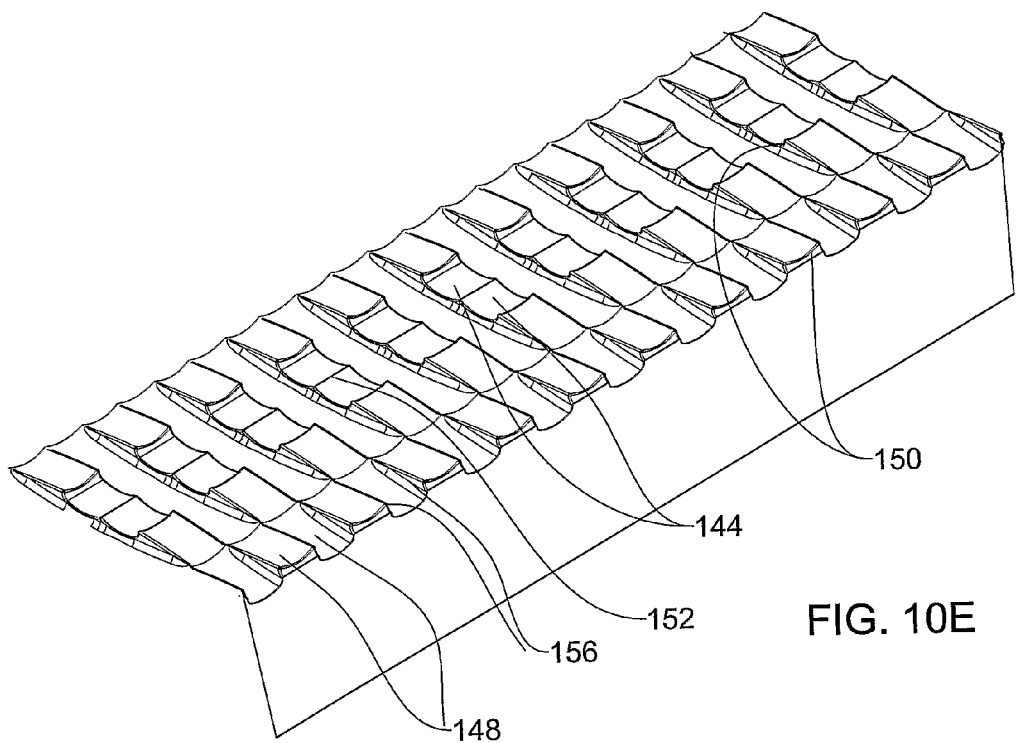
Figure 10F:
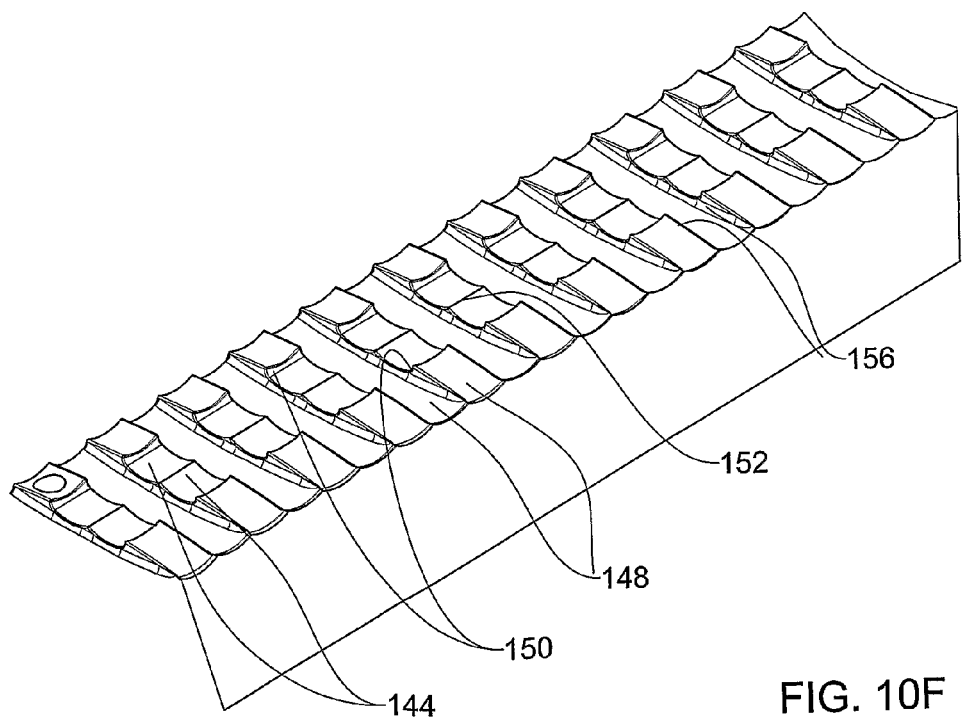
Figure 11G:
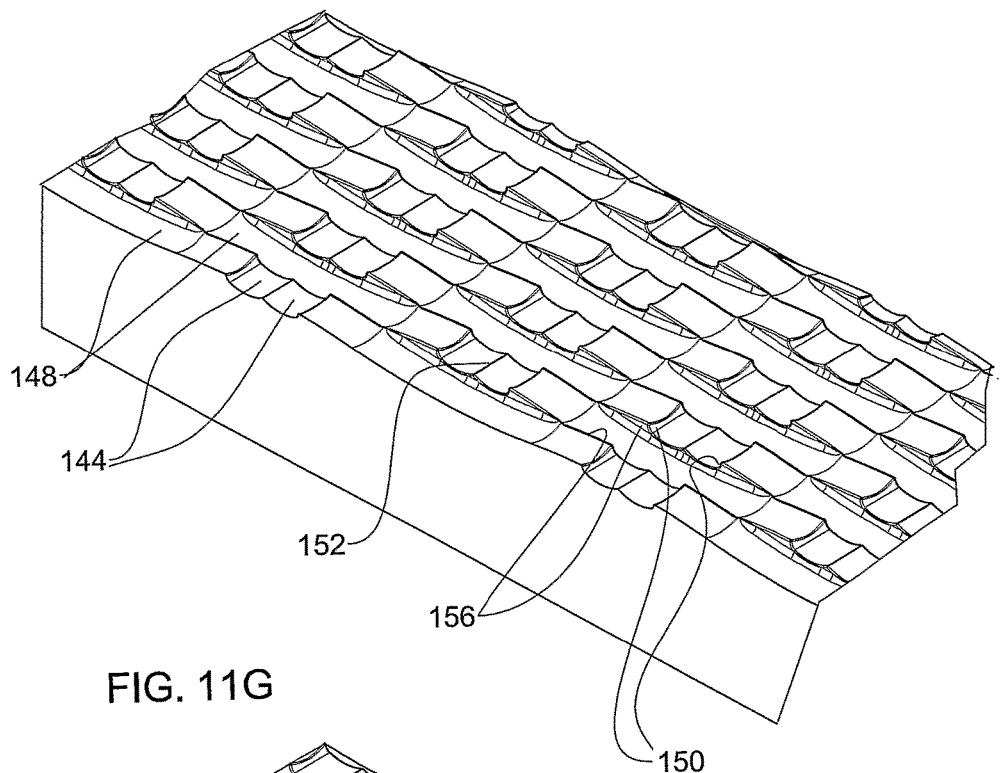
Figure 11H:
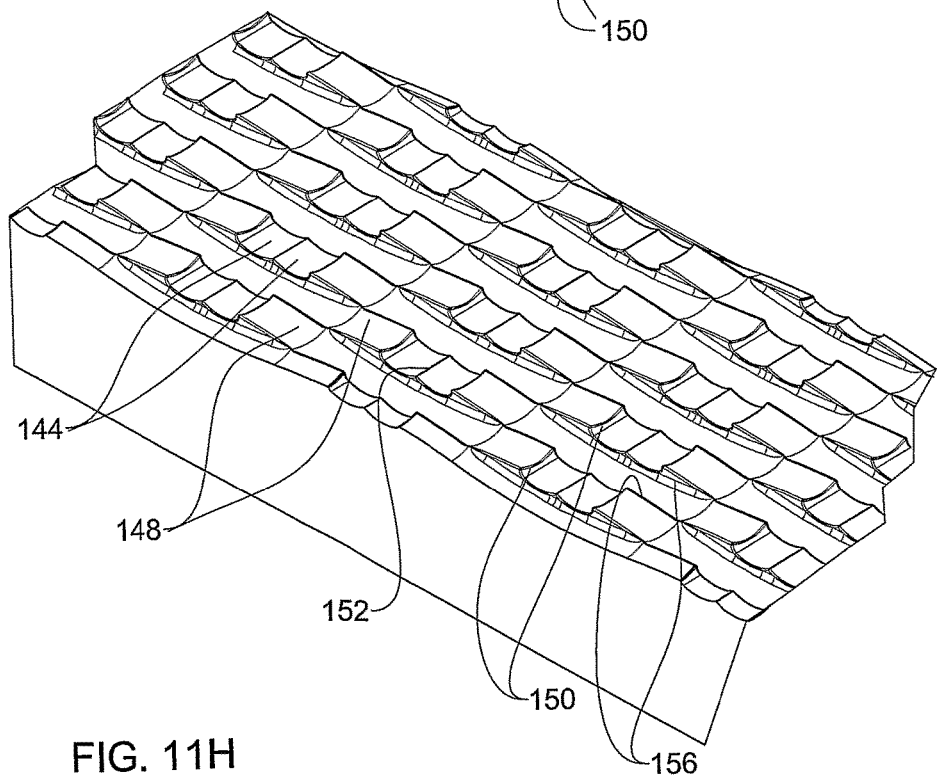
Figure 11I:
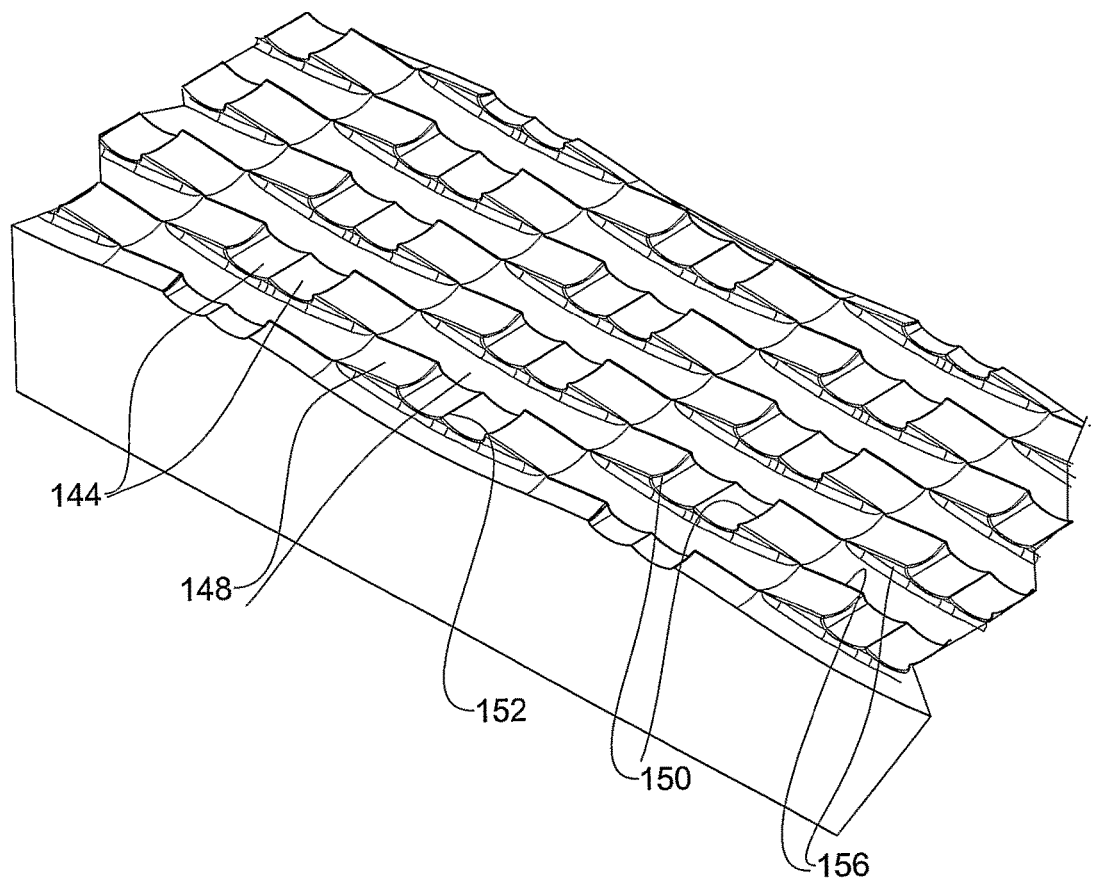

It is thus noticeable form FIGS. 8 and 9 that each undulating weft strand 126 is integrally molded at its intersecting locations with warp strands 124.

With further reference to FIGS. 10A to 10D and FIGS. 11A to 11I there is illustrated a mold member 140 being one of a pair of molds used for molding a panel of the type illustrated in FIGS. 8 and 9. As discussed in connection with the mold system and mold member illustrated in FIGS. 5 to 7, it is designed for cooperation with a similar second mold member (not shown) being substantially a mirror image of the mold member 140. In use, the two mold members are tightly adjoined to one another with suitable true positioning arrangements provided to ensure correct alignment of the two mold components.

The first mold member 140 is provided with an inlet port 142 for ingress of molten material. However, and as discussed in connection with the example of FIGS. 5 and 6, the inlet port may be positioned at different locations or, several such inlet ports may be provided to provide for uniform and homogeneous flow of the molten material into the voids between the first and second mold members.

The mold member 140 is formed with a plurality of warp grooves 144 and weft grooves 148 which together with the second mold member (not shown) constitute corresponding warp and weft channels, and thus give rise to the shape of the rattan-like panel to be molded as illustrated in FIGS. 8 and 9A to 9G. As seen in the figures, the mold member 140 is formed with a plurality of trough-like warp grooves 144 and a plurality of weft-trough like grooves 148. As can best be seen in FIG. 10D and in FIGS. 11A' to 11I the warp grooves 144 are formed with substantially straight and upright projecting sidewalls 150 (these sidewalls give rise to substantially straight walls 125 of the rattan-like panel 120) (see FIG. 9). A fine ridge 152 extends between the two adjoining weft grooves 144, said ridge will eventually result in the illusion of the partition line 128 between two adjoining warp strands 124.

Following the weft grooves 148 one can notice their undulating pattern as well as their concavity, though being substantially more flat than the grooves disclosed in connection with the round rattan-like panel of the previous embodiment. Furthermore, it is noticeable that each weft groove 148 extends between a pair of substantially vertical sidewalls 156, these being associated with easy extraction of the mold members so as to prevent "undercut" and to form the shape of the weft strands 126.

The height of the vertical wall segments 150 defines in fact the distance between the weft strands 124 and the warp strands 128, as noticeable in FIGS. 8 and 9, namely the distance corresponding with the segment designated 158. Also noticed in the drawings is the upwardly extending blade-like edge 161 of the weft grooves 148, which at the injection process gives rise to forming the partition between the neighboring weft strands 126.

Figure 12A:
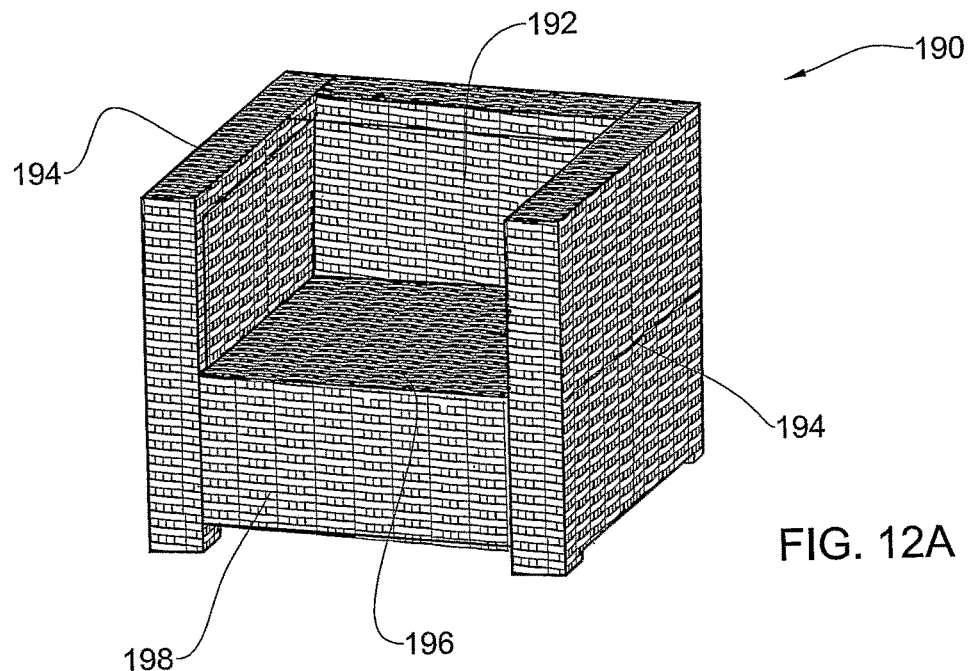
FIG. 12A illustrates an armchair composed of molded components comprising rattan-like panels.
Figure 12B:
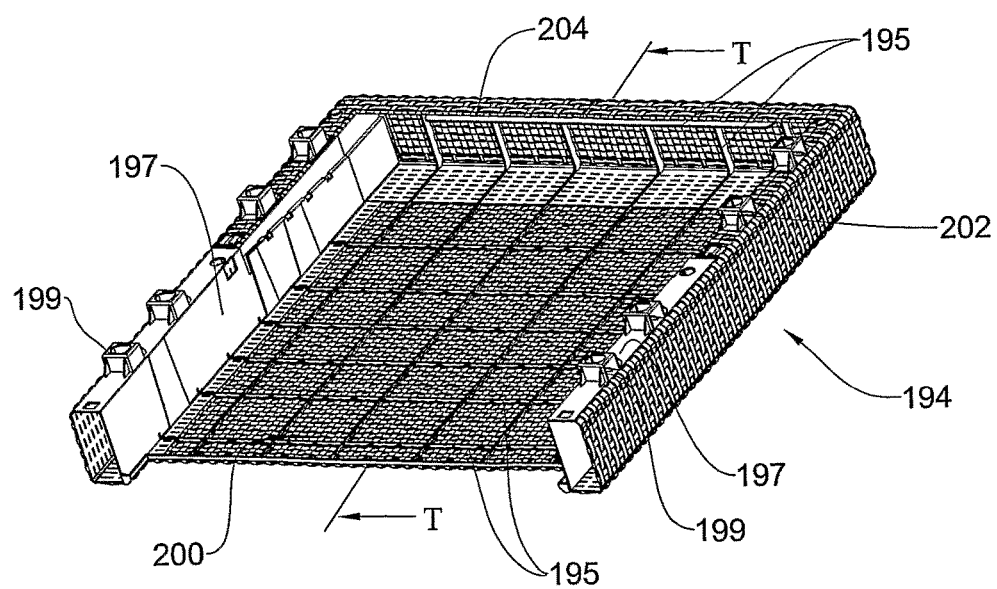
FIGS. 12B to 12D illustrate mold components useful for the assembly of the armchair shown in FIG. 12A, said mold components comprising rattan-like panels according to the present invention.
Figure 12C:
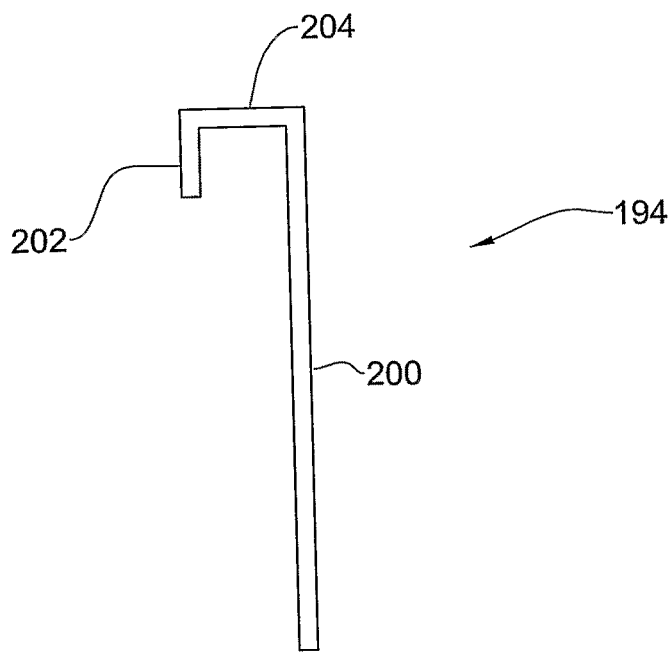
Figure 12D:
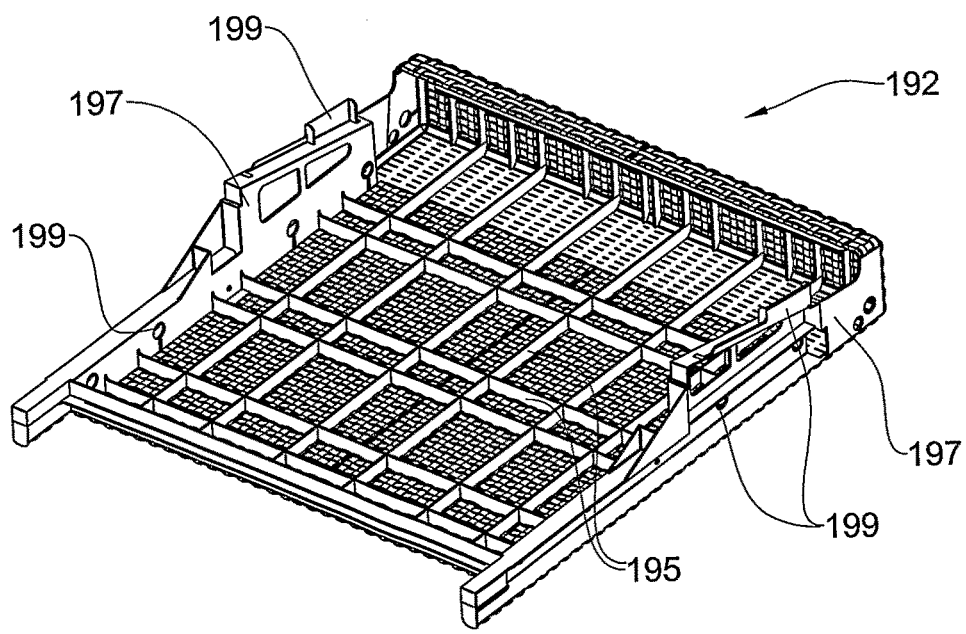

FIG. 12A shows an armchair generally designated 190 composed of a back member 192, two side walls 194, a seat member 196 and a binder 198. Whilst the armchair appears to be of ordinary design, it is noted that each of the elements 194 to 198 are made of rattan-like molded elements (FIGS. 12B and 12C). Some of these elements have a skirt-like design, namely compose at least two integrally molded rattan-like panels inclined with respect to one another. In FIG. 12C the panel 194 comprises three rattan-like panels (namely 200, 202 and 204), integrally molded. In FIGS. 12B and 12C (the latter being a longitudinal section along line T-T in FIG. 12B) there is illustrated the side wall 194 having an external panel 200 integrally molded with an inside panel 202 with an intermediate segment 204 extending therebetween, integrally molded. The panels 192 and 194 are integrally molded with several reinforcing ribs 195 designed such that they are not visible at the assembled position of the armchair 190 (FIG. 12A), and further there are integrally molded rigid frame elements 197 formed with securing elements such as projections and screw receptacles 199 for engagement with mating elements to assemble the armchair 190.

Those skilled in the art to which this invention pertains will readily appreciate that numerous changes, variations, and modifications can be made without departing from the scope of the invention, mutatis mutandis.

The invention claimed is:

1. A monolithic, polymeric molded panel resembling a natural wickerwork panel, said panel comprising:
   a plurality of polymeric warp strands; and
   a plurality of polymeric weft strands interlacing said plurality of polymeric warp strands to form the monolithic, polymeric molded panel, at locations where the polymeric warp strands and the polymeric weft strands intersect, said polymeric warp strands and said polymeric weft strands form together an integrated, solid molded material location,
   wherein undulating neighboring polymeric weft strands give rise to a vertical gap extending from both sides of each polymeric warp strand between a maximal space adjacent said point of intersection of each polymeric warp strand and zeroing at locations where the neighboring polymeric weft strands tangentially intersect each other, and
   a plurality of alternatingly undulating polymeric weft strands tangentially intersect with one another at an intersection point extending along a line parallel to the polymeric warp strands, wherein at said intersection point said plurality of alternatingly undulating polymeric weft strands is moldingly articulated to one another forming together an integrated, solid molded material location,
   wherein each solid molded material location is continuous and free from partition lines.

2. The monolithic, polymeric molded panel of claim 1, wherein each of the polymeric weft strands of the pair of alternatingly undulating polymeric weft strands, between points of intersection, has a substantially uniform cross-section and a regular, uniform surface.

3. The monolithic, polymeric molded panel of claim 1, having two opposing faces that mimic a natural wickerwork surface.

4. The monolithic, polymeric molded panel of claim 3, wherein the two opposing faces each mimic a different pattern of a natural wickerwork surface.

5. The monolithic, polymeric molded panel of claim 1, wherein the vertical gap extends between several alternatingly undulating polymeric weft strands.

6. The monolithic, polymeric molded panel of claim 1, wherein said monolithic, polymeric molded panel is free from any anchoring structure or members.

7. The monolithic, polymeric molded panel of claim 1, further comprising
   a polymeric frame that is integrally molded with the monolithic, polymeric molded panel to form a monolithic, polymeric framed panel,
   wherein the frame is an ornamental element and reinforces the monolithic, polymeric molded panel.

8. The monolithic, polymeric molded panel of claim 1, wherein said vertical gap comprises a continuous, and straight gap extending parallel to the polymeric warp strands, at both sides thereof, between undulating polymeric weft strands.

9. The monolithic, polymeric molded panel of claim 1, wherein the plurality of polymeric warp strands and the plurality of polymeric weft strands are imparted one or more ornamentation parameters to resemble natural wicker strands, said ornamentation parameters are selected from size, color, and texture imperfections.

10. The monolithic, polymeric molded panel of claim 1, having two opposing faces, wherein at least one of the opposing faces mimics a natural wickerwork surface, and the wicker-like polymeric strands are moldingly formed by complementary shapes of molds.

11. The monolithic, polymeric molded panel of claim 1, wherein the monolithic, polymeric molded panel is substantially planar.

12. The monolithic, polymeric molded panel of claim 1, wherein the monolithic, polymeric molded panel is three dimensional and comprises at least two panel segments have intersecting normal lines.

13. A monolithic, polymeric, framed molded panel resembling a natural wickerwork panel, comprising:
   a polymeric frame; and
   a polymeric molded panel integrally molded with the polymeric frame to form said monolithic, polymeric, framed molded panel, the polymeric molded panel comprising
   a plurality of polymeric warp strands; and a plurality of polymeric weft strands interlacing said plurality of polymeric warp strands to form the polymeric molded panel, at locations where said polymeric warp strands and said polymer weft strands intersect, said polymeric warp strands and said polymeric weft strands form together an integrated, solid molded material location,
   wherein undulating neighboring polymeric weft strands give rise to a vertical gap extending from both sides of each polymeric warp strand between a maximal space adjacent said point of intersection of each polymeric warp strand and zeroing at locations where the neighboring polymeric weft strands tangentially intersect each other, and a plurality of alternatingly undulating polymeric weft strands tangentially intersect with one another at an intersection point extending along a line parallel to the polymeric warp strands, wherein at said intersection point said plurality of alternatingly undulating polymeric weft strands is moldingly articulated to one another forming together an integrated, solid molded material location, wherein each solid molded material location is continuous and free from partition lines.

14. The monolithic, polymeric, framed molded panel of claim 13, wherein each of the plurality of polymeric weft strands have a substantially uniform cross-section and a regular, uniform surface.

15. A monolithic, polymeric molded furniture item, comprising:

at least two polymeric panel portions each resembling a natural wickerwork panel, together forming said monolithic, polymeric molded furniture item each of said polymeric panel portions comprising a plurality of polymeric warp strands and a plurality of polymeric weft strands interlacing said plurality of polymeric warp strands, said plurality of polymeric weft strands and said plurality of polymeric warp strands form each of said at least two polymeric panel portions, wherein at locations where polymeric warp and polymeric weft strands intersect they form together an integrated, solid molded material location, wherein undulating neighboring polymeric weft strands give rise to a vertical gap extending from both sides of each polymeric warp strand between a maximal space adjacent said point of intersection of each polymeric warp strand and zeroing at locations where the neighboring polymeric weft strands tangentially intersect each other, and a plurality of alternatingly undulating polymeric weft strands tangentially intersect with one another at an intersection point extending along a line parallel to the polymeric warp strands, wherein at said intersection point said plurality of alternatingly undulating polymeric weft strands is moldingly articulated to one another forming together an integrated, solid molded material location, wherein each solid molded material location is continuous and free from partition lines.

16. The monolithic, polymeric molded furniture item of claim 15, wherein each of the polymeric weft strands of the pair of alternatingly undulating polymeric weft strands, between points of intersection, has a substantially uniform cross-section and a regular, uniform surface.

17. The monolithic, polymeric molded furniture item of claim 15, wherein the plurality of polymeric warp strands and the plurality of polymeric weft strands are imparted one or more ornamentation parameters to resemble natural wicker strands, said ornamentation parameters are selected from size, color, and texture imperfections.

18. A monolithic, polymeric injection molded panel resembling a natural wickerwork panel, said panel comprising:

a plurality of polymeric warp strands; and a plurality of polymeric weft strands interlacing said polymeric warp strands, adjacent polymeric weft strands interconnect at points of intersection therebetween, and said plurality of undulating polymeric weft strands together with said plurality of polymeric warp strands form said monolithic, polymeric molded panel, wherein at locations where said polymeric warp strands and said polymeric weft strands intersect, said polymeric warp strands and said polymeric weft strands form together an integrated, solid molded material location, and undulating neighboring polymeric weft strands give rise to a vertical gap extending from both sides of each polymeric warp strand between a maximal space adjacent said point of intersection of each polymeric warp strand and zeroing at locations where the neighboring polymeric weft strands tangentially intersect each other, and a plurality of alternatingly undulating polymeric weft strands tangentially intersect with one another at an intersection point extending along a line parallel to the polymeric warp strands, wherein at said intersection point said plurality of alternatingly undulating polymeric weft strands is moldingly articulated to one another forming together an integrated, solid molded material location.

19. The monolithic, polymeric injection molded panel of claim 18, wherein each of the polymeric weft strands of the pair of alternatingly undulating polymeric weft strands, between points of intersection, has a substantially uniform cross-section and a regular, uniform surface.

* * * * *